(12) United States Patent
Hughes et al.

(10) Patent No.: US 8,771,622 B2
(45) Date of Patent: Jul. 8, 2014

(54) IMPURITIES REMOVAL FROM WASTE SOLIDS IN THE PRODUCTION OF SODA ASH, SODIUM BICARBONATE AND/OR OTHER DERIVATIVES

(75) Inventors: Ronald O. Hughes, Green River, WY (US); Jessica A. Mote, Lyman, WY (US); Alain Vandendoren, Wezembeek-Oppem (BE); James D. Phillip, Green River, WY (US); David W. Smith, Rock Springs, WY (US)

(73) Assignee: Solvay Chemicals, Inc., Houston, TX (US)

( * ) Notice: Subject to any disclaimer, the term of this patent is extended or adjusted under 35 U.S.C. 154(b) by 347 days.

(21) Appl. No.: 13/099,501

(22) Filed: May 3, 2011

(65) Prior Publication Data

US 2011/0274599 A1 Nov. 10, 2011

Related U.S. Application Data

(60) Provisional application No. 61/331,297, filed on May 4, 2010, provisional application No. 61/380,123, filed on Sep. 3, 2010, provisional application No. 61/380,126, filed on Sep. 3, 2010.

(51) Int. Cl.
*C01D 1/32* (2006.01)
*C01D 3/16* (2006.01)

(52) U.S. Cl.
USPC ............ 423/184; 423/186; 423/179; 423/173

(58) Field of Classification Search
USPC ...................... 423/184, 419.1, 430
See application file for complete search history.

(56) References Cited

U.S. PATENT DOCUMENTS

| 1,853,275 A | 4/1932 | Houghton et al. |
| 1,992,532 A | 2/1935 | Kuhnert |

(Continued)

FOREIGN PATENT DOCUMENTS

| CA | 414313 A | 8/1943 |
| GB | 2023564 A | 1/1980 |

(Continued)

OTHER PUBLICATIONS

Schmitz & Woehlk, "Vacuum Salt Plant or Mechanical Refinery? Guidelines for the Selection of the Optimal Process", Seventh Symposium on Salt, vol. II, pp. 117-122, 1993 (7 pgs.).

(Continued)

*Primary Examiner* — Melissa Stalder
(74) *Attorney, Agent, or Firm* — Beatrice C. Ortego

(57) ABSTRACT

A method for removing impurities from a waste solid to provide at least a portion of a suitable crystallizer feed to a process for making crystalline sodium carbonate, bicarbonate, and/or other derivatives. The method comprises: contacting the waste solid with a leach solution to dissolve at least one impurity and dissolving the resulting leached residue. Leaching may include heap percolation. The leach solution may comprise a crystallizer purge liquor, a process waste effluent, a mine water, or mixtures thereof. The method may further comprise adding a magnesium compound to the resulting leached residue during or after its dissolution to remove another impurity. The waste solid preferably comprises a pond solid containing such impurities. The pond solid may be recovered from a pond receiving crystallizer purge liquor(s) and/or other process waste effluent(s). The pond solid may contain sodium carbonate, any hydrate thereof, sodium bicarbonate, and/or sodium sesquicarbonate. The impurities to be removed may comprise sodium chloride, sodium sulfate, silicates, and/or organics.

21 Claims, 13 Drawing Sheets

(56) References Cited

U.S. PATENT DOCUMENTS

| | | | |
|---|---|---|---|
| 2,287,856 A * | 6/1942 | Beekhuis, Jr. et al. | ........ 423/208 |
| 2,293,111 A | 8/1942 | Campbell et al. | |
| 2,550,708 A | 5/1951 | Meyer | |
| 2,628,155 A | 2/1953 | Gruen | |
| RE24,298 E | 4/1957 | Herman et al. | |
| 2,887,364 A | 5/1959 | Harrel et al. | |
| 3,083,126 A | 3/1963 | Griffiths et al. | |
| 3,206,303 A | 9/1965 | Goren | |
| 3,498,744 A | 3/1970 | Frint et al. | |
| 3,529,933 A | 9/1970 | Honchar | |
| 3,628,919 A | 12/1971 | Beauchamp | |
| 3,652,202 A | 3/1972 | Stewart et al. | |
| 3,870,780 A | 3/1975 | Guptill | |
| 3,975,499 A | 8/1976 | Walden | |
| 3,991,160 A | 11/1976 | Gancy et al. | |
| 4,016,075 A | 4/1977 | Wilkins | |
| 4,017,309 A | 4/1977 | Johnson | |
| 4,021,526 A | 5/1977 | Gancy et al. | |
| 4,022,868 A | 5/1977 | Poncha | |
| 4,044,097 A | 8/1977 | Gancy et al. | |
| 4,071,611 A | 1/1978 | Chilson | |
| 4,088,451 A | 5/1978 | Sadan | |
| 4,279,755 A | 7/1981 | Himsley | |
| 4,488,958 A | 12/1984 | Williams et al. | |
| 4,564,508 A | 1/1986 | Fairweather et al. | |
| 4,738,836 A | 4/1988 | Poncha et al. | |
| 4,739,973 A | 4/1988 | Herndon | |
| 4,762,622 A | 8/1988 | Thijssen | |
| 4,869,882 A | 9/1989 | Dome et al. | |
| 5,005,806 A | 4/1991 | Krauth | |
| 5,624,647 A | 4/1997 | Zolotoochin et al. | |
| 6,576,209 B2 | 6/2003 | Tanaka et al. | |
| 2003/0143149 A1 * | 7/2003 | Braman et al. | ................ 423/426 |
| 2004/0197258 A1 | 10/2004 | Braman et al. | |
| 2007/0050949 A1 | 3/2007 | Demilie | |
| 2007/0231228 A1 | 10/2007 | Turner et al. | |
| 2009/0291038 A1 | 11/2009 | Davoine et al. | |
| 2010/0038081 A1 * | 2/2010 | Gamache et al. | ............. 166/267 |
| 2010/0226840 A1 | 9/2010 | Phillip et al. | |
| 2010/0290976 A1 | 11/2010 | Hansen et al. | |

FOREIGN PATENT DOCUMENTS

| | | |
|---|---|---|
| GB | 2337515 A | 11/1999 |
| WO | WO 2009/068670 A1 | 6/2009 |

OTHER PUBLICATIONS

Dahlstrom et al, Perry's Chemical Engineers' Handbook , 7th Edition, Publication Date: Jun. 1, 1997, Section 18: Liquid-Solid Operations and Equipment-Leaching, p. 18-1 to 18-4 & 18-55 to 18-59 (9 pgs).

U.S. Appl. No. 12/743,551, filed May 18, 2010, David M. Hansen, et al.

U.S. Appl. No. 12/718,098, filed Mar. 5, 2010, James D. Phillip, et al.

* cited by examiner

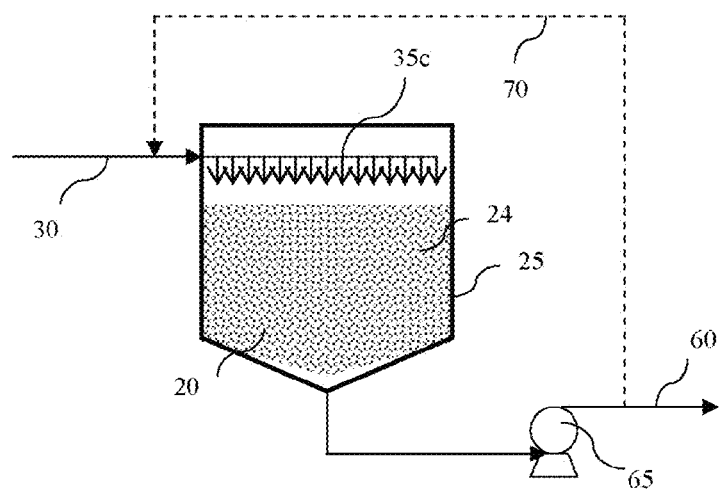
FIG. 2c
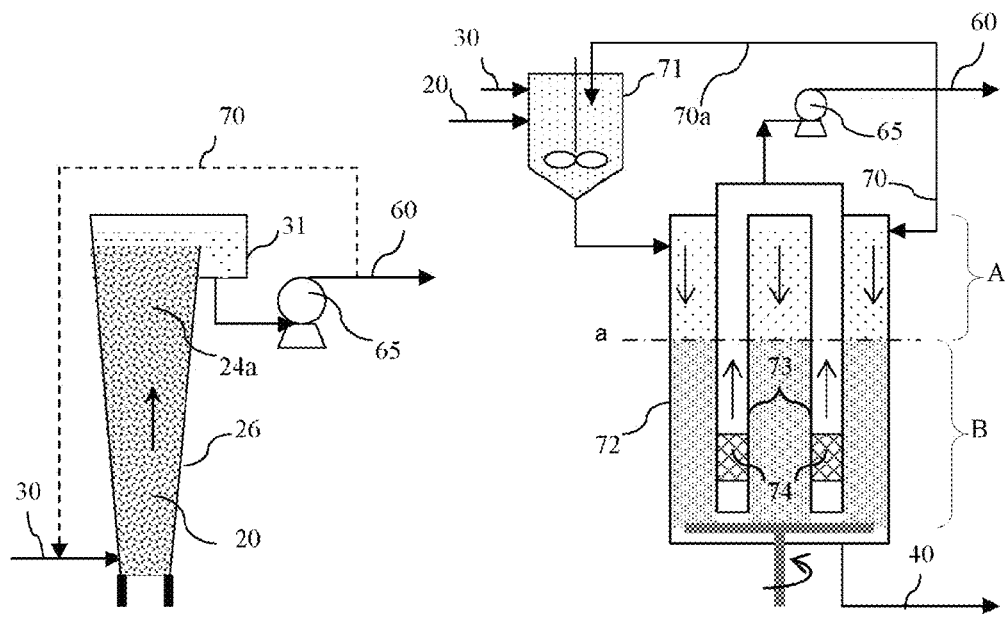
FIG. 2d
FIG. 2e

IMPURITIES REMOVAL FROM WASTE SOLIDS IN THE PRODUCTION OF SODA ASH, SODIUM BICARBONATE AND/OR OTHER DERIVATIVES

CROSS-REFERENCE TO RELATED APPLICATIONS

The present application claims priority benefit to U.S. provisional application No. 61/331,297, filed on May 4, 2010, to U.S. provisional application No. 61/380,123 filed on Sep. 3, 2010, and to U.S. provisional application No. 61/380,126 filed on Sep. 3, 2010, the whole content (including drawings) of each of these applications being herein incorporated by reference for all purposes.

STATEMENT REGARDING FEDERALLY SPONSORED RESEARCH OR DEVELOPMENT

Not applicable.

TECHNICAL FIELD OF THE INVENTION

The present invention relates to a method for removing impurities from a waste solid, at least a portion of which is recovered from a waste pond, to form a valorized solid with less impurities which is suitable for use as a feedstock in the production of a crystalline product comprising for example sodium carbonate, bicarbonate, sulfite, or other derivatives. The method may involve a first step: a selective leaching of some impurities and an optional second step: a selective precipitation of some impurities, where the impurities may include sodium chloride, sodium sulfate, silicates, and/or water-soluble organics.

BACKGROUND OF THE INVENTION

Soda ash or sodium carbonate is an inorganic salt made from the mineral trona. Soda ash is one of the largest volume alkali commodities made in the United States. Soda ash finds major use in the glass-making industry and for the production of baking soda, detergents and paper products.

Large deposits of the mineral trona in southwestern Wyoming near the Green River Basin have been mechanically mined since the late 1940's. In 2007, trona-based sodium carbonate from Wyoming comprised about 90% of the total U.S. soda ash production. Trona ore is a mineral that contains about 70-99% sodium sesquicarbonate dihydrate ($Na_2CO_3 \cdot NaHCO_3 \cdot 2H_2O$). Trona ore contains insoluble matter in the form of shale. The shale contains various constituents such as organic kerogeneous matter (e.g., 0.1-1% as carbon) and dolomitic and silica bearing materials (e.g., about 5-15%), such as dolomite, quartz, feldspar, clay.

The crude trona is normally purified to remove or reduce impurities, primarily shale and other water insoluble materials, before its valuable sodium content can be sold commercially as: soda ash ($Na_2CO_3$), sodium bicarbonate ($NaHCO_3$), caustic soda ($NaOH$), sodium sesquicarbonate ($Na_2CO_3 \cdot NaHCO_3 \cdot 2H_2O$), sodium sulfite ($Na_2SO_3$), a sodium phosphate ($Na_5P_3O_{10}$), or other sodium-containing chemicals.

To recover these valuable alkali products, the 'monohydrate' commercial process is frequently used to produce soda ash from trona. In the production of soda ash, crushed trona ore is calcined (e.g., heated) to decompose the sodium sesquicarbonate to sodium carbonate.

$$2Na_2CO_3 \cdot NaHCO_3 \cdot 2H_2O \rightarrow 3Na_2CO_3 + 5H_2O(g) + CO_2(g)$$

The calcination drives off water of crystallization and forms crude soda ash. During calcination, a part of the water insoluble silicate bearing material contained in the ore is converted to soluble silicates. The calcined ore is dissolved in water or dilute sodium carbonate liquor to give a saturated solution of ~30 wt. % $Na_2CO_3$ (depending upon the temperature of the solution) containing water-soluble impurities. The water-soluble impurities may comprise silicates, organics, sodium chloride, and sodium sulfate. The insoluble material is separated from the resulting saturated solution. This clear sodium carbonate-containing solution is fed to an evaporative crystallizer. As this solution is heated, evaporation of water takes place effecting the crystallization of sodium carbonate into sodium carbonate monohydrate crystals ($Na_2CO_3 \cdot H_2O$). The monohydrate crystals are removed from the mother liquor and then dried to convert it to anhydrous soda ash ($Na_2CO_3$). The mother liquor is recycled back through a crystallizer circuit for further processing into sodium carbonate monohydrate crystals.

The crystallization step however concentrates impurities in the mother liquor. Indeed, by the effect of water evaporation, the soluble impurities such as organics, silicates, sodium chloride, and sodium sulfate, become concentrated in the crystallizer. If this is allowed to continue, eventually the concentration of the impurities builds to a point where the resulting sodium carbonate product quality may be negatively impacted. Applicants have found for example that the presence of water-soluble silicates in the crystallizer liquor seems to impact the morphology of crystallization and may diminish the yield of salable product. Additionally, the presence of impurities in the crystallizer liquor can cause severe scaling of the surfaces of equipment in which this saturated solution is handled, for examples lines, tanks, pumps, and particularly the crystallizer heat-exchanger which handles the liquor in a recycling loop connected to the crystallizer. For example, an accumulation of sodium chloride and/or sulfate, both impurities originating from crude trona, in the crystallizer liquor can result in the formation of complex salts which may crystallize out of the hydrated product. A scale buildup containing such impurities generally formed on exposed surfaces of the crystallizer heat exchanger requires frequent and expensive high pressure washes.

Therefore, to maintain the concentration of the water-soluble impurities below the crystallization point so as to avoid contamination and deterioration of crystal shape, size, and hardness by the impurities and to prevent the buildup of these impurities in the crystallizer, a portion of the crystallizer liquor must be purged, and is generally called 'purge liquor'. This can result in a loss of up to about 10% of the soda values. The purge liquor exiting a crystallizer typically includes sodium carbonate and/or sodium bicarbonate, as well as impurities, such as water-soluble organics, sodium chloride, sodium sulfate, and silicates. A purge liquor exiting a monohydrate crystallizer may contain ca. 19-30% sodium carbonate, 0.1-4% sodium bicarbonate, 0.2-1% silicates, up to 2.7% sodium chloride, up to 2.4% sodium sulfate, and 100-1,500 ppm Total Organic Carbon (TOC), but typically contains ca. 23-28% sodium carbonate and 0.2-3% sodium bicarbonate. A purge liquor exiting a bicarbonate crystallizer may contain ca. 5-25% sodium carbonate, 1-15% sodium bicarbonate, up to 1% silicates, up to 2.7% sodium chloride, up to 2.4% sodium sulfate, and 100-1,500 ppm TOC.

In the manufacture of soda ash and/or sodium bicarbonate, a system of storage ponds has been used to accommodate disposal of the plant effluent stream including mine water, crystallizer purge liquor, and other sources of waste water effluents inherent to the process. The effluent stream is transported year-round to at least one pond. The purge liquor exiting the crystallizer is typically stored in one or more tailings (waste) ponds which use up large areas of land. The pond area is generally capable of handling a depth of at least six feet (1.83 meters) high of effluent, and would typically be from 1 to 100 acres (4,047-405,000 m$^2$) in surface area. During the summer, water evaporates from the pond resulting in the crystallization of a sodium salt (e.g., mainly sodium carbonate decahydrate when a major source of the plant effluent stream is a monohydrate crystallizer purge), which is contaminated with varying amounts of impurities, including silicates, sodium chloride, sodium sulfate, and organics, the impurities content in the crystallized sodium salt (especially when it is sodium carbonate decahydrate) generally being smaller than in the pond solution. In the winter, crystals form by cooling crystallization, and are deposited at the bottom of the pond over the previously deposited summer precipitation. The evaporation process also concentrates the amount of sodium chloride and other impurities in the pond solution. The supernate liquid in the continuously filled ponds typically has NaCl levels of greater than 11% in the summer and 14% in the winter. Such pond deposit reduces the total pond volume. The solids depth may vary, but solid depth of about 1.2 m (4 ft) or more have been observed. There is usually a depth of about 0.3-0.6 m (1-2 ft) of liquor on top of the pond deposit. Because the pond deposit generally contains a large portion of sodium carbonate decahydrate, it is generally referred to as a 'deca' deposit. However in the manufacture of soda ash and/or sodium bicarbonate, the pond deposit may further contain sodium bicarbonate and/or sodium sesquicarbonate. A 'deca' deposit thus in the pond would not only contain sodium carbonate decahydrate but also would contain sodium bicarbonate and/or sodium sesquicarbonate; and the content in sodium carbonate in the 'deca' solid would generally be greater than the content in sodium bicarbonate.

In some instances, a series of ponds may be employed, one of them being a crystallization pond in which a deposit is formed, such deposit being lean in impurities. The remaining spent liquor from the crystallization pond (supernatant above the deposit) may be pumped, drained by pipes or by overflow to a mother liquor pond, in which there is also a formation of another deposit, such deposit being laden with impurities.

The quality of the pond deposit can vary greatly within a specific pond and from pond to pond. For the most part, the 'deca' deposit with the highest quality and easiest to recover due to its 'softness' is located in a section of the crystallization pond where the plant effluent (comprising a sodium carbonate monohydrate purge liquor) is flooded over in the wintertime to form sodium carbonate decahydrate by cooling crystallization. Another section of the crystallization pond may contain "hard" deca deposit, which is generally of lower quality and is more difficult to recover. Because the mother liquor pond is generally fed by a "run off" from the crystallization pond, both the pond liquor and the pond deposit in the mother liquor pond have very high impurities contents, that is to say much higher than the deposit from the crystallization pond. Due to the differences in the impurities level in such deposits, in some instances, the deposit formed in the crystallization pond may be referred to as 'impurities-lean' deposit, while the other deposit formed in the mother liquor pond may be referred to as 'impurities-laden' deposit.

If the pond deposit is not removed from a pond, it eventually fills the available pond volume until an increase in pond volume must occur, such as by raising existing dikes, expanding the existing pond, or by constructing a new pond. It would be beneficial to recover and use the pond deposit mass from the tailings pond(s), as the removal of this solid mass would free up previously filled volume in the tailings pond(s). Since the recovered pond deposit mass contains valuable sodium carbonate content that would otherwise have to be mined, it would be beneficial to recycle the recovered pond solid to a process for the manufacture of soda ash, sodium bicarbonate, and/or other valuable sodium-containing derivative products (such as sodium sulfite).

However it was observed that while some 'deca' deposit ('impurities-lean' deposit) may have low content in NaCl and/or $Na_2SO_4$ (e.g., lower than 2 wt. %), other pond deposits do have quite an excessive amount of NaCl and/or $Na_2SO_4$ (e.g., higher than 2 wt. % or even higher than 4 wt. %) and are not currently being recovered to be repurposed because the sodium chloride and/or sodium sulfate content is too high which would cause operational upsets and may cause product quality issues.

Additionally, Applicants have found that the propensity of fines formation in a soda ash product was even greater when a 'deca' pond solid was recycled to a soda ash process such as by dissolving it in an aqueous medium to serve as a feedstock to the sodium carbonate monohydrate crystallizer. It is believed that the soda ash product degradation was due to the higher amount of impurities being carried over from the recovered pond solid. For example, it has been found that while a calcined trona liquor may contain about 70 ppm silica, a recovered 'deca' pond solid may contain about 600 ppm silica. When 10% of the crystallizer feedstock is made from dissolved recovered 'deca' pond solid with the remainder being the dissolved calcined trona, there is almost a doubling in the ppm silica level in the resulting solution. Consequently, the impact of impurities is even more felt when the recovered 'deca' pond solid is recycled to the soda ash plant as a feedstock for crystallization.

Applicants have further observed that propensity of foam formation in the sodium carbonate monohydrate crystallizer was an additional operational issue which was even more prominent when a 'deca' solid recovered from a tailings crystallization pond was recycled to the soda ash process to serve as part of a monohydrate crystallizer feed. It is suspected that the greater foam incidence with this recycle was due to water-soluble organics which were carried over from the recycled 'deca' solid.

In addition to the soda ash production process, other processes utilizing saturated or near-saturated sodium carbonate-containing solutions as feedstocks to make derivative products may be impacted by water-soluble impurities present in such solution, particularly if a portion of such solution contains a dissolved pond solid such as a recovered solid comprising sodium carbonate decahydrate. Examples of such processes include a sodium sulfite production process which may use a sodium carbonate-containing solution as feedstock to the sulfite reactor, and/or a sodium bicarbonate production process which may use a sodium carbonate-containing solution as feedstock to the bicarbonate reactor. Such process includes forming sodium sulfite or bicarbonate by reaction of a sodium carbonate-containing solution with sulfur dioxide or carbon dioxide gas, respectively. Sodium sulfite crystals are typically formed in a sulfite crystallizer, while the sodium bicarbonate crystals are typically formed in the bicarbonate reactor at the same time as the reaction with $CO_2$ takes place.

Since the sodium carbonate feedstock contains water-soluble impurities, these impurities concentrate and precipitate in the sodium sulfite or bicarbonate process which may negatively impact the final product quality. For example, there are quality specifications limiting water insoluble matter in photo-grade sodium sulfite imposed by ISO 418 Photography—Processing chemicals—Specifications for anhydrous sodium sulfite. The removal of impurities before they can contaminate the final crystalline sodium sulfite product would allow the sodium sulfite process which uses dissolved calcined trona and/or dissolved pond solid (such as comprising sodium carbonate decahydrate) as sodium carbonate feedstock(s) to make a photo-grade sodium sulfite.

It is thus apparent that a need exists for a more effective method for reusing a waste solid in a process to form a final product comprising sodium carbonate, bicarbonate and/or sulfite, but wherein the waste contains water-soluble impurities which may cause a negative impact on product quality and/or on operation of the process. A need exists for obtaining a less-friable crystalline anhydrous sodium carbonate product or a photo-grade crystalline sodium sulfite or a bicarbonate product with a reduced impurity content from an impure feedstock solution which comprises water-soluble impurities (e.g., sodium chloride, sodium sulfate, silicates, organics) originating from the recovered waste solid and/or from calcined trona ore. There is also a need to minimize operating costs by reducing downtime for maintenance of equipment which is exposed to impurities (due to cleaning of scale). There is also a need to minimize loss of soda ash values by recycling a crystalline sodium-containing deposit recovered from a waste pond and carrying impurities, yet without impacting the quality and yield of salable soda ash product or the quality of other derivatives (e.g., sodium sulfite, sodium bicarbonate, sodium sesquicarbonate) which are made from sodium carbonate-containing solutions, particularly those comprising the recycled waste solid. There is also a need to reduce operational issues such as scaling of equipment, foaming in crystallizer(s) created at least in part from the reintroduction of impurities such as sodium chloride, sodium sulfate, silicates and/or organics when recycling a waste solid recovered from a tailings pond and optionally from a secondary crystallizer.

SUMMARY OF THE INVENTION

To address one or more of the issues discussed above, the present invention includes the valorization of a waste solid containing water-soluble impurities by using a method to remove some of these impurities from the solid (thereby reducing the impurities content in the solids) before feeding the so formed valorized matter to a process in order to form a final product.

A first embodiment of the present invention relates to a method for reducing the content in water-soluble impurities originating in a waste solid to make it suitable for use as a feedstock to a process that produces a crystalline product comprising sodium carbonate, sodium bicarbonate, or sodium sulfite.

A second embodiment of the present invention relates to a process for making a crystalline product comprising sodium carbonate, sodium bicarbonate, or other derivatives, which comprises the method for reducing the content in impurities originating in the waste solid.

Such impurity removal method increases the value of the waste solid by rendering it more acceptable as a feed to the process, especially when some of these water-soluble impurities present in the waste solid may negatively impact the product quality and/or cause operational difficulties in the process.

For reducing the impurities content of such pond (waste) solid, the removal method preferably includes a leaching method on the waste solid which preferably contains sodium values, such as sodium carbonate and/or bicarbonate in an anhydrous or hydrated form. The leaching step includes contacting the waste solid with a leach medium or solution whose impurity content is about the same or lower than that of the waste solid (preferably being leaner in impurity), the contacting step being effective to reduce the content in at least one water-soluble impurity (e.g., sodium chloride, sodium sulfate, and/or organic matter measured as total organic carbon, and optionally silicates) in the leached residue (solid) and to form a leachate (liquid) which is generally enriched in such impurity. The method may include a two-step process: a first step being the leaching step carried out on the pond (waste) solid to reduce the content in at least a first impurity and to form a leached residue and a second step being a magnesium treatment performed on the leached residue during or after its dissolution in an aqueous medium to reduce the content in at least a second impurity.

The leaching step includes contacting a mass of the waste solid with a leach medium or solution, the contacting step being effective to reduce the content in at least one water-soluble first impurity (e.g., sodium chloride, sodium sulfate, and/or total organic carbon) in the leached residue (solid) and to form a leachate (liquid) which is generally enriched in such first impurity. In the leach medium or solution, the content in the first impurity is preferably about the same or lower than that of the waste solid. The leach medium or solution is preferably leaner in the first impurity than the waste solid.

The magnesium treatment step may be carried out on the leached residue during or after its dissolution in order to form a treated liquor. Such magnesium treatment may comprise adding a magnesium compound to a liquor in which at least a portion of the leached residue was dissolved or to a liquor in which at least a portion of the leached residue is dissolving. The magnesium treatment step should be effective in forming water-insoluble matter with at least a portion of a second impurity selected from the group consisting of silicates, organics, and combinations thereof and thus reducing the content of water-soluble second impurity in the treated liquor.

The method may further include passing the liquor (or the treated liquor after the optional magnesium treatment) though at least one separation unit to obtain a purified solution.

The resulting purified solution may serve as at least a portion of a feedstock to a process which produces crystalline sodium carbonate, sodium bicarbonate, sodium sulfite, or other sodium derivatives which may be obtained from a sodium (bi)carbonate solution. For example, the purified solution (or a portion thereof) may be passed to a reactor and/or a crystallizer under conditions suitable to form a crystalline product comprising sodium carbonate, sodium sulfite, or sodium bicarbonate.

A particular embodiment of the present invention relates to a method for reducing the content of impurities in a waste solid thereby allowing it to be used as a feed to a process which produces crystalline sodium carbonate, sodium bicarbonate, sodium sulfite, or other derivatives, comprises the following steps:

providing a mass of a waste solid comprising a pond solid recovered from a waste pond, such pond solid comprising impurities selected from the group consisting of sodium chloride, sodium sulfate, silicates, organic matter, and combinations of two or more thereof, such pond solid further comprising one sodium compound selected from the group consisting of sodium carbonate decahydrate, sodium carbonate monohydrate, sodium carbonate heptahydrate, sodium bicarbonate, sodium sesquicarbonate, and any combinations of two or more thereof;

contacting the waste solid mass with a leach solution to selectively dissolve at least a portion of a first impurity from the contacted mass into the leach solution to form a leachate and a leached residue;

optionally repeating the contacting step with at least a portion of the leachate for a predetermined amount of time or until the content of the first impurity in the leachate or in the leached residue reaches a predetermined value;

collecting the leached residue;

dissolving at least a portion of the leached residue in an aqueous medium to form a liquor;

optionally carrying out a second impurity removal step comprising performing a magnesium treatment to form a treated liquor, such treatment comprising adding a magnesium compound during dissolution of the leached residue or adding a magnesium compound to the liquor or a portion thereof after dissolution of the leached residue, in order to form water-insoluble matter with at least a portion of a second impurity, and then passing the treated liquor though at least one separation unit to remove water-insoluble matter and to obtain a purified solution; and wherein at least a portion of the liquor or the purified solution provides a feedstock to a process which produces a crystalline product comprising sodium carbonate, sodium bicarbonate, sodium sulfite, or other derivatives.

The first impurity removed by the leaching step and the second impurity which is optionally removed by the optional magnesium treatment may be the same or different. The first impurity to be removed from the mass preferably comprises sodium chloride, sodium sulfate, or both. The second impurity to be removed from the mass preferably comprises silicates.

The waste solid may comprise or consist of a pond deposit recovered from a tailings pond and/or a solid recovered from a crystallizer. The waste solid preferably comprises or consists of a pond deposit recovered from a tailings pond. The waste solid mass may comprise or may consist essentially of a mass of a pond deposit recovered from a waste pond, or two or more masses of solid pond deposits recovered from the same waste pond or from different waste ponds.

The waste solid or pond solid comprises one sodium salt selected from the group consisting of sodium carbonate decahydrate, sodium carbonate monohydrate, sodium bicarbonate, sodium carbonate heptahydrate, sodium sesquicarbonate, and any combinations of two or more thereof. The waste solid or pond solid preferably comprises sodium carbonate (preferably in decahydrate form), sodium bicarbonate, sodium sesquicarbonate, or any combinations of two or more thereof. The pond solid may comprise sodium carbonate decahydrate, and its content in sodium carbonate is between 5 wt. % and 38 wt. %, or may comprises sodium bicarbonate in an amount up to about 40 wt. %. In some embodiments when the waste solid mass comprises at least in part a solid recovered from a tailings pond, the waste solid mass may further comprise mined ore (e.g., crushed trona ore), calcined ore (e.g., calcined trona), a solid recovered from a crystallizer (e.g., crystalline product not passing quality control and/or which may not be suitable for sale), or any combinations thereof. The waste solid mass which is contacted with the leach solution preferably excludes mined ore or calcined ore, such as trona ore or calcined trona.

The waste solid mass may be subjected to a size reduction step before being contacted with the leach solution.

The waste solid or pond solid may comprise at least the first and second impurities. The first and second impurities are selected from the group consisting of sodium chloride, sodium sulfate, silicates, organic matter, and combinations of two or more thereof. The first and second impurities may be the same, but preferably are different. The first impurity to be removed in the first step may comprise a compound selected from the group consisting of sodium chloride, sodium sulfate, organic matter, and combinations of two or more thereof, and the second impurity to be removed in the optional second step may comprise a compound selected from the group consisting of silicates, organic matter, and combinations thereof. In preferred embodiments, the first impurity to be removed in the first step may be sodium chloride, sodium sulfate, or both, and the second impurity to be removed in the optional second step may be silicates, organic matter, or both.

The contacting step may comprise at least one step selected from the group consisting of:

percolation leaching;

suspending the waste solid mass in particulate form into the leach solution to form a slurry;

flowing the leach solution downward through a packed bed of the waste solid mass;

flooding a packed bed of the waste solid mass by flowing the leach solution upward through the packed bed;

counter-current leaching in which the waste solid mass is moved in one direction while the leach solution contacting the moving mass is moved in another direction; and any combinations of two or more of these steps.

The contacting step preferably comprises percolation leaching.

Percolation leaching may comprise heaping the waste solid mass onto a liquid-impermeable substrate which is inclined from the horizontal; dispersing the leach solution through a distribution system whereby the leach solution is sprayed onto the heaped mass; and collecting the leachate after percolation through the heaped mass. The liquid-impermeable substrate is preferably inclined from the horizontal at an angle equal to or less than the angle of repose of the waste solid mass. The distribution system may comprise at least one solution dispersing component selected from the group consisting of spray nozzle, impact sprinkler, perforated pipe, porous pipe, slotted pipe, split pipe, and irrigation system with a plurality of solution dispersing components.

Percolation leaching may comprise placing the mass of the waste solid into a vessel; dispersing the leach solution through a distribution system near or at the top of the vessel whereby the leach solution is sprayed onto the mass and passes downward therethough; and collecting the leachate after percolation through the mass at the bottom of the vessel.

The leach solution preferably has a content in the (first) impurity to be removed equal to or less than the (first) impurity content of the waste solid mass.

The leach solution may comprise a purge liquor exiting a sodium bicarbonate crystallizer, a purge liquor exiting a sodium carbonate monohydrate crystallizer, a mine water, a weak liquor, or any combinations thereof.

The aqueous medium in which the leached residue is dissolved to make the liquor may be a purge liquor exiting a sodium bicarbonate crystallizer, and wherein the liquor (or the purified solution if the magnesium treatment is performed) is used as a feedstock in a sodium bicarbonate plant employing the sodium bicarbonate crystallizer.

The dissolution of the leached residue may form a liquor unsaturated in sodium carbonate which comprises less than 20 percent sodium carbonate.

The method may further comprise passing the liquor though at least one separation unit to remove water-insoluble matter and to obtain a purified solution. The separation step may include passing the liquor through a separation unit selected from the group consisting of a classifier, a thickener, a filter, any plurality thereof, and any combinations thereof. The separation step preferably includes passing the liquor through a classifier for removing some of the water-insoluble matter and for recovering a classifier overflow; feeding the classifier overflow to a thickener to remove additional water-insoluble matter; and filtering the thickener overflow in a filtration unit to provide the purified solution.

The method may further comprise dissolving calcined trona in the liquor after dissolving the leached residue or may further comprise dissolving calcined trona during dissolution of the leached residue. When the second impurity removal step is carried out, the dissolution of calcined trona may be carried out before or after the addition of the magnesium compound; and it is preferred to carry out the dissolution of calcined trona before the separation which removes some of the water-insoluble matter from the treated liquor. In such embodiments, the resulting liquor or purified solution can be used as a feedstock in a soda ash plant employing a sodium carbonate monohydrate crystallizer.

In some embodiments, the second impurity removal step is performed, and the second impurity removal step comprises adding a magnesium compound during dissolution or to the liquor or portion thereof after dissolution in order to form water-insoluble matter with at least a portion of a second impurity, and passing the treated liquor though at least one separation unit to remove water-insoluble matter and to obtain a purified solution. The magnesium compound comprises or consists essentially of one or more water-soluble magnesium salts. The magnesium compound may comprise or consist essentially of magnesium chloride. In such embodiment, the method includes a separation step which comprises passing the treated liquor through a classifier, a thickener, a filter, any plurality thereof, and any combinations thereof for removing some of the water-insoluble matter to provide the purified solution. The separation step preferably includes passing the treated liquor through a classifier for removing some of the water-insoluble matter and for recovering a classifier overflow; feeding the classifier overflow to a thickener to remove additional water-insoluble matter; and filtering the thickener overflow in a filtration unit to provide the purified solution.

The method may further comprise forming a pond deposit in a waste pond and recovering at least a portion of the pond deposit to provide at least a part of the waste solid mass. The recovered mass of pond solid may be crystallized material from a liquid waste originating from a process and is recycled to the same process after the waste solid is subjected to such impurity removal method.

Alternatively, the waste solid may be crystallized material originating from a liquid waste of a first process, and it is directed to a second process after being subjected to the impurity removal method according to the present invention rendering the valorized matter an acceptable feedstock to the second process. For example, a waste solid which is recovered from a pond receiving a soda ash plant effluent and which is subjected to the impurity removal method according to the present invention may be used as a feedstock in the same soda ash plant or may be used as a feedstock in another process for the production of sodium bicarbonate, sodium sesquicarbonate, or sodium sulfite. A waste solid recovered from a pond receiving a waste effluent from a co-production plant (e.g., co-production of soda ash/sodium bicarbonate, or of soda ash/sodium sulfite, or of soda ash/sodium bicarbonate/sodium sulfite) and which is subjected to the impurity removal method according to the present invention may be used as a feedstock in any or all of the processes which make soda ash, sodium bicarbonate, sodium sesquicarbonate, and/or sodium sulfite.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 2c illustrates a system for a leaching method employing a packed bed of pond (waste) solid placed in a non-agitated vessel and employing a leach solution distribution system according to a third embodiment of the present invention;

FIG. 2d illustrates a system for a leaching method employing a flooded packed bed of pond (waste) solid placed in a non-agitated vessel and employing a leach solution distribution system flowing upward through the packed bed according to a fourth embodiment of the present invention;

FIG. 2e illustrates a system for a leaching method employing a moving mass of pond (waste) solid in a countercurrent fashion to the flow of leach solution according to a fifth embodiment of the present invention;

DEFINITIONS AND NOMENCLATURES

Figure 1:
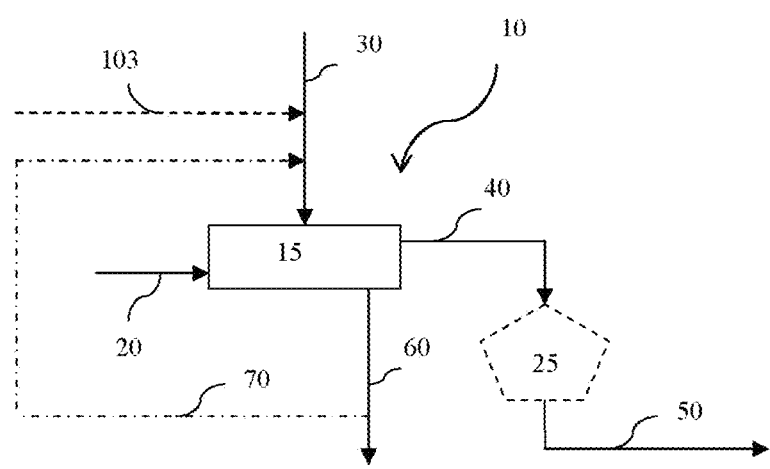
FIG. 1 illustrates a system for a leaching method which includes an optional drying step and an optional leachate recycle according to the present invention.

For purposes of the present disclosure, certain terms are intended to have the following meanings.

The term "solubility" refers to the water solubility of a compound in an aqueous solution or liquor.

The terms "recovered solid" or "reclaimed solid" (e.g., recovered sodium carbonate decahydrate) can be used interchangeably, and both refer to a solid which is excavated from a tailings pond or recovered from a mechanical crystallizer (e.g., a decahydrate or bicarbonate crystallizer).

The terms "recovered deca" or "reclaimed deca" can be used interchangeably, and both refer to a solid comprising sodium carbonate decahydrate and which is excavated from a tailings pond or recovered from a mechanical decahydrate crystallizer.

The term "deca deposit" in the present application refers to a solid deposit which comprises sodium carbonate decahydrate and which is excavated from a tailings (waste) pond. Such "deca deposit" may further comprise other sodium salts such as sodium bicarbonate and/or sodium sesquicarbonate.

The term "pond deposit" in the present application refers to a deposit in a tailings (waste) pond. Such "pond deposit" may comprise sodium carbonate decahydrate, sodium bicarbonate, and/or sodium sesquicarbonate.

The term "TA" or "Total Alkali" as used herein refers to the weight percent in solution of sodium carbonate and/or sodium bicarbonate (which latter is conventionally expressed in terms of its equivalent sodium carbonate content). For example, a solution containing 17 weight percent $Na_2CO_3$ and 4 weight percent $NaHCO_3$ would have a TA of 19.5 percent.

DETAILED DESCRIPTION OF THE PREFERRED EMBODIMENTS

One of the objectives of the present invention is the reduction in the impurities content of a waste solid by a two-step method employing a leaching step performed on a mass of waste solid to make a leached residue and a magnesium treatment step carried out on the leached residue to yield a purified solution which may be used as a crystallizer feedstock and/or as a reactant to make one or more crystalline products comprising sodium carbonate, sodium sulfite, sodium bicarbonate, or other derivatives.

Other objectives include improvement in product quality by improving crystallization conditions and in increasing crystallization uptime due to less operational issues due to scale formation and/or foaming caused by too high content in some impurities.

It is to be understood that any equipment or step or stream described in this specification in the context of one embodiment of either of the two impurities removal steps or their combination according to the present invention may be used or interchanged in the context of another embodiment, unless it is explicitly stated otherwise.

Preferred embodiments of the present invention relate to a system and a process for the production of crystalline sodium carbonate, sodium bicarbonate, sodium sulfite, other derivatives or combinations of two or more thereof, in which a leaching method is carried out on a waste solid comprising a pond solid for the purpose of removing (at least partially) water-soluble impurities originating from the pond solid. A source of such pond solid may be a pond deposit containing at least one sodium compound which is recycled to the process for the production of crystalline sodium carbonate, sodium bicarbonate, sodium sulfite, other derivatives, or combinations of two or more thereof. The water-soluble impurities may be sodium chloride, sodium sulfate, silicates, and/or various organic matter.

Forming the pond solid or deposit may comprise feeding to the waste pond a plant effluent (generally being considered a liquid waste). The waste pond may be a crystallization tailings pond or a mother liquor pond as described previously. The plant effluent (liquid waste) generally comprises one sodium compound selected from the group consisting of sodium carbonate, any hydrate thereof, sodium bicarbonate, sodium sesquicarbonate, and any combinations of two or more thereof. The plant effluent (liquid waste) generally comprises water-soluble impurities (generally the same water-soluble impurities as in the waste solid and pond solid/deposit), and further comprises sodium carbonate and/or sodium bicarbonate. The plant effluent feeding the waste pond may comprise or may consist of one or more purge liquors; a mine water (e.g., longwall water); a boiler scrubber water, and/or any other plant effluent that needs to be disposed of; or may comprise or may consist of a mixture which comprises two or more of these streams. The purge liquor preferably exits a crystallizer (e.g., a sodium carbonate monohydrate, a sodium carbonate decahydrate crystallizer, a sodium bicarbonate reactor/crystallizer, a sodium sulfite crystallizer). By 'mine water' is understood the water solution which is formed when water is directly injected into a trona ore deposit, whereby, on contact with the water, some ore dissolves in the water to form the mine water. When the mining technique employs a longwall technique, the mine water may be referred to as 'longwall water'.

For formation of a crystalline pond deposit, the waste pond is generally operated under suitable crystallization conditions for making at least one crystalline sodium salt selected from the group consisting of sodium carbonate decahydrate, sodium carbonate monohydrate, sodium bicarbonate, sodium sesquicarbonate, sodium carbonate heptahydrate, and combinations of two or more thereof, preferably for making at least one crystalline sodium salt selected from the group consisting of sodium carbonate decahydrate, sodium bicarbonate, sodium sesquicarbonate, and combinations of thereof. Insoluble matter deposits at the bottom of the pond to form the pond deposit, and such formed crystalline sodium salt generally provides the bulk of the pond deposit. The deposit which is formed and settles out in the pond may comprise a sodium salt selected from the group consisting of sodium carbonate decahydrate, sodium carbonate monohydrate, sodium carbonate heptahydrate, sodium bicarbonate, sodium sesquicarbonate, and any combinations of two or more thereof, but preferably comprises a sodium salt selected from the group consisting of sodium carbonate decahydrate, sodium bicarbonate, sodium sesquicarbonate, and any combinations thereof.

The pond solid may be recovered from a tailings pond by excavation with a trackhoe or other machinery which is capable to break and/or scrape a portion of the pond deposit and dig the loose mass out to subject it to leaching. The excavation of the pond solid is preferably (however not necessarily) done after the supernate liquor is drained from the pond. The recovered mass of pond solid may be stored as one or more piles or heaps on top of unexcavated pond deposit, on the bank of the pond and/or besides the pond. The recovered mass of pond solid may be left idle before starting the leaching method in order for excess pond liquor to drain off into the pond.

The recovered mass of pond solid may be weathered, that is to say, it will be subjected to rainwater percolation (by rain, snow, hail) to dissolve some impurities, before or after the recovered mass of pond solid is subjected to a leaching step which uses a leach solution containing sodium carbonate and/or bicarbonate. In some embodiments, the leaching step may comprise or may consist of rainwater percolation to dissolve some impurities to provide the leached residue.

The waste solid containing the pond solid may further comprise a solid recovered from a crystallizer, such as a mechanical decahydrate crystallizer. A soda ash plant may comprise a mechanical decahydrate recovery system to allow recovery of at least a portion of a sodium carbonate decahydrate solid that would otherwise be deposited in a pond. Once a mass of sodium carbonate decahydrate solid is recovered from the mechanical decahydrate recovery system, this 'deca' solid mass can be subjected to the two-step impurity removal method, such as in silos, in tanks (agitated or not), or in piles or heaps, before being recycled; or it can be stored, such as in silos, tanks or piles or heaps, before being subjected to the two-step impurity removal method, and then recycled to the plant producing soda ash and/or sodium bicarbonate.

Another source of solids (which may also comprise water-soluble impurities) in the waste solid may be mined ore (e.g., trona, nahcolite) or calcined ore which, in dissolved form, may provide feedstock(s) in a process making soda ash, sodium bicarbonate, or other derivative products. The waste solid mass which is subjected to leaching preferably contains less than 25% in weight or less than 10% in weight of the mined or calcined ore. In some embodiments, when the waste solid contains trona ore or calcined trona, the majority of the waste solid is at least a pond solid recovered from a waste pond. However, the waste solid mass preferably excludes mined ore, such as trona ore. Alternatively or additionally, the waste solid mass excludes calcined ore, such as calcined trona. The waste solid mass which is subjected to leaching more preferably excludes mined trona and calcined trona.

The waste solid or pond solid may comprise sodium carbonate, any hydrate thereof, sodium sesquicarbonate, sodium bicarbonate, or mixtures thereof. The waste solid mass preferably comprises sodium carbonate decahydrate, sodium bicarbonate, sodium sesquicarbonate, or any mixtures thereof. The waste solid or pond solid more preferably comprises sodium carbonate decahydrate, sodium bicarbonate, or any mixtures thereof. In some embodiments, the waste solid or pond solid comprises sodium carbonate decahydrate, and optionally a sodium compound selected from the group consisting of sodium carbonate monohydrate, sodium carbonate heptahydrate, sodium sesquicarbonate, sodium bicarbonate, and combinations thereof. In other embodiments, the waste solid or pond solid comprises sodium bicarbonate and/or sodium sesquicarbonate, and optionally a sodium compound selected from the group consisting of sodium carbonate monohydrate, sodium carbonate heptahydrate, sodium carbonate decahydrate, and combinations thereof.

The waste solid or pond solid may comprise an impurity selected from the group consisting of sodium chloride, sodium, sulfate, organic matter (measured as TOC), silicates, and combinations thereof.

The waste solid or pond solid may contain on average at least 2 weight percent (wt. %) NaCl, or on average at least 4 wt. % NaCl. The NaCl content in the waste solid mass can be as high as 16 wt. %.

The waste solid or pond solid may contain on average at least 1.5 wt. % $Na_2SO_4$, or at least 2 wt. % $Na_2SO_4$. The $Na_2SO_4$ content in the waste solid mass can be as high as 5 wt. %.

The waste solid or pond solid may contain on average at least 500 ppm in TOC, or at least 700 ppm in TOC. The TOC content in the waste solid mass can be as high as 2,000 ppm.

The waste solid or pond solid may contain on average at least 200 ppm Si (counted as silica), or on average at least 250 ppm Si. The Si content in the pond (waste) solid mass can be as high as 2800 ppm Si.

The waste solid or pond solid may contain at least 5 wt. % $Na_2CO_3$, or at least 10 wt % $Na_2CO_3$. The pond (waste) solid mass may contain on average from 5 wt. % to 40 wt. % $Na_2CO_3$. The pond (or waste) solid mass preferably contains on average from 14 wt. % to 38 wt. % $Na_2CO_3$ or may contain on average from 5 wt. % to 15 wt. % $Na_2CO_3$.

The waste solid or pond solid may contain up to 40 wt. % $NaHCO_3$, or up to 20 wt. % $NaHCO_3$, or on average up to 15 wt. % $NaHCO_3$, or on average up to 10 wt. % $NaHCO_3$. The pond (or waste) solid mass preferably contains on average up to 6 wt. % $NaHCO_3$ or on average up to 5 wt. % $NaHCO_3$. The pond (or waste) solid mass may contain at least 2 wt. % $NaHCO_3$.

The waste solid or pond solid may contain at least 5 wt. % of combined $Na_2CO_3$ and $NaHCO_3$. The waste solid or pond solid may contain at most 50 wt. % combined $Na_2CO_3$ and $NaHCO_3$. The waste solid or pond solid may contain on average from 5 wt. % to 45 wt. % combined $Na_2CO_3$ and $NaHCO_3$. The waste solid or pond solid preferably contains on average from 14 wt. % to 44 wt. % combined $Na_2CO_3$ and $NaHCO_3$ or on average from 5 wt. % to 22 wt. % combined $Na_2CO_3$ and $NaHCO_3$.

The waste solid mass may be subjected to a size reduction step before being contacted with the leach solution. The waste solid mass is typically in particulate form (e.g., chunks or irregular shaped pieces) Size reduction may include wet grinding or milling or crushing. In some embodiments, the waste solid mass is in particulate form with an average size of 5 cm (about 2 inch) or less or with an average size of 2.5 cm (about 1 inch) or less. The lower the size of the particulate waste solid, the larger surface area is provided for leaching. The same size reduction step is applicable to a recovered mass of pond deposit and other sources of the waste solid, and may be carried on each source separately or after they are combined to provide the waste solid mass.

In any of or all of the embodiments of the present invention, the leach solution preferably has a content in the first impurity (to be removed) equal to or less than the impurity content of the waste solid or pond deposit.

In any of or all of the embodiments of the present invention, the leach solution may comprise or consist essentially of a source selected from the group consisting of a purge liquor exiting a crystallizer, a mine water (e.g., longwall water), a boiler scrubber water, other sources of plant effluents, fresh water, rainwater, and any combinations of two or more thereof, wherein the other plant effluent sources are inherent to a plant making sodium carbonate, bicarbonate, sulfite, or combinations thereof. The purge liquor may exit a crystallizer which produces sodium carbonate, any hydrates thereof (monohydrate being preferred), or sodium bicarbonate. The purge liquor may exit two or more crystallizers, at least one crystallizer producing sodium carbonate or a hydrate thereof (monohydrate being preferred) and another crystallizer producing sodium bicarbonate. Any of the preceding leach solution sources may be excluded from this list. The leach solution may comprise or consist essentially of a purge liquor exiting a sodium carbonate monohydrate crystallizer. Alternatively, the leach solution may comprise or consist essentially of a purge liquor exiting a sodium bicarbonate crystallizer. For practicality, the leach solution may comprise or consist essentially of an effluent from a plant producing soda ash, sodium bicarbonate, sodium sesquicarbonate, and/or sodium sulfite, the plant effluent comprising a mixture of at least two of the following streams: one or more purge liquors exiting one or more crystallizers, mine water, and/or boiler scrubber water.

The contacting step may comprise percolation leaching in which the leach solution is passed in a downward manner through the waste solid mass. The contacting step may additionally or alternatively comprise leaching in a slurry in which the waste solid mass is packed, dispersed or suspended or flooded in the leach solution.

When the contacting step comprises heap percolation leaching, contacting may be carried out via percolation, in which the leach solution is passed through a solid heap. The leach solution is generally distributed (e.g., sprayed or sprinkled) over the heap (pile) of waste solid mass and flows downwards driven by gravity through the heap. The method may comprise heaping the waste solid mass onto a liquid-impermeable substrate which is inclined from the horizontal (whether being placed on a naturally-sloping ground or being placed on an artificially sloped structure); dispersing the leach solution through a distribution system whereby the leach solution is sprayed onto the heaped mass; and collecting the leachate at or near the bottom of the inclined substrate after percolation through the heaped mass. The liquid-impermeable substrate is preferably inclined from the horizontal at an angle $\alpha$ equal to or less than the angle of repose of the waste solid mass, or $\alpha$ being at most 45 degrees, or at most 30 degrees. The distribution system preferably comprises at least one solution dispersing component selected from the group consisting of nozzle, sprinkler head, perforated pipe, porous pipe, slotted pipe, split pipe, and any combinations thereof. The distribution system may comprise an irrigation or sprinkling system with a plurality of solution dispersing components.

The percolation leaching may alternatively comprise placing the mass of the waste solid to form a packed bed into a vessel; dispersing the leach solution inside the vessel above or at the top of the packed bed through a distribution system whereby the leach solution is sprayed onto the mass and moves downward though the packed bed as at least one impurity dissolves into the solution which gets progressively enriched with such impurity; and collecting the leachate after percolation through the packed bed at the bottom of the vessel. The distribution system may comprise at least one solution dispersing component selected from the group consisting of nozzle, spray head, perforated pipe, porous pipe, slotted pipe, and any combinations thereof.

The contacting in the leaching method may be carried out via flooding a packed bed of recovered solid mass, in which the leach solution is flowing upward through the packed bed.

The contacting in the leaching method may be carried out via counter-current leaching in which the waste solid mass is moved in one direction while the leach solution contacting the moving mass flows in another direction (generally but not necessarily in opposite direction).

The contacting in the leaching method may be carried out via slurry formation, in which divided particles of waste solid are dispersed in the leach solution. In the slurry, the waste solid mass is preferably in particulate form of average size less than 2.5 cm (about 1 inch).

The contacting in the leaching method may be a once-though process or a repetitive process in which at least a portion of the leachate is recycled and contacted again with the recovered solid mass.

The percolation method may be carried out in a batch mode in which the waste solid mass is first placed in a vessel or on top of a liquid-impermeable substrate; is then contacted with the leach medium in a packed bed or a heap, is drained of leachate, and finally removed from the vessel or the liquid-impermeable substrate, to make room for a new batch of waste solid.

In any of or all of the embodiments, the leaching method may be carried out at a temperature between 0° C. and 40° C. The leaching method should be carried out for at least 30 minutes, or may be carried out for at least 1 hour. The leaching method should be carried out for 2 days or less.

The leaching method may be carried out in a manner effective to selectively dissolve at least a first impurity selected from the group consisting of sodium chloride, sodium sulfate, organic matter (measured as Total Organic Carbon), and combinations of two or more thereof. The leaching method may be effective in providing a leached residue with a content in TOC, sodium chloride, or sodium sulfate at least 40% less than that in the waste solid mass before contact. Additionally or alternatively, the method may effective in providing at least 80% reduction in sodium chloride content, and/or in sodium sulfate content.

In any of or all of the embodiments, the leaching method may be effective in reducing the NaCl and/or $Na_2SO_4$ content in the leached residue by at least 40%, or by at least 50%, or by at least 80% or by at least 90%. The leaching method may be effective in reducing the NaCl and/or $Na_2SO_4$ content in the leached residue by less than 99%, or by 95% or less. For example, reducing the NaCl content in the leached residue may vary from about 50% to about 95%. Reducing the $Na_2SO_4$ content in the leached residue may vary from about 50% to about 90%.

The content of other impurities such as silicates may be reduced also by leaching, albeit at a lower efficiency than sodium chloride and sodium sulfate. A reduction in the silicates content (when silicates is a first impurity) can be obtained in the leached residue generally when the Si content in the leach solution is equal to or preferably less than that of the waste solid (pond deposit) which is subjected to leaching. Suitable scenarios for silicates removal by leaching would be for example: a) when the leach solution is quite lean in Si content, typically with a content of less than 80 ppm Si (e.g., longwall or mine water, rainwater), or b) when the waste solid (pond deposit) which is subjected to the present leaching method is a pond solid recovered from a crystallization pond (typically with a Si content of 600 ppm Si or more).

The leached residue preferably has a lower NaCl content than the waste solid before leaching. The leached residue may contain on average at most 4 wt. % NaCl, or on average at most 2.7 wt. % NaCl, or on average at most 2 wt. % NaCl, or on average at most 1 wt. % NaCl. The NaCl content in the leached residue can be as low as 0.1 wt. %.

The leached residue preferably also has a lower $Na_2SO_4$ content than the waste solid before leaching. The leached residue mass may contain on average at most 2.4 wt. % $Na_2SO_4$, or on average at most 2 wt. % $Na_2SO_4$, or on average at most 1.5 wt. % $Na_2SO_4$, or on average at most 1 wt. % $Na_2SO_4$. The $Na_2SO_4$ content in the leached residue can be as low as 0.1 wt. %.

The leached residue preferably also has a lower TOC content than the waste solid before leaching. The leached residue may contain on average at most 1,400 ppm in TOC, or at most 1,100 ppm in TOC. The TOC content in the leached residue can be as low as 500 ppm, and is generally at least 150 ppm.

The leached residue may contain on average from 10 wt. % to 38 wt. % $Na_2CO_3$, and preferably contains on average from 14 wt. % to 38 wt. % $Na_2CO_3$.

The leached residue may contain on average up to 40 wt. % $NaHCO_3$ or on average up to 20 wt. % $NaHCO_3$. The leached residue preferably contains on average from 3 wt. % to 18 wt. % $NaHCO_3$, more preferably contains on average from 5 wt. % to 15 wt. % $NaHCO_3$.

The leached residue may contain on average at least 10 wt. % of combined $Na_2CO_3$ and $NaHCO_3$. The leached residue may contain on average at most 58 wt. % of combined $Na_2CO_3$ and $NaHCO_3$. The leached residue preferably contains on average from 13 wt. % to 43 wt. % of combined $Na_2CO_3$ and $NaHCO_3$.

The method may include collecting the leached residue.

The method may further include dissolving at least a portion of the leached residue in an aqueous medium to form a liquor. The aqueous medium in which the leached residue is dissolved may be an unsaturated sodium carbonate-containing solution, for example a weak liquor or a saturated or near-saturated sodium carbonate-containing solution, for example a crystallizer purge or a liquor in which calcined trona is dissolved. The dissolution of the at least a portion of the leached residue in the aqueous medium may be carried out at the same time or in the same solution as the dissolution of calcined trona. In preferred embodiments, the leached residue or a portion thereof is dissolved first to form the liquor, and then the calcined trona is dissolved in the resulting liquor.

The resulting liquor obtained after dissolution may be saturated or near-saturated in sodium carbonate, i.e., comprising more than 20%, or more than 25% sodium carbonate. The saturated or near-saturated liquor which contains at least in part the dissolved leached residue may also contain dissolved calcined trona.

The resulting liquor obtained after dissolution of the leached residue may be an unsaturated sodium carbonate-containing solution comprising less than 20 percent sodium carbonate, or between 5 percent and 15 percent sodium carbonate.

Optionally the method for removing impurities may further include performing a second step for additional removal of impurities. This optional second step preferably includes a magnesium treatment to form a treated liquor. The magnesium treatment may be carried out during dissolution of the leached residue or may be carried out (after dissolution) on the liquor comprising the dissolved leached residue. The magnesium treatment comprises adding a magnesium compound to the dissolving or dissolved leached residue in order to form water-insoluble matter with at least a portion of a second impurity.

The method may further include passing the treated liquor through at least one separation unit to remove water-insoluble matter and to obtain the purified solution. The separating step in the method may generate a weak liquor stream which may provide at least a portion of the aqueous medium in which the leached residue is dissolved to form the liquor which is then treated with magnesium. The separation step preferably includes passing the treated liquor through a classifier for removing some of the water-insoluble matter and for recovering a classifier overflow; feeding the classifier overflow to a thickener to remove additional water-insoluble matter; and filtering the thickener overflow to provide the purified solution.

At least a portion of the purified solution can provide at least a portion of a crystallizer feed to a process which produces a crystalline product comprising sodium carbonate, sodium sulfite, or sodium bicarbonate.

When the second step is carried out, the magnesium treatment step is generally effective in removing at least a portion of a second impurity which may be different than or the same as the first impurity which is removed by the leaching step.

Both of the impurities removal steps may be effective in reducing the content of organic matter, in which case the second impurity and the first impurity (organic matter) removed by the method are the same.

The method may further comprise dissolving calcined trona with the liquor containing the leached residue or portion thereof before or during or after the optional magnesium treatment, but before the separation step.

When the aqueous medium (used to dissolve the leached residue) is an unsaturated sodium carbonate-containing solution for example a weak liquor, in such embodiment the purified solution may be used as a feedstock in a soda ash plant employing a sodium carbonate monohydrate crystallizer.

When the aqueous medium (used to dissolve the leached residue) is a purge liquor exiting a sodium carbonate monohydrate crystallizer, in such embodiment the purified solution may be used as a feedstock to a sodium bicarbonate crystallizer.

When the leached residue comprising sodium bicarbonate is dissolved into an aqueous medium, the resulting liquor may provide a feedstock to the sodium bicarbonate reactor/crystallizer.

The liquor may further comprise dissolved calcined trona, wherein the dissolution of calcined trona takes place in the aqueous medium before or during the optional magnesium treatment; or wherein the dissolution of calcined trona takes place in at least a portion of the treated liquor after the optional magnesium treatment.

The optional treatment with the magnesium compound may be carried out on the liquor which is unsaturated in sodium carbonate and comprises less than 20 percent sodium carbonate. Alternatively or additionally, the optional treatment with the magnesium compound may be carried out on the liquor which is saturated or near-saturated in sodium carbonate solution and comprises 20 percent or more sodium carbonate.

In any of or all of the embodiments of the present invention, the optional magnesium treatment may be carried out at a single addition point upstream of a crystallizer making sodium carbonate monohydrate, sodium bicarbonate, or sodium sulfite; or the magnesium treatment may be carried out at two or more points upstream of such crystallizer in the process for the making of crystalline sodium carbonate, sodium bicarbonate, or sodium sulfite.

When the method comprises performing a magnesium treatment step by adding a magnesium compound to a first liquor comprising the dissolved leached residue or portion thereof, the method may further comprise performing a supplemental magnesium treatment step by adding a supplemental magnesium compound to a second liquor, wherein the supplemental magnesium compound may be the same or different than the magnesium compound used to treat the first liquor. The first liquor may be unsaturated in sodium carbonate, while the second liquor may be saturated or near-saturated in sodium carbonate.

In any of or all of the embodiments of the present invention when the second step is performed, the addition of the magnesium compound may be carried out with an effective amount of magnesium with respect to Si present in the liquor which is being treated so as to form water-insoluble magnesium silicate. The effective amount may be in a stoichiometric or sub-stoichiometric or super-stoichiometric amount of magnesium with respect to the amount of Si present in the liquor which is being treated.

In any of or all of the embodiments when the second step is performed, the treatment with the magnesium compound may be carried out at a temperature between 20° C. and 90° C. The treatment with the magnesium compound should be carried out for at least 5 minutes, or may be carried out for at least 20 minutes. The treatment with the magnesium compound may be carried out in a manner effective to disperse the magnesium compound into the liquor, such as with agitation.

In any of or all of the embodiments when the second impurity removal step is performed, the treatment with the magnesium compound may be effective in reducing Si content by at least 4%, or at least 10% or at least 15% or at least 20%. The treatment with the magnesium compound may be effective in reducing Si content by less than 100%, by 95% or less. For example, reduction in Si in the treated liquor may vary from about 20% to about 95%.

In some embodiments when the second impurity removal step is performed, the treatment with magnesium may be effective in achieving a content of less than 100 ppm Si, or 90 ppm Si or less, or 75 ppm Si or less, or even 50 ppm Si or less, in the treated liquor or in the feed entering a crystallizer and/or a reactor.

In alternate embodiments when the second impurity removal step is performed, the treatment with magnesium may be effective in achieving a content of a feed intended for a sodium bicarbonate crystallizer of at least 100 ppm of Si (counted as silica), preferably at least 250 ppm, or at least 500 ppm. Such crystallizer feed though may contain not more than 1,500 ppm Si, preferably not more than 1,000 ppm Si, or more preferably not more than 700 ppm Si.

The magnesium compound used in the second impurity removal step may comprise or consist essentially of one or more water-soluble magnesium salts, preferably comprises or consists essentially of magnesium chloride and/or sulfate. Alternatively, the magnesium compound may comprise or consist essentially of one or more water-insoluble magnesium compounds, such as comprising or consisting essentially of magnesium hydroxide, oxide, carbonate, and/or combinations thereof. Suitable (albeit not limiting) magnesium compounds include magnesium oxide, magnesium hydroxide, magnesium nitrate, magnesium sulfate, magnesium sulfite, magnesium sulfide, magnesium carbonate, magnesium chlorate, magnesium perchlorate, magnesium chloride, any anhydrous or hydrous form thereof, or any combinations of two or more thereof. Any of the preceding magnesium compounds may be excluded from this list. In some embodiments of the method, the magnesium compound may exclude magnesium oxide. In preferred embodiments, the magnesium compound includes at least magnesium chloride and optionally others. In more preferred embodiments, the magnesium compound is magnesium chloride In some embodiments of the method, the treatment with the magnesium compound is preferably carried out with the magnesium compound at least partially dissolved or completely dissolved in water. More than one magnesium compound may be used in the magnesium treatment. When the magnesium treatment employs two or more magnesium compounds, at least one of the magnesium compounds is water-soluble and is dissolved in water when added during the magnesium treatment. When two or more magnesium compounds are used for the treatment, they may be used at the same addition point or may be used at two or more addition points. In preferred embodiments, the magnesium compound is added in the form of a magnesium chloride solution.

The treatment with the magnesium compound may be carried out by adding at least one magnesium compound which is in dry particulate form or is dissolved, dispersed, or slurried in water.

The magnesium treatment may comprise at least one of the following steps selected from the group consisting of:

adding the magnesium compound into a conduit through which the liquor comprising the dissolved leached residue flows;

adding the magnesium compound to a dissolver, the dissolver being used to melt and/or dissolve the leached residue;

adding the magnesium compound to a thickener comprising dissolved leached residue or to an overflow exiting the thickener;

adding the magnesium compound to a weak liquor stream comprising dissolved leached residue;

adding the magnesium compound to a weak liquor tank, the weak liquor tank comprising dissolved leached residue and a weak liquor exiting a thickener;

adding the magnesium compound to a leach tank, the leach tank being used to dissolve calcined trona with at least a part of the liquor comprising the dissolved leached residue;

adding the magnesium compound to a saturated or near-saturated liquor comprising dissolved leached residue and dissolved calcined trona;

adding the magnesium compound to a classifier or to an overflow exiting the classifier;

adding the magnesium compound to a bicarbonate purge liquor comprising dissolved leached residue;

adding the magnesium compound to a centrate liquor which is withdrawn from a sodium carbonate monohydrate crystallizer and separated from crystals; and any combinations of two or more of these steps.

Although the magnesium treatment may include adding the magnesium compound to a centrate liquor which contains dissolved leached residue and which is directed to a monohydrate crystallizer, this step is not preferred, since magnesium would be added in the final product and may result in formation of water insolubles where they will do the most damage to the crystallizer heat exchanger. If the magnesium treatment includes adding the magnesium compound to a centrate liquor, a separation step (such as filtration) may be performed on the treated centrate liquor stream in order to remove the water insolubles resulting from such magnesium treatment before the resulting purified centrate liquor is fed to the monohydrate crystallizer.

In some embodiments, the magnesium treatment preferably excludes adding a magnesium compound to the sodium carbonate monohydrate crystallizer for the purpose of removing impurities such as silicates and/or foaming causing organics present in the crystallizer feed.

According to one embodiment with only the first impurity removal step being carried out, the method comprises dissolving the leached residue or a portion thereof in the aqueous medium to form a first liquor which is unsaturated in sodium carbonate; and forming a second liquor by dissolving calcined trona into at least a portion of the first liquor, such second liquor being saturated or near-saturated in sodium carbonate. The method may further comprise performing at least one of the crystallization steps:

passing a first crystallizer feed comprising at least a portion of the second liquor through a sodium carbonate monohydrate crystallizer under crystallization promoting conditions to form sodium carbonate monohydrate crystals;

passing at least a portion of the second liquor comprising sodium carbonate to a sodium sulfite plant where sodium carbonate is reacted with sulfur dioxide to form a sodium sulfite-containing stream and then passing a second crystallizer feed comprising at least a portion of the sodium sulfite-containing stream through a sodium sulfite crystallizer under crystallization promoting conditions suitable to form sodium sulfite crystals;

passing a third crystallizer feed comprising at least a portion of the second liquor and/or at least a portion of a purge liquor comprising sodium carbonate through a sodium bicarbonate crystallizer under crystallization promoting conditions comprising passing carbon dioxide to form sodium bicarbonate crystals, optionally the purge or mother liquor exiting a sodium carbonate monohydrate crystallizer.

According to one embodiment with a two-step impurity removal, the method comprises dissolving the leached residue or a portion thereof in the aqueous medium to form a first liquor which is unsaturated in sodium carbonate; forming a second liquor by dissolving calcined trona into at least a portion of the first liquor, such second liquor being saturated or near-saturated in sodium carbonate; performing a magnesium treatment by adding a magnesium compound to at least a portion of the first liquor or to at least a portion of the second liquor or to both to form water-insoluble matter (precipitates and/or complexes) with at least a portion of the second impurity (preferably silicates); and then passing the second liquor (saturated or near-saturated), at least a portion of which has been treated with magnesium, through at least one separation unit to remove water-insoluble matter and to obtain the purified solution. The method may further comprise performing at least one of the crystallization steps:

passing a first crystallizer feed comprising at least a portion of the purified solution through a sodium carbonate monohydrate crystallizer under crystallization promoting conditions to form sodium carbonate monohydrate crystals;

passing at least a portion of the purified solution comprising sodium carbonate to a sodium sulfite plant where sodium carbonate is reacted with sulfur dioxide to form a sodium sulfite-containing stream and then passing a second crystallizer feed comprising at least a portion of the sodium sulfite-containing stream through a sodium sulfite crystallizer under crystallization promoting conditions suitable to form sodium sulfite crystals;

passing a third crystallizer feed comprising at least a portion of the purified solution and/or at least a portion of a purge liquor comprising sodium carbonate through a sodium bicarbonate crystallizer under crystallization promoting conditions comprising passing carbon dioxide to form sodium bicarbonate crystals, optionally said purge or mother liquor exiting a sodium carbonate monohydrate crystallizer.

The method may further include recovering and drying the crystals comprising sodium carbonate or comprising sodium sulfite or comprising sodium bicarbonate to form a final product.

For a soda ash plant, the present method is useful in minimizing maintenance of equipment particularly of the crystallizer heat exchanger.

The present invention is particularly advantageous to minimize soda ash product friability when a reclaimed solid comprising crystalline sodium carbonate decahydrate, generally formed from a crystallizer purge stream in a pond or a decahydrate crystallizer, is recycled into the soda ash production plant to produce additional salable product without sacrificing product quality. Reducing friability of the soda ash is not only beneficial for the product sizing and customers, but also it increases production capacity as some of these broken crystals (fines) get recycled back to the crystallizer either as solution or crystals. If fines are removed from the final product and dissolved in water or a weak liquor solution, they need to be recrystallized and dried, both of these steps cause a reduction of capacity; or if fines are recycled in the form of crystals, they will rehydrate and need to be dried causing a reduction of capacity.

For a sodium sulfite production, the present invention is also advantageous to produce a crystalline sodium sulfite product with a reduced impurities content resulting in improved quality.

In some embodiments of a process for producing crystalline sodium sulfite, the method may include reacting at least a portion of the liquor with dissolved leached residue or the purified solution (after separation) with sulfur dioxide to form a sodium sulfite stream; passing the sodium sulfite stream through a crystallizer under crystallization promoting conditions suitable to form crystals of sodium sulfite; and drying the crystals to form a crystalline sodium sulfite final product. The crystalline sodium sulfite final product preferably meets photo-grade specifications.

In alternate or additional embodiments of the present invention which produces crystalline sodium sulfite, an optional magnesium treatment may be carried out on an aqueous solution that comprises sodium sulfite before the sodium sulfite crystallization, wherein an aqueous sodium sulfite-containing solution is being formed by reaction of sodium carbonate and sulfur dioxide. Or the optional magnesium treatment may be carried out before the reaction step, for example on a sodium carbonate-containing solution comprising at least a portion of dissolved leached residue to provide the treated sodium carbonate-containing solution which is then purified to provide at least a portion of sodium carbonate reactant to the sodium sulfite process.

For a sodium bicarbonate production, the present invention is also advantageous to produce a crystalline sodium bicarbonate product with a reduced impurities content.

In some embodiments of the present invention which produces crystalline sodium bicarbonate, sodium bicarbonate may be formed by reaction of sodium carbonate and carbon dioxide. At least a portion of the liquor (with dissolved leached residue) which contains sodium carbonate may be reacted with carbon dioxide to provide crystalline sodium bicarbonate. When the second impurity removal step is performed, the addition of the magnesium compound may be performed before the reaction step, for example by reacting at least a portion of the purified solution with carbon dioxide to provide at least a portion of a sodium bicarbonate-containing crystallizer feed.

In some embodiments, a monohydrate purge liquor stream exits a sodium carbonate monohydrate crystallizer, and the method may further comprise feeding at least a portion of the monohydrate purge liquor stream to a tailings pond whereby crystals are formed via evaporative and/or cooling crystallization resulting in a deposit contaminated with water-soluble impurities including sodium chloride, sodium sulfate, silicates and/or organics; recovering at least a portion of such deposit to provide a recovered solid; subjecting the recovered solid to the leaching method to obtain the leached residue; and then optionally subjecting a liquor comprising the dissolved leached residue or a portion thereof to a magnesium treatment and then a separation to form a purified solution which can provide at least a feedstock to the process for making sodium carbonate. The recovered deposit preferably contains sodium carbonate decahydrate.

In alternate or additional embodiments, a bicarbonate purge liquor stream exits a sodium bicarbonate crystallizer, and the method may further comprise storing at least a portion of the bicarbonate purge liquor stream in a tailings pond whereby crystals are formed via evaporative and/or cooling crystallization resulting in a deposit contaminated with water-soluble impurities including sodium chloride, sodium sulfate, silicates and/or organics; recovering at least a portion of such deposit to provide a recovered solid; subjecting the recovered solid to the leaching method to obtain the leached residue; and then optionally subjecting a liquor comprising the dissolved leached residue or a portion thereof to a magnesium treatment and then a separation to form a purified solution which can provide at least a feedstock to the process for making sodium bicarbonate. The recovered deposit preferably contains sodium bicarbonate, sodium sesquicarbonate, and/or combinations thereof.

In other embodiments for the co-production of sodium carbonate and bicarbonate, a first purge liquor stream exits a sodium carbonate monohydrate crystallizer and is passed to a bicarbonate crystallizer (or reactor) under crystallization conditions to form bicarbonate crystals and to form a second purge liquor stream containing water-soluble impurities. The second purge liquor stream exiting the sodium bicarbonate crystallizer is then passed to a tailings pond under crystallization conditions to form a pond deposit comprising sodium bicarbonate, sodium carbonate decahydrate, and/or sodium sesquicarbonate and containing these water-soluble impurities, at least a portion of such pond deposit being recovered and being subjected to the leaching method and then to the optional magnesium treatment according to the present invention to reduce its content in impurities (such as sodium chloride, sodium sulfate, silicates and/or organic matter measured as TOC). The leached residue obtained after the leaching step or the purified solution obtained after the optional magnesium treatment is finally recycled in the co-production process, for example as a feedstock to the sodium carbonate monohydrate crystallizer, or to the bicarbonate crystallizer, or both. In some embodiments, the leached residue may be split into two portions before any optional magnesium treatment, one portion intended to provide a feedstock to one crystallizer, while the other portion is intended to provide a feedstock to the other crystallizer. In such instances, it is possible that the magnesium treatment may be omitted on one of these portions, as the content in Si for example with the leaching step may be sufficiently low to be acceptable for one of the crystallizers, thus no need to perform the magnesium treatment step to remove silicates.

Another embodiment of the present invention covers a method of reducing foaming incidence in a sodium carbonate monohydrate crystallizer which is fed by a feed comprising a dissolved leached residue from which the content in impurity has been reduced by the leaching method.

Yet another embodiment of the present invention covers a method of reducing foaming incidence in a sodium carbonate monohydrate crystallizer which is fed by a feed comprising a sodium carbonate-containing purified solution containing a dissolved waste solid from which the content in impurities has been reduced by the leaching step and the magnesium treatment step.

In some embodiments when the leached residue comprises sodium bicarbonate and the leached residue is intended to be fed to a sodium carbonate monohydrate crystallizer or a sodium sulfite reactor, the method according to the present invention may further comprise converting at least a portion of the sodium bicarbonate to sodium carbonate, for example by adding an alkali (e.g., hydroxide) to the liquor comprising the dissolved leached residue (obtained after leaching of the waste or pond solid) either before any optional magnesium treatment or when no magnesium treatment is performed; or by adding an alkali to the purified solution (obtained after leaching and magnesium treatment of the waste or pond solid). In this manner, the more alkaline purified solution can serve as a feedstock to the sodium carbonate monohydrate crystallizer as it will contain less sodium bicarbonate than the sodium bicarbonate saturation point at the monohydrate crystallizer operating temperature. It is preferable that the conversion of sodium bicarbonate to sodium carbonate is carried out after the leached residue dissolved in the liquor is subjected to the magnesium treatment.

In yet other alternate or additional embodiments of a plant which produces crystalline sodium bicarbonate, when the leached residue comprises sodium bicarbonate is intended to be fed to the sodium bicarbonate reactor/crystallizer without further impurity removal by magnesium treatment, it is preferred not to convert the sodium bicarbonate to sodium carbonate in the leached residue-containing liquor (obtained after dissolution).

In yet other alternate or additional embodiments of a plant which produces crystalline sodium bicarbonate, when the leached residue comprises sodium bicarbonate which is then subjected to the magnesium treatment and separation to form a purified solution comprising sodium bicarbonate which is intended to be fed to the sodium bicarbonate reactor/crystallizer, it is preferred not to convert the sodium bicarbonate to sodium carbonate in the leached residue-containing liquor (obtained after dissolution) or purified solution (obtained after magnesium treatment).

The invention will now be described with reference to the drawings.

FIG. 1 illustrates a system 10 for a leaching method according to the present invention, which may include a solid/liquid separation and a leachate recycle. The system 10 includes a leaching unit 15 and an optional solid/liquid separation unit 25. A waste solid mass 20 and a leach solution 30 are fed to the leaching unit 15. A leached (solid) residue 40 and a leachate (liquid) stream 60 exit the leaching unit 15. The leached residue 40 may be sent to the optional solid/liquid separation unit 25 (also called 'residue/leachate separator') in which excess leachate is removed from the wet residue to form a dry solid before it is used as a feedstock to a plant producing a sodium carbonate, sodium bicarbonate, or other derivative products.

The waste solid mass 20 may comprise at least one sodium salt selected from the group consisting of sodium carbonate, any hydrate thereof, sodium sesquicarbonate, sodium bicarbonate, and mixtures of two or more thereof. The waste solid mass 20 preferably comprises sodium carbonate decahydrate, sodium bicarbonate, sodium sesquicarbonate, or any mixtures thereof.

The waste solid mass 20 may comprise or may consist of a mass of a pond solid recovered from a tailings (waste) pond, a mass of solid recovered from a crystallizer (such as other than a sodium carbonate monohydrate crystallizer), a mass of calcined trona, a mass of mined trona, and combinations thereof. The waste solid mass 20 preferably comprises a mass of pond solid recovered from a waste pond, and optionally the other sources of solids listed above. The waste solid mass 20 which is contacted with the leach solution 30 preferably excludes mined ore, such as trona ore. Alternatively or additionally, the waste solid mass 20 which is contacted with the leach solution 30 excludes calcined ore, such as calcined trona. However in some embodiments, the waste solid mass 20 may contain trona ore or calcined trona so long as the majority of the mass 20 is a recovered pond solid.

A solid (crystalline) pond deposit may be formed at the bottom of the pond by passing a plant effluent (liquid waste) to the tailings pond which is under conditions suitable to promote the crystallization of at least one sodium salt selected from the group consisting of sodium carbonate decahydrate, sodium carbonate monohydrate, sodium bicarbonate, sodium sesquicarbonate, sodium carbonate heptahydrate, and combinations of two or more thereof. The waste solid mass 20 recovered from a tailings pond may be excavated with a trackhoe or other machinery which is capable to break and/or scrape a portion of the pond deposit and dig the loose mass out to subject it to leaching. The excavation of the pond solid is preferably (however not necessarily) done after the supernate liquor is drained from the pond. The recovered mass 20 may be stored as one or more piles or heaps on top of unexcavated pond deposit, on the bank of the pond and/or besides the pond. The recovered mass 20 may be left idle before starting the leaching method in order for excess pond liquor to drain off into the pond.

The recovered mass 20 may be weathered, that is to say, it will be subjected to precipitation (rain, snow, hail) to dissolve some impurities by rainwater percolation, before or after the mass 20 is subjected to a leaching step using a sodium carbonate-containing leach solution. The waste solid mass 20 may be subjected to a size reduction step before being contacted with the leach solution 30. Size reduction may include wet grinding or milling or crushing.

Any embodiments described herein throughout the description concerning the waste solid and pond solid/deposit are applicable for the waste solid mass 20, unless specifically stated otherwise.

The leach solution 30 preferably has a lower content in the (first) impurity to be removed by leaching than that of the mass 20 with which is in contact.

Additionally, it is preferred that in the leach solution 30, the concentration of the (first) impurity to be removed by leaching is less than its saturation point.

The leach solution 30 may comprise a crystallizer purge liquor or a portion thereof (e.g., illustrated as stream 103 in FIG. 1, stream 103b in FIGS. 3 & 4, stream 136b in FIG. 5), may comprise a slipstream or all of the leachate stream 60, may comprise mine water (e.g., longwall water) or fresh water or rainwater (not illustrated), and/or may comprise any other aqueous plant effluent. Any individual stream or any combination of these streams can be used as the leach solution 30. In reality, a plant cannot use so many lines to provide the leach solution 30. So in practice, the leach solution 30 will most likely comprise more than one of the streams listed above, such as a mixture of one or more purge liquors exiting crystallizer(s), mine water, wastewater from boiler scrubber (s), and any other plant effluent inherent to the process, wherein the mixture may be withdrawn from a surge or reservoir tank which receives most of or all of these streams from the entire plant. Typical compositions of some of these streams are indicated in TABLE 1.

TABLE 1

Typical compositions for various sources of leach solution.

| Sources of leach solution | $Na_2CO_3$ (wt. %) | $NaHCO_3$ (wt. %) | NaCl (wt. %) | $Na_2SO_4$ (wt. %) | TOC (ppm) |
|---|---|---|---|---|---|
| Sodium Monohydrate Purge Liquor | 19.4-29.2 | 0.2-2.9 | 0-2.7 | 0.1-2.4 | 100-1500 |
| Plant Effluent for Soda Ash Plant | 5-25 | 1-10 | 0.4-3.7 | 0.1-2.1 | 100-1500 |
| Sodium Bicarbonate Purge Liquor | 5-25 | 1-15 | 1-10 | 0.5-2 | 100-1500 |
| Mine (longwall) Water | 3-15 | 1-5 | 1-10 | 0-1 | 100-1500 |
| Plant Effluent for co-production plant | 1-6 | 1-15 | 1-10 | 0.1-2.1 | 100-1500 |

The leach solution 30 may be near saturated or saturated in equivalent sodium carbonate or may be unsaturated in equivalent sodium carbonate. The closer the leach solution 30 is to saturation, the less likely valuable sodium (bi)carbonate salt will dissolve in the leachate. Additionally, the leach solution 30 should have a lower concentration in at least one impurity (which is to be removed) than the solid mass in contact with it. The concentration gradient with respect to that impurity will facilitate the leaching process.

A leach solution 30 may have a very low sodium carbonate content (less than 2%); however its use for removing impurities from the waste solid would result in high dissolution of sodium carbonate, and the sodium carbonate content would decrease in the leached residue.

If the leach solution 30 is unsaturated in equivalent sodium carbonate, it may be envisioned to add unsalable soda ash product to it. Indeed, a soda ash product may be rejected for failure to pass a quality control test and cannot be sold. An example may be when the soda ash product is too fine to pass specification for minimum particulate size. Unsalable soda ash product is typically recycled to the soda ash plant where it is generally redissolved with calcined trona. However, it is possible instead to dissolve at least a part of the unsalable soda ash product into the leach solution 30 to increase its sodium carbonate content to approach or reach saturation in sodium carbonate. This saturation of the leach solution before its use to wash the waste solid mass should reduce the risk of loss of sodium carbonate via dissolution into the leachate.

Any embodiments described herein throughout the description concerning the leach solution are applicable to the leach solution 30, unless specifically stated otherwise.

The leachate stream 60 or a portion 70 of the leachate stream 60 which may be recycled or recirculated to the leaching unit 15 thus also provides at least a portion of the leach solution 30. In that way, the leachate will repetitively contact the solid mass which will dissolve more and more of the impurity into the leachate which becomes more and more enriched in this impurity. In this instance, the leaching method is operated on a recycle mode. The leachate recycling may be carried out for a predetermined period of time (e.g., at least one hour, or up to a day or two days) or may be carried out until the impurity concentration in the leachate reaches a predetermined value which may be a sub-saturation value or may be the impurity saturation point at the operating temperature of the leaching. Alternatively, the leachate recycling may be carried out until the impurity concentration in the leached residue reaches a predetermined value which is known to be acceptable for the leached residue to be recycled as a feedstock in the plant which produces sodium carbonate, sodium bicarbonate and/or sodium sulfite.

When the solid mass contains both very high NaCl and $Na_2SO_4$ contents (for example with a NaCl content higher than 4 wt. % and with a $Na_2SO_4$ content higher than 3 wt. %), the leachate recycling may be carried out until the contents of both impurities in the leached residue are at or below their respective predetermined value known to provide a leached residue as acceptable feedstock to a plant which produces sodium carbonate, sodium bicarbonate and/or sodium sulfite.

The predetermined value for NaCl in the leached residue may range from 4 to 1.5 wt %. For example, when the sodium chloride content of the leached residue decreases to a level equal to or less than 4 wt. %, or to a level equal to or less than 3 wt. %, or even to a level equal to or less than 2.7 wt. %, or even preferably to a level equal to or less than 1.5 wt %, such level would render the leached residue acceptable as feedstock to produce sodium carbonate and/or sodium bicarbonate. For example, the harmful effects which would be expected with a crude (unleached) pond solid with a NaCl content higher than 4 wt. % would not be expected with a leached residue with a NaCl content at or below a predetermined value of 2.7 wt %. The various leached residues obtained with a NaCl content between 0.3 wt % and 1.5 wt % would be considered acceptable feedstocks to produce sodium carbonate and/or sodium bicarbonate.

The predetermined value for $Na_2SO_4$ in the leached residue may range from 3 to 1 wt %. For example, when the sodium sulfate content of the leached residue decreases to a level equal to or less than 3 wt. %, or to a level equal to or less than 2.4 wt. %, or even equal to or less than 2 wt. %, such $Na_2SO_4$ content would render the leached residue acceptable for reuse as feedstock to produce sodium carbonate and/or sodium bicarbonate. The harmful effects which would be expected with a crude (unleached) pond solid with a sodium sulfate content higher than 3 wt. % would not be expected with a leached residue with a sodium sulfate content at or below a predetermined value of 2.4 wt %. The various leached residues obtained with a sodium sulfate content between 0.2 wt % and 2.05 wt % would be considered acceptable to be used as feedstocks to produce sodium carbonate and/or sodium bicarbonate.

In instances when the leachate stream 60 is not recycled to the leaching unit 15, the leaching method is operated in a once-through mode, and the leach solution 30 contacts the waste solid 20 only once.

The operation of the leaching unit 15 in once-though mode or in recycle mode may be dictated by the level of saturation of the leach solution 30 with respect to sodium (bi)carbonate. For example, when the leach solution 30 may be near saturated or saturated in equivalent sodium carbonate (hereinafter termed 'saturated' solution) comprising at least 20% eq. sodium carbonate or at least 25% eq. sodium carbonate, there is less risk in losing valuable sodium carbonate mass via dissolution into the leachate. Thus, operating in recycle mode is preferably carried out when the leach solution 30 is near-saturated or saturated in equivalent sodium carbonate, as repetitive exposure to the mass with the saturated leachate solution will not cause as much sodium carbonate loss from the mass 20, compared to repetitive exposure with an unsaturated leachate solution.

The leaching step in unit 15 may be carried out at an ambient temperature between 0° C. and 40° C. (between 32 and 104° F.), or preferably between 0° C. and 30° C. (between 32 and 86° F.). The leaching method should be carried out for at least 30 minutes, or may be carried out for at least 120 minutes. The leaching method should be carried out for at most 48 hours, or preferably for at most 16 hours.

The leaching method may be carried out in a manner effective to selectively dissolve at least one water-soluble impurity selected from the group consisting of sodium chloride, sodium sulfate, silicates, organic matter (measured as 'total organic carbon'), and combinations of two or more thereof. The leaching method is preferably carried out in a manner effective to selectively dissolve sodium chloride (NaCl) and/or sodium sulfate ($Na_2SO_4$), and optionally dissolve silicates, organic matter (measured as 'total organic carbon'), or combinations of two or more thereof. Some metallic elements (e.g., magnesium, calcium, iron, aluminum) may be removed as well, although their removal from the solid mass by leaching appears more effective when the initial contents in NaCl and $Na_2SO_4$ in the crude solid mass are already below 2 wt. %.

The leaching method may be effective in reducing the NaCl content in the leached residue 40 by at least 40%, by at least 50%, or at least 60% or at least 80% or at least 90%. The leaching method may be effective in reducing the NaCl content in the leached residue by less than 99%, or by 95% or less. For example, reducing the NaCl content in the leached residue may vary from about 60% to about 95%, when the initial NaCl concentration in the crude solid is above 2 wt. %.

The leaching method may be effective in reducing the $Na_2SO_4$ content in the leached residue 40 by at least 40%, or at least 50% or at least 60% or at least 70%. The leaching method may be effective in reducing the $Na_2SO_4$ content in the leached residue by less than 95%, by 90% or less. For example, reducing the $Na_2SO_4$ content in the leached residue may vary from about 40% to about 85%, when the initial $Na_2SO_4$ concentration in the crude solid is above 1 wt. %.

The leaching method may be effective in reducing the silicates content in the leached residue 40 by at least 30%, or at least 40%. The leaching method may be effective in reducing the silicates content in the leached residue by less than 90%, by 85% or less. For example, reducing the silicates content in the leached residue may vary from about 5% to about 50%, especially when the initial NaCl concentration in the crude solid is less than 2 wt. %.

The leaching method may be effective in reducing the Total Organic Carbon (TOC) content in the leached residue 40 by at least 20%, or at least 30%. The leaching method may be effective in reducing the TOC content in the leached residue by less than 90%, or by 85% or less. For example, the TOC content in the leached residue may be from about 20% to about 85% lower than that in the crude solid.

Various embodiments of the chemical leaching methods which can be used in leaching unit 15 may include for example vat leaching, Pachuca (air agitated) tank leaching, and/or heap leaching. Any combination of these leaching techniques may be used in leaching unit 15. Although only one leaching unit 15 is shown in FIG. 1, it is to be understood that more than one vessel, vat or heap may be employed in leaching unit 15, such that the leaching step may be performed using two or more vessels, vats or heaps operated in series, operated in parallel, or operated in alternating sequence.

FIG. 2a-2i illustrate some of the embodiments which may be carried out for the leaching method according to the present invention. It is to be understood that any equipment or step or stream disclosed in the context of one embodiment of the present leaching method may be used or interchanged in the context of another leaching embodiment, unless it is explicitly stated otherwise.

Figure 2A:
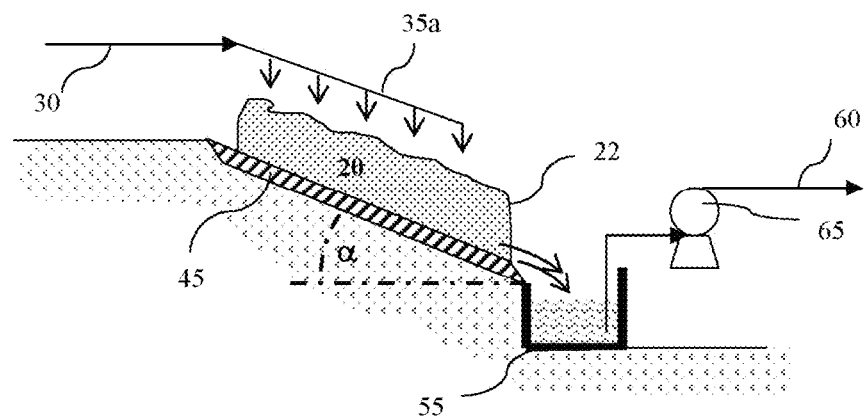
FIG. 2a illustrates a system for a leaching method employing a heap of pond (waste) solid placed on a liquid-impermeable substrate laid on a sloped ground and employing a solution distribution system to spray leach solution on top of the mass according to a first embodiment of the present invention.
Figure 2B:
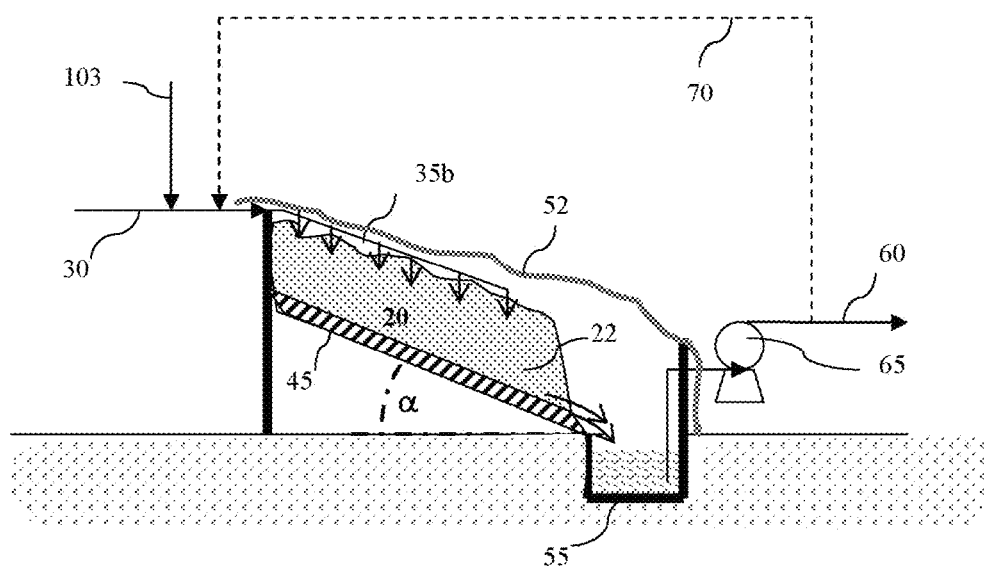
FIG. 2b illustrates a system for a leaching method employing a heap of pond (waste) solid placed on a liquid-impermeable substrate which is inclined from horizontal and held on one side by a retaining wall to keep the heaped mass in place and further employing a leach solution distribution system according to a second embodiment of the present invention.
Figure 2F:
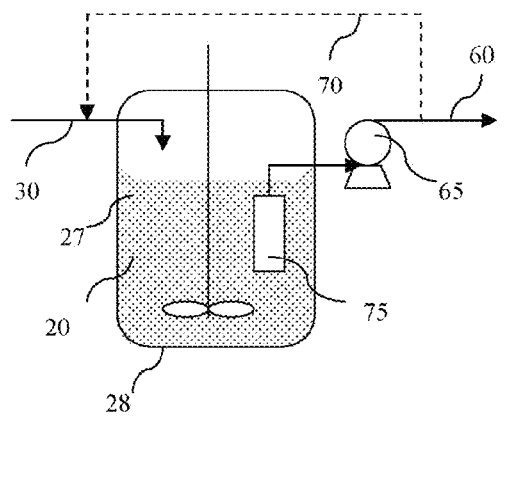
FIG. 2f illustrates a system for a leaching method employing a slurry of a pond (waste) solid mass dispersed in the leach solution, the slurry being placed in an agitated vessel and the leachate being collected via a liquid/solid separation placed inside the agitated vessel according to a sixth embodiment of the present invention.
Figure 2G:
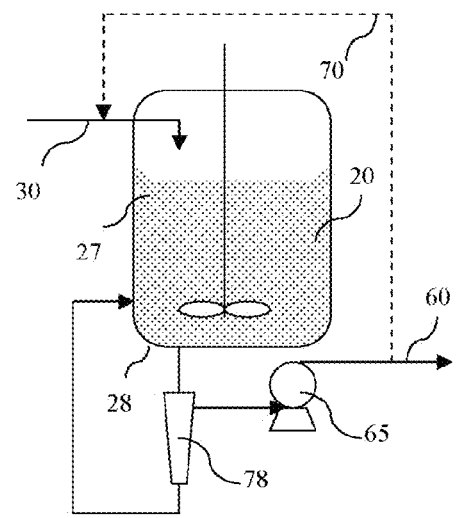
FIG. 2g illustrates a system for a leaching method employing a slurry of a pond (waste) solid mass dispersed in the leach solution, the slurry being placed in an agitated vessel and the leachate being collected via a liquid/solid separation placed outside the agitated vessel according to a seventh embodiment of the present invention.
Figure 2H:
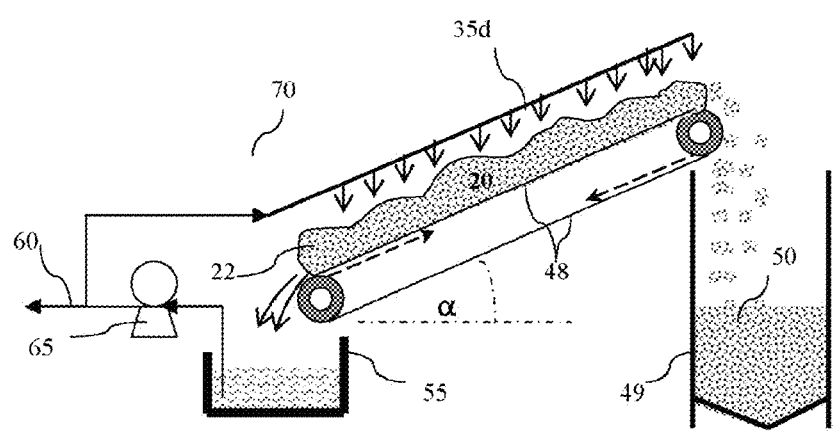
FIG. 2h illustrates a system for a leaching method employing a moving mass of pond (waste) solid on a conveyor belt being sprayed with the leach solution according to a eighth embodiment of the present invention.
Figure 2I:
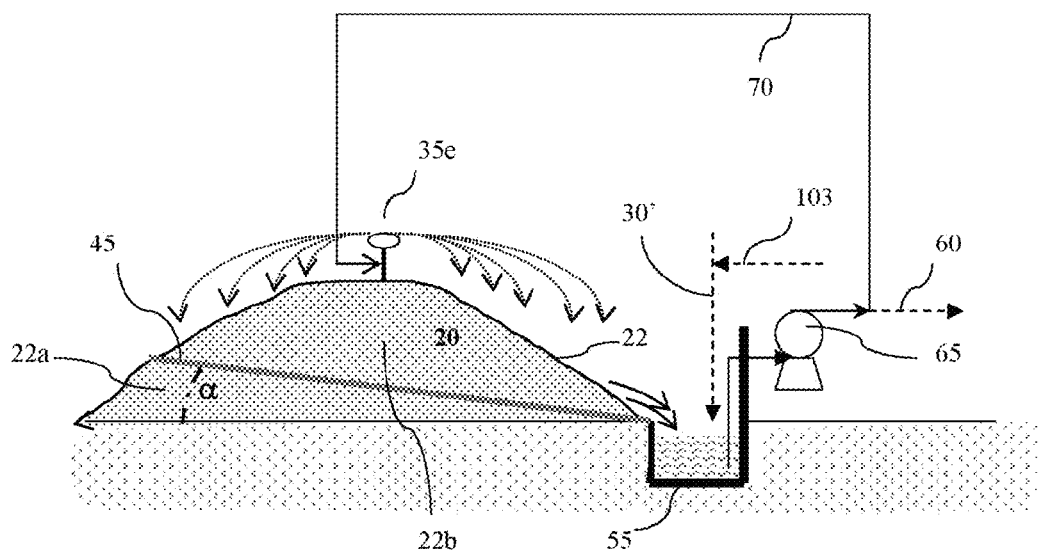
FIG. 2i illustrates a system for a leaching method employing a pond (waste) solid heap and a sprinkler system to spray leach solution on top of the heap, in which a first part of the solids heap whose top surface has a downward slope towards a sump serves as a support for a liquid-impermeable substrate and in which a second part of the solids heap is placed onto the liquid-impermeable substrate and is sprinkled by leach solution, according to a ninth embodiment of the present invention.

FIGS. 2a, 2b, and 2i illustrate various systems for a leaching method employing a heap 22 of waste solid placed on an inclined liquid-impermeable substrate 45 and employing a solution distribution system 35 (a, b, e) to spray the leach solution 30 on top of the heaped mass 22 according to the present invention. The liquid-impermeable substrate 45 is preferably inclined at an angle $\alpha$ from the horizontal. The angle $\alpha$ may be equal to or less than the angle of repose of the waste solid placed on top of the substrate 45. The angle $\alpha$ may be equal to or less than 45 degrees, or equal to or less than 30 degrees. The systems of FIGS. 2b and 2i employ a leachate recycle via line 70 from a leachate collection zone 55 to the solution distribution system 35b or 35e.

In some embodiments as illustrated in FIG. 2i, a first mass of solid may be piled on the ground near or adjacent to a collection zone (e.g., a trench); a flexible substrate 45 may be laid on a slope of the pile, and a second mass of solid may be placed on top of the flexible substrate 45. This would work quite well when the solid is recovered from a salt deposit in a portion of a waste pond which has been drained of liquid supernate. The deposit thickness in the drained portion of the pond may be from 0.3 to 6 meters deep (from 1 to 20 feet), and the deposit surface may be hard enough to carry the weight of heavy equipment to excavate the solid. The excavated solid may be piled up on the surface of the deposit. In that way, part of the solid to be leached may serve as the support for the substrate 45. In this instance, at least the portion of the pond site used for leaching would have to be drained to remove the supernatant pond liquor to free up the deposit surface The leachate may be collected in the collection zone in the pond where it could be recycled for more leaching and/or may be directed to another part of the pond which is not drained or to another pond which is proximate to the leaching site.

The liquid-impermeable substrate 45 may be flexible such as an impervious tarp or liner which is able to lay on a sloped ground floor with a slope angle $\alpha$ (as illustrated in FIG. 2a) or may be laid on a slope of a heap of solids with a sloped angle $\alpha$ (as illustrated in FIG. 2i).

Alternatively, the liquid-impermeable substrate 45 may be rigid so as to carry the weight of the solid mass to be leached, and the rigid substrate 45 would be positioned at the angle $\alpha$ inclined from the horizontal. An example of a rigid substrate may be a concrete pad or a rigid plastic liner. As shown in FIG. 2b, one end of the substrate 45 (which is rigid) may be held at a higher elevation by a supporting wall to keep the substrate 45 in place. As shown in FIG. 2i, the substrate 45 which can be rigid may be laid on a slope of a heap of solids with an angle $\alpha$.

The liquid-impermeable substrate 45 may be made of a nonporous material. The liquid-impermeable substrate 45 may comprise of a polyolefinic material such as polypropylene, and/or polyethylene. A suitable material for the liquid-impermeable substrate 45 is a plastic liner or sheet made of polyethylene, such as made of polyethylene (e.g., Visqueen™), which is generally between 0.1 to 0.25 mm thick, and is commonly used as temporary tarpaulin, concrete cover, drop cloth for painting, liner for decorative ponds, and ground cover for weed control.

The substrate 45 may have a flat surface. The substrate 45 may have an undulating surface with a regular or irregular pattern of ridges and/or grooves. The substrate 45 may comprise grooves (for example, on its upper surface which is exposed to the pile) to facilitate the flow of leachate downward from the top of the pile to the leachate collection zone 55. The grooves may be parallel running from a high elevation to a lower elevation. Or the grooves on the substrate 45 may be positioned in a fan-shaped arrangement, each running from a high elevation to a lower elevation, for the leachate to be directed towards a centralized location towards the collection zone 55. The lower-elevation edge of the substrate 45 may overhang into the leachate collection zone 55.

There may be a liquid-permeable guard (not shown) at the lower-elevation edge of the substrate 45 to prevent solids from the heap 22 to fall into the collection zone 55. The liquid-permeable guard allows the leachate to pass through.

In FIG. 2a, the leach solution 30 may be forced by means of a pump (not shown) from a solution surge or storage reservoir (not shown) through a grid 35a of distribution lines, typically plastic tubing, deployed across the top of the heaped mass 22 of the waste solid 20. One or more sprinkler heads, spray nozzles, or wriggler tubing connected at various intervals in the distribution line network spray the leach solution 30 onto the heap 22. Spraying is necessary for distributing the leach solution over the entire top of the heap 22. Downward spraying is preferable (but not required) to minimize solution loss via evaporation and/or wind-blowing.

Pregnant leach solution, having percolated through the heap 22, accumulates on the liquid-impermeable substrate 45 and flows into the collection zone 55 at the foothill of the heap 22. The collection zone 55 is configured to receive the pregnant leach solution enriched in impurities. A leachate stream 60 can be pumped from the collection zone 55 via a leachate pump 65. In the figure, arrows indicate the direction of flow of the leach solution.

Heap leaching presents a number of advantages such as simple equipment and operation, low investment and operation costs and acceptable yields. On the other hand it must be realized that such operation may suffer from some limitations; the heaped material may be very heterogeneous, and in practicality, no close process control can be exerted, except for possible intermittent pH adjustment and the addition of some acid/alkali if necessary to the leach solution 30 to favor selective dissolution of at least one impurity. Moreover, the rates of water evaporation and wind blowing in this open-air setup may be high, and extended periods of operation may be required in order to achieve sufficient leaching yield.

For these reasons there may be modifications to the system 10 of the leaching method which allows overcoming some of these disadvantages. For example as illustrated in FIG. 2b, a distribution system 35b of drip lines may be laid over the heap 22. The distribution system 35b of drip lines consists of pipes or tubes that are perforated, porous, slotted, split, or similarly constructed for the purpose of applying leach solution 30 to the heap 22. An impervious covering 52 (for example a liquid-impermeable plastic sheet), preferably flexible, may be spread over and blankets the distribution system 35b of drip lines, the underlying heap 22, and optionally the collection zone 55. The leach solution 30 enters the distribution system 35b of drip lines and is applied to the heap 22. Pregnant leach solution percolates through the heap 22, accumulates on the substrate 45, and flows into the collection zone 55. Such system setup in the heap leaching would minimize water loss via evaporation and wind-blowing and would prevent water precipitation (e.g., rain, snow, hail) from diluting the leach solution and/or leachate.

As illustrated in FIG. 2b (although it would be equally applicable to FIG. 2a), a portion 70 of the leachate stream 60 is recycled to the leaching unit 15 via leach solution 30. In this embodiment, the leach solution 30 may comprise the leachate stream 60 or a portion 70 thereof and/or a purge liquor 103 (or a portion thereof) as will be discussed later in the context of FIGS. 3 & 4. However the portion 70 of the leachate stream 60 may be recycled directly to the leaching unit 15 separately from the leach solution 30, so that the leach solution 30 and the portion 70 of the leachate stream 60 do not mix before they are fed to the leaching unit 15.

As illustrated in FIG. 2i, the heap consists of two heap regions 22a, 22b which are separated by the liquid-impermeable substrate 45, the bottom region 22a of the heap serving as support or carrier for the upper region 22b of the heap. The liquid-impermeable substrate 45 may be rigid or flexible. This system can be built by first positioning a first heap (region 22a) on the substrate 45 so that the substrate 45 lies at an angle α from the horizontal on the slope created by the first heap region 22a. Then another pile of pond (waste) solids is put on top of the inclined substrate 45 to form a second heap. The incline of the substrate 45 at an angle α should favor the flow of leachate (which percolates through the heap region 22b) toward the leachate collection zone 55.

The recycled or recirculated leachate (and optionally a make-up leach solution 30' which may contain a purge liquor 103) is sprayed over the heap 22 via the distribution system 35e in order for the liquid to contact the solids in the region 22b of the heap. The solids in heap region 22a located underneath the liquid-impermeable substrate 45 which provide an inclined surface onto which the substrate 45 is placed are not contacted with the sprayed liquid (leach solution and/or leachate) in this embodiment.

The leach solution distribution system 35e may comprise any sprinkler/nozzle types used on center pivot irrigation systems, such as a high or low pressure impact sprinkler, a plurality thereof, a low pressure spray nozzle or head with stationary, rotating or oscillating deflection pads, a plurality thereof, or any combinations thereof. An 'impact sprinkler' is generally a water application device equipped with one or two nozzles and an impact arm to cause sprinkler rotation and water stream breakup. An example of this design is a Rain Bird™ impact sprinkler. A 'spray nozzle' is generally a water distribution device equipped with a stationary deflection pad (which does not move when impacted by the water stream leaving the nozzle), a rotating deflection pad (which rotates in a 360 degree circle when impacted by the water stream leaving the nozzle), or an oscillating deflection pad (which oscillates when impacted by the water stream leaving the nozzle) used to distribute water in 180 to 360 degree circles. Impact sprinklers can be purchased with spreader nozzles or noncircular nozzles to affect liquid droplet breakup and to supply solution more uniformly to the pile surface. Typically, impact sprinklers can be operated over a wider range of pressures than low pressure spray nozzles. For example, a high pressure impact sprinkler is suitable in a range from 40 to 80 psi while an oscillating low pressure spray nozzle would be suited to pressures between 10 and 40 psi. It should be noted that mounting a low pressure spray nozzle too close to the soil surface will reduce the wetted diameter of the liquid spray, since gravity forces the liquid droplets toward the heap surface as they travel through the air. As the wetted diameter is controlled by the velocity of the liquid leaving a particular nozzle and the distance between the liquid stream and the heap surface, a low pressure spray nozzle can be mounted on a drop tube or riser below the pivot pipeline in order to increase wetting performance. This can be done by mounting the spray nozzle on top of a riser or a combination of a rigid gooseneck and flexible hose to some distance from the surface of heap 22b. The sprinkler system 35e may be flexible in its operation for example allowing a 360-degree coverage of liquid spray or a partially-circular coverage of liquid spray to wet only specific areas of the heap.

FIG. 2c illustrates yet an alternate system for a leaching method employing a mass 20 of waste solid placed in a packed bed 24 in a non-agitated vessel 25 and employing a leach solution distribution system 35c according to a third embodiment of the present invention.

The percolation leaching method carried out in the system of FIG. 2c may comprise placing the mass 20 of the waste solid to form the packed bed 24 into the non-agitated vessel 25; dispersing the leach solution 30 above or at the top of the packed bed 24 inside the vessel 25 through the distribution system 35c. As the sprayed leach solution 30 flows downward though the packed bed 24, at least one impurity dissolves into the solution which gets progressively enriched with such impurity; and after percolation through the packed bed the leachate stream 60 is removed at the bottom of the vessel 25. As illustrated in FIG. 2c, a portion 70 of the leachate stream 60 may be recycled to the leaching vessel 25, for example via the leach solution 30 so that the leach solution 30 comprises the leachate 60 or a portion 70 thereof (as illustrated).

The percolation leaching method can be carried out in the system illustrated in FIG. 2c in a batch mode. The waste solid mass is first placed as packed bed 24 in the vessel 25; the packed bed 24 is then contacted with the leaching medium 30 via distribution 35c; the flow of the leach solution 30 is stopped, and the leachate is drained from the vessel 25. A wet leached residue is removed from the vessel 25 to place a new batch of waste solid inside the vessel 25 for a new round of leaching.

The system of FIG. 2d is similar to the system of FIG. 2c employing the waste solid mass 20 placed in a packed bed 24a in a non-agitated vessel 26, except that the leach solution 30 is fed at the bottom of packed bed 24a. The leach solution 30 flows upward though the packed bed 24a thus flooding the packed bed 24a and forming a pool of leachate at the top of the bed 24a. The leach solution dissolves at least one impurity into solution and gets progressively enriched with such impurity as it moves from bottom to top of the vessel 26. After upward 'percolation' through the packed bed 24a, the pooled leachate overflows into a weir 31 at the top of the vessel 26, and the leachate stream 60 is removed from the weir 31 via a leachate pump 65 in fluid communication with the weir 31. As illustrated in FIG. 2d, at least a portion 70 of the leachate stream 60 may be recycled to the leaching vessel 26 via the leach solution 30, so that the leach solution 30 comprises the leachate stream 60 or a portion 70 thereof (as illustrated).

The leaching method can be carried out in the system illustrated in FIG. 2d in a batch mode; the waste solid mass 20 is first placed as packed bed 24a in the vessel 26, the packed bed 24a is then contacted with the leaching medium 30 from the bottom up; the leachate is drained from the vessel 26 from weir 31 at the top of the vessel 26. The flow of leach solution 30 is stopped; the leached residue in vessel 26 is drained off liquid, and the wet leached residue is removed from the vessel 26 to place a new batch of waste solid inside vessel 26 for a new round of leaching.

FIG. 2e illustrates a system for a leaching method employing a moving mass of waste solid according to a fifth embodiment of the present invention.

The contacting step for leaching in the system of FIG. 2e may comprise placing the mass 20 of waste solid to form a slurry with the leach solution 30 into a stirred slurry vessel 71 and further feeding the so-formed slurry to a washing column 72. This slurry entering the column 72 flows downwards in a suspension zone 'A' of the column 72 but on the outside of internal tubes 73 which are positioned inside the column 72. The suspension zone A, at the level 'a', changes into a thickening zone 'B'. Beneath this level 'a' is situated a packed bed of solid crystalline particles. While the packed bed of solid crystalline particles is being formed in the thickening zone B of column 72, the leach solution 30 dissolves at least some of the impurities from the solid mass 20. A leachate drawn off with the leachate pump 65 passes from the thickening zone 'B' through filters 74 contained with the tubes 73 and flows upwards in the tubes 73 to form the leachate stream 60 which exits the column 72. To allow permeation of leachate from the thickening zone 'B' into the tubes 73, the wall portions of tubes 73 located below the location of the filter 74 are preferably made of a material which allows permeation of liquid but retain the solid outside of the tubes 73. The other wall portions of tubes 73 located above the location of the filter 74 may be made of a material which retains the solid outside of the tubes 73 but also which may be liquid impermeable or may allow permeation of liquid therethrough. A portion 70 of the leachate stream 60 can be recycled back to the top of the column 72. Alternatively or additionally, another portion 70a of the leachate can be recycled back to the stirred slurry vessel 71 to provide at least a part of the liquid in the slurry which is formed inside such vessel 71. With the aid of a scraping knife positioned at the bottom of the column 72, a particulate solid material is scraped off. The solid particles thus formed exit the column 72 to form the leached residue 40. As the leached residue 40 exits the column 72, more mass 20 of waste solid enters the stirred slurry vessel 71, so there is a continual replacement of the solid in this method.

FIG. 2f and FIG. 2g illustrate systems for a leaching method employing a slurry 27 of a waste solid mass 20 dispersed in the leach solution 30, the slurry being placed in an agitated vessel 28 according to the sixth and seventh embodiments of the present invention.

The contacting step for leaching in the systems of FIG. 2f and FIG. 2g may comprise placing the mass 20 of waste solid to form the slurry 27 with the leach solution 30 into the agitated vessel 28; mixing the solid mass 20 inside the vessel 28 in the leach solution 30 by an agitation means, such as stirring impeller (as shown), or gas sparger such as air and/or steam sparger (not shown); during mixing, dissolving at least one impurity into the solution of the slurry which gets progressively enriched with this impurity; and collecting the leachate stream 60 via a solid/liquid separation unit (75 or 78).

In FIG. 2f, the solid/liquid separation unit 75 may be one or more filters positioned inside the vessel 28 to allow liquid to permeate through the filter(s) and to retain the solid particles inside the vessel 28.

In FIG. 2g the solid/liquid separation unit 78 may be one or more hydrocyclones positioned outside the vessel 28 to generate a solid-enriched stream and a (liquid) leachate stream 60 which may exit the system. A portion 70 of leachate stream 60 may be directed back to the vessel 28. The solid-enriched stream is generally recycled back to the vessel 28, although a slipstream from the solid stream (not shown) may be removed to provide the leached residue 50 as described earlier in relation to FIG. 1.

As illustrated in FIGS. 2c-2g, a portion 70 of the leachate stream 60 may be recycled to the leaching vessel (25, 26, 28) via the leach solution 30, so that the leach solution 30 comprises the leachate 60 or a portion 70 thereof (as illustrated). Alternatively, the leachate 60 or portion 70 thereof may be recycled to the leaching vessel (25, 26, 28) separately from the leach solution 30 (not illustrated).

With respect to the leaching method carried out in the systems of FIGS. 2c, 2d, and 2f, the leaching step can be carried out in a batch mode in which the waste solid mass 20 is first placed in the vessel 25, 26, or 28; is then contacted with the leaching medium 30 in the packed bed 24 or slurry 27, is drained of leachate, and finally removed from the non-agitated vessel 25, 26 or agitated vessel 28 to make room for a new batch of waste solid to be loaded inside the vessel 25, 26 or 28 and subjected to the same leaching technique.

FIG. 2h illustrates a system for a leaching method employing a heap 22 of waste solid placed on an inclined conveyor belt 48 and employing a solution distribution system 35d to spray the leach solution 30 on top of the heaped mass 22 according to another embodiment of the present invention. The inclined conveyor belt 48 is preferably impermeable to liquid, although it may be permeable to liquid. A ribbed belt may be used. The conveyor belt 48 is preferably inclined at an angle α from the horizontal. The angle α may be equal to or less than the angle of repose of the waste solid disposed on top of the belt 48. The angle α may be equal to or less than 45 degrees, or equal to or less than 30 degrees. A collection zone 55 is configured to receive the pregnant leach solution enriched in impurities.

In FIG. 2h, the leach solution 30 may be forced by means of a pump 65 from a solution surge or storage reservoir (not shown) through the grid 35d of distribution lines, typically plastic tubing, deployed across the top of the heaped mass 22 of the waste solid 20. Sprinkler heads, spray nozzles, or wriggler tubing connected at various intervals in the distribution line network sprayed the leach solution 30 onto the heap 22. Downward spraying is preferable for minimizing solution loss via evaporation and/or wind-blowing.

The heaped mass 22 moves upward on the conveyor belt 48 as it is contacted with the leach solution sprayed on top. While the contacted solid moves upward, a portion of its impurities gets selectively dissolved into the leachate which percolates though the moving solid mass. This results in forming a wet leached residue 50. As the contacted solid mass 22 reaches the top of the conveyor belt 48, the so formed leached residue 50 falls (gravity driven) into a tank 49 awaiting recycling into a plant making soda ash, sodium sesquicarbonate, sodium bicarbonate and/or sodium sulfite. Such tank 49 may be a dissolver in which the leached residue is dissolved into an aqueous medium in preparation for its recycling as a feedstock to the plant, or may be a storage vessel. As the leached residue 50 exits the conveyor belt 28 at the top, fresh solid (which have not yet been subjected to leaching) can be loaded at the bottom of the conveyor belt 48.

When the conveyor belt 48 is impermeable to liquid, the pregnant leach solution, having percolated through the heap 22, accumulates on the liquid-impermeable belt 48 and flows downward (at the same time contacting more solid on its way down) into the leachate collection zone 55 located at the foothill of the conveyor belt 48. The leachate stream 60 can be pumped via pump 65 from the collection zone 55 to be directed to the distribution system 35d and/or to be directed to a waste pond.

In an alternate embodiment (not illustrated), the conveyor belt 48 is permeable to liquid, and the pregnant leach solution, having percolated through the heap 22, flows through the liquid-permeable belt 48 into a large leachate collection zone 55 (such as trench) positioned immediately below the conveyor belt 48.

The operation of the leaching method in FIG. 2h can be a once-through system for the solids in which the solids residence time on the conveyor belt is sufficient to reduce the content of at least one undesirable impurity (preferably sodium chloride, sodium sulfate, and/or water-soluble organics) in the resulting leached residue. However, it is possible that a portion of the leached residue accumulated in tank 49 may be sent onto the conveyor belt 48 for additional leaching. This cycle could be repeated until the content in the impurity in the leached residue present in tank 49 reaches on average a predetermined value which renders the residue acceptable for recycling into the plant.

Figure 3:
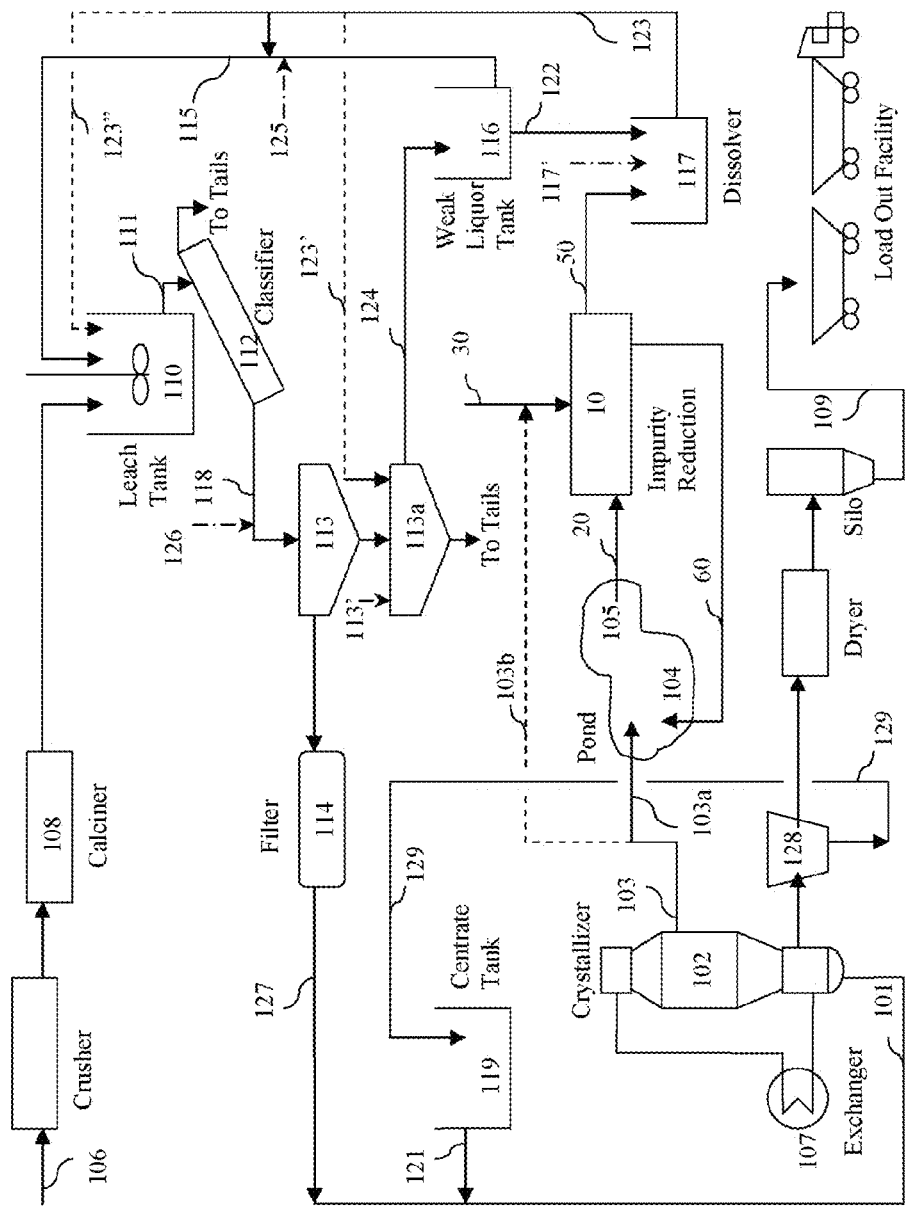
FIG. 3 illustrates a process flow diagram of a soda ash plant according to a tenth embodiment of the present invention, in which a pond (waste) solid deposit is formed in a pond, a solid mass is recovered from the pond and subjected to leaching in order for the leached residue to be reused in the soda ash plant to produce sodium carbonate monohydrate.

FIG. 3 illustrates a block process flow diagram of a plant for producing crystalline sodium carbonate from trona ore, also known as a soda ash plant, which uses the leaching method according to the present invention which removes some impurity from waste solid in order to form a leached residue and an optional second impurities removal method (magnesium treatment) in order to form a sodium carbonate-containing purified solution, the leached residue and/or the sodium carbonate-containing purified solution being suitable for use as feedstock to the soda ash plant.

In the production of soda ash, trona ore 106 is crushed and calcined in a calciner 108. The calcined product has a final temperature of from about 257° F. to 482° F. (or from 125° C. to 250° C.), or from about 300° F. to 375° F. (or from 150° C. to 190° C.), or about 300-330° F. (150-166° C.) at the exit of the calciner 108 (also known as 'spill' temperature). The calcination operating conditions should be effective in decomposing the sodium sesquicarbonate to sodium carbonate. During calcination, a part of the silicon-containing impurities contained in the trona ore is converted to silicates which are water-soluble. The content of bicarbonate in the resulting calcined product is also impacted by the calcination conditions, that is to say, the greater the temperature and residence time (and hence the calcination completion), the lower the amount of sodium bicarbonate present in the resulting calcined product. One of the advantages of the trona calcination is that calcined trona dissolves faster than raw trona. Another advantage is that calcined trona can produce more concentrated sodium carbonate-containing solutions, whose concentrations can reach about 30%, while dissolved raw trona results into solutions having only about 16% sodium carbonate plus 10% sodium bicarbonate.

The calcined trona ore is then dissolved in water or in a dilute liquor, i.e., an aqueous solution unsaturated in sodium carbonate (e.g., a weak liquor stream 115 exiting a weak liquor tank 116 which will be described later) inside a leach tank 110 to give a saturated or near-saturated solution or liquor 111 of about 30% $Na_2CO_3$ and containing water-soluble impurities, which include silicates, organics, chlorides, and sulfates. Hereinafter, liquor 111 may be referred to as a saturated or near-saturated solution 111. Indeed, silicates present in the trona ore increase in solubility during the calcination step in the calciner 108. The dissolution of calcined trona in the leach tank 110 generally takes place at a temperature between 170° F. and 200° F. (or between 77.5 and 93° C.). The dissolution is generally carried out under atmospheric pressure. The residence time in the leach tank 110 is generally at least 15 minutes, and can be as high as 60 minutes. Although only one leach tank 110 is illustrated in FIG. 3, for practicality, the leach tank 110 may comprise two or more vessels operated in series in which several stages of dissolution take place and/or operated in parallel. That is to say, in the most upstream vessel, only partial dissolution of calcined trona takes place, while in the most downstream vessel, the dissolution of sodium carbonate is completed to form the saturated or near-saturated solution 111.

The leaching taking place in the leach tank 110 is not the same method according to the present invention. In leach tank 110, complete dissolution of sodium carbonate values are expected, whereas in the method for impurity removal via the present leaching method, there is a selective dissolution of some of the impurities while at least 70% or more of the sodium carbonate values initially present in the pond (waste) solid are retained in the leached residue (that is to say, less than 30% of sodium carbonate values are dissolved in the leachate).

The water or aqueous medium in which the calcined trona is dissolved in the leach tank 110 can be fresh water. However the water or aqueous medium for calcined trona dissolution can contain one or more recycled aqueous solutions already containing alkalis, coming from the soda ash process or from other processes. The water or aqueous medium may comprise mother liquors (crystallization waters) produced downstream of the process, when sodium carbonate, sodium decahydrate, and/or sodium bicarbonate are crystallized, for instance. The water or aqueous medium may comprise mine water. The dissolution of calcined trona in the leach tank 110 generally takes place with at least a portion of the weak liquor stream 115.

The leach tank 110 can also serve as a vessel for optional treatment(s), such as the optional magnesium treatment for removal of water-soluble silicates and/or organics (especially those with foaming propensity), or other specific chemical treatment, or a pH adjustment for removal of sodium bicarbonate, or the sequential or simultaneous use of these treatments.

The saturated or near-saturated solution or liquor 111 obtained after the dissolution of calcined trona and exiting the leach tank 110 is typically purified in a separation system. The purification generally involves settling and filtration steps, to remove the water-insoluble impurities which are coming from the trona ore and to remove the insolubles which may be formed by the optional magnesium treatment. A classifier is generally the first stage of solids removal. It removes the large solids that settle quickly. A thickener is used next and has a much longer residence time and removes smaller solids with the aid of a flocculent. One or more filters finish the purification by removing the very small solids that do not settle in either the classifier or thickener. The purification may also involve the use of reagents to facilitate settling and/or to remove organic matters still contained in the purified solution. Activated carbon and/or flocculent are examples of such reagents.

The saturated or near-saturated solution 111 exiting the leach tank 110 is preferably passed through a classifier 112 where large-size insoluble matter is removed and sent to a secondary dissolver and then to tails, and a classifier overflow 118 exits the classifier 112. The classification of the saturated or near-saturated solution 111 generally takes place at a temperature between 170° F. and 190° F. (77-88° C.) and under atmospheric pressure.

The classifier overflow 118 is fed to a first thickener 113 in a series of two or more thickening stages. In the first thickener 113, settling of smaller-size insoluble matter takes place, this settling generally being facilitated by flocculent addition. The thickener 113 generally operates at a temperature between 160° F. and 180° F. (71-82° C.) and atmospheric pressure. The residence time in the thickener 113 is generally at least 12 hours, more preferably between 18 and 24 hours.

The first thickener 113 can also serve as a vessel for optional treatment(s), such as the magnesium treatment for removal of water-soluble silicates and/or organics (especially those with foaming propensity), or for a pH adjustment for conversion of sodium bicarbonate to sodium carbonate, or the sequential or simultaneous use of these treatments.

Referring to a subsequent thickening stage, the insoluble matter at the bottom of the first thickener 113 is sent to another thickener 113a to dilute the sodium carbonate-containing solution used to transport the insolubles to tails. The separation by settling generates an insoluble stream which is disposed of and a supernatant 124 which is sent to a weak liquor tank 116. This supernatant 124 is an unsaturated sodium carbonate-containing solution which contains less than 20% sodium carbonate. The sodium carbonate content in the supernatant 124 may vary between 3 and 15%, but generally is between 5 and 15%, or even between 5 and 10%, or even between 3 and 5%. A weak liquor stream 115 exiting the weak liquor tank 116 is fed back to the leach tank 110 to provide at least a portion of (or all of) the aqueous medium in which the calcined trona is dissolved in the leach tank 110.

The weak liquor tank 116 is basically a holding tank for providing a constant flow of the weak liquor stream 115 to the leach tank 110. The temperature in the weak liquor tank 116 is generally between 110° F. and 160° F. (between 43.3 and 71° C.), or preferably between 120° F. and 155° F. (between 48.9 and 68.3° C.); or more preferably between 150° F. and 160° F. (between 66 and 71° C.). The operating pressure in the weak liquor tank 116 is generally atmospheric. The residence time of the unsaturated liquor in the weak liquor tank 116 is generally at least 10 minutes, typically about 180 minutes.

The weak liquor stream 115 is not saturated in sodium carbonate and generally contains less than 20% sodium carbonate. The weak liquor stream 115 may contain from 3% to 15% sodium carbonate, or may contain from 5% to 10% sodium carbonate; or may contain from 6% to 9% sodium carbonate. The TA content of such stream 15 is generally between 3 and 10% TA, preferably about 4-7% TA, or about 5-6% TA.

Referring back to the operation of the first thickener 113, even though the majority of insoluble matter has been removed from the saturated or near-saturated soda ash solution in the classifier 112 and the first thickener 113, there is still some very small insoluble matter that needs to be removed. The overflow of the first thickener 113 is thus passed through a filtration unit 114 to create a purified saturated or near-saturated sodium carbonate-containing solution which exits the filtration unit 114 as filtrate 127.

Before the solution is passed through the filtration unit 114, the solution (e.g., overflow of the thickener 113) may be contacted with activated carbon to remove some of the organics present in the solution.

Although not illustrated in FIG. 3, a portion of the purified solution (filtrate 127) may serve as a reactant to a process for the production of sodium bicarbonate by reaction with carbon dioxide, or a reactant to a process for the production of sodium sulfite by reaction with sulfur dioxide.

Referring back to the production of sodium carbonate as illustrated in FIG. 3, the filtrate 127 (purified solution) serves as at least a part of the crystallizer feed 101 to a crystallizer 102 (typically an evaporative crystallizer).

The crystallizer 102 into which the purified saturated or near-saturated solution is introduced must be able to crystallize sodium carbonate. The crystallized sodium carbonate can be in different hydration forms: monohydrate, decahydrate, heptahydrate, or can be anhydrous.

In preferred embodiments, the sodium carbonate crystals produced in the crystallizer 102 are in the monohydrate form. The crystallizer 102 is then part of what is commonly referred to as the "monohydrate process". As the saturated or near-saturated solution is heated in the crystallizer 102, evaporation of water takes place effecting the crystallization of sodium carbonate into sodium carbonate monohydrate crystals ($Na_2CO_3.H_2O$). Typical temperature in the crystallizer 102 may be from 160° F. to 230° F. (or from 71 to 110° C.).

The monohydrate crystals are removed from the mother liquor by a centrifugal separator 128 and then dried in a dryer to convert it to anhydrous soda ash product 109, which is stored in silos and loaded into railroad cars or shipping containers for delivery to customers.

A liquor stream is recycled to the crystallizer 102 via a recirculation loop comprising a crystallizer heat exchanger 107 for further processing into sodium carbonate monohydrate crystals. While passing through the crystallizer heat exchanger 107, the temperature of the mother liquor is increased.

Figure 4:
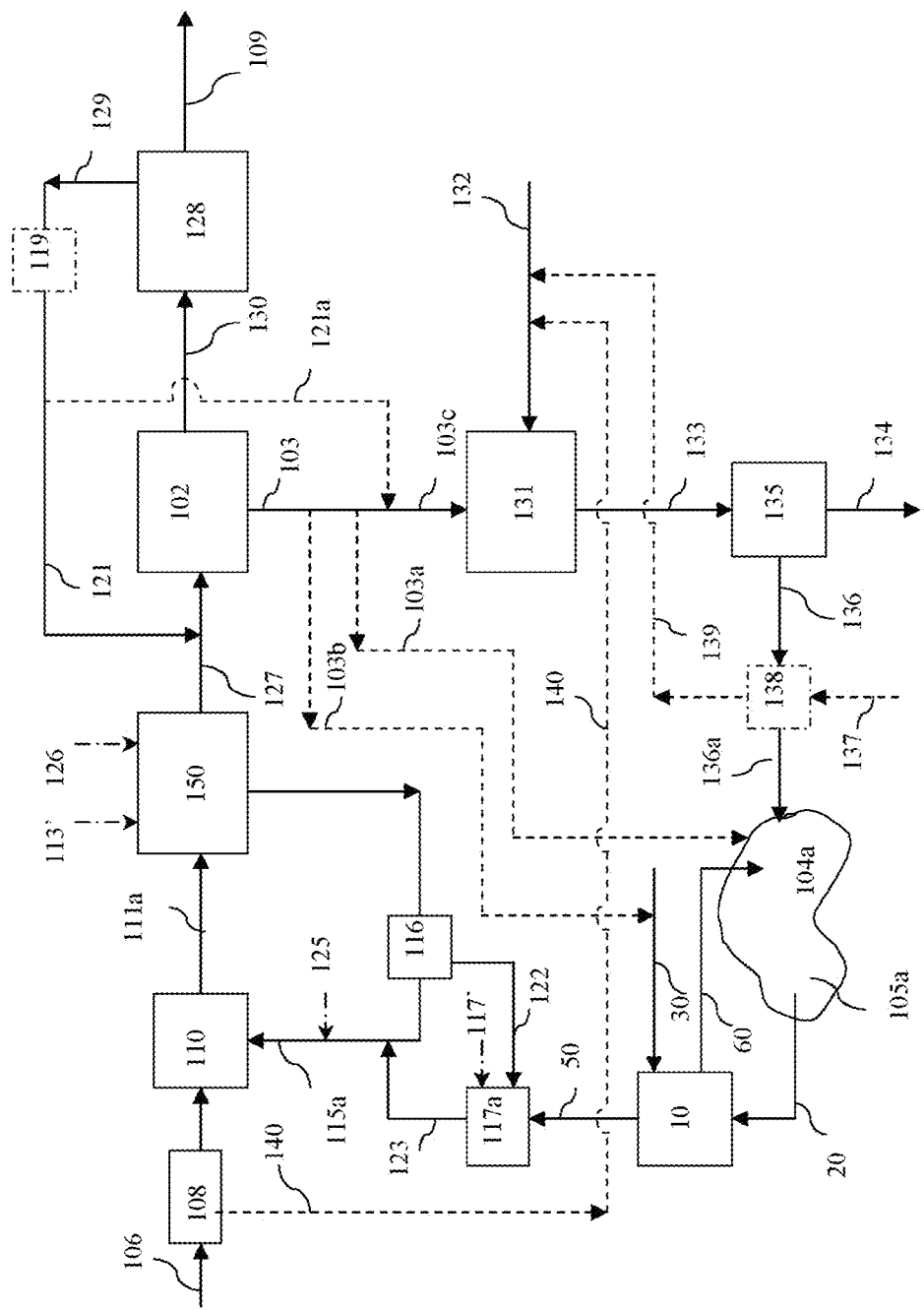
FIG. 4 illustrates a process flow diagram of a process which co-produces sodium carbonate and sodium bicarbonate according to an eleventh embodiment of the present invention, such process recycling a leached residue of a solid mass which is recovered from a deposit in a tailings pond to the soda ash process.

To avoid contamination and deterioration of crystal shape and hardness by the impurities, such as silicates, as well as to prevent the buildup of these impurities in the crystallizer and to minimize scale formation on the heat exchanger surfaces exposed to the mother liquor, a portion of the crystallizer liquor must be purged. A purge liquor stream 103 is withdrawn from the crystallizer 102. The TA content of such purge liquor stream 103 is generally between 25 and 31% TA depending upon the levels of soluble impurities entering the system. The purge liquor stream 103 or a portion thereof (103a) can be directed to a tailings pond 104 (as shown in FIG. 3) or a mechanical sodium carbonate decahydrate recovery system (not shown), or directed to a bicarbonate process as illustrated in FIG. 4.

A mother liquor containing sodium carbonate monohydrate crystals and water-soluble impurities (including silicate) is withdrawn from the crystallizer 102 and may be sent to the centrifugal separator 128 to collect monohydrate crystals, while a centrate stream 129 is sent to a centrate tank 119. The centrate tank 119 not only can serve as a surge tank for the recycling of the centrate but also can serve as a vessel for optional treatment(s) of the centrate, such as a specific chemical treatment for removal of water-soluble silicates and/or organics (especially those with foaming propensity), or a pH adjustment for removal of sodium bicarbonate, or the sequential or simultaneous use of these treatments.

The centrate liquor stream 121 exiting the centrate tank 119 is fed to the crystallizer 102, either combined with the filtrate 127 exiting the filtration unit 114 to form the crystallizer feed 101 (as shown) or separately fed to the crystallizer 102 (not shown).

In the process carried out in the system illustrated in FIG. 3, the weak or purge liquor may comprise water-soluble impurities being selected from the group consisting of sodium chloride, sodium sulfate, silicates, water-soluble organics, and any combinations thereof, and may comprise one sodium compound selected from the group consisting of sodium carbonate, sodium bicarbonate, and any combinations of two or more thereof.

In the process carried out in the soda ash plant of FIG. 3, the sodium carbonate production process further comprises the recycling of a waste solid which is recovered from a crystalline deposit 105 (comprising sodium carbonate decahydrate) which is formed in the tailings pond 104. Indeed, the purge liquor (via stream 103a) sent to the tailings pond 104 evaporates and/or cools resulting in the crystallization of sodium carbonate decahydrate contaminated with varying amounts of impurities. At least a portion of this sodium carbonate decahydrate deposit 105 (also called 'deca' deposit) is excavated and collected for further processing in the soda ash plant. The 'deca' deposit includes but is not limited to, water-soluble sodium chloride, sodium sulfate, silicates, organics (some of which are foam-causing agents) and may also contain from 0.1% up to 10% sodium bicarbonate or up to 6% sodium bicarbonate.

The reclamation of this 'deca' deposit has several advantages: 1) reduction of the volume of the tailings pond 104 occupied by this deposit, thus postponing the need for an expensive lift to the dam or building another tailings pond, 2) increase in the trona mine life by reducing the equivalent amount of trona ore required for sodium carbonate production; and 3) reduction in the cost of sodium carbonate production, as this sodium carbonate decahydrate reclamation is cheaper than mining trona ore.

According to the present invention, a solid mass recovered from the tailings pond 104 and/or from a crystallizer other than the monohydrate crystallizer 102 is subjected to leaching.

A portion (103b) of the purge liquor stream 103 can be directed to be used as the leach solution 30 or a portion thereof in the leaching system 10 for leaching as generally illustrated in FIG. 1 and described earlier. The leaching unit can comprise any of the leaching units as specifically illustrated FIG. 2a-2i, either individually or in any combination. The leaching method used in leaching system 10 thus can encompass any of the steps or techniques as described earlier in relation to FIG. 2a-2i, either performed individually or performed in any combination. The mass of waste solid which serves as solid feed 20 to the leaching system 10 comprises or consists of at least a portion of the deposit 105 which is recovered from the pond 104. The leachate 60 exiting the leaching system 10 can be directed to the leaching system 10 via line 70 (for more leaching) and/or to the pond 104 (for disposal). The leach solution 30 feeding the leaching system 10 may comprise a portion (103b) of the monohydrate purge liquor exiting the crystallizer 102, or a mine water, or a plant effluent (such as boiler scrubber water, sulfite purge, bicarbonate purge, ... ). The leached residue 50 exiting the leaching system 10 can be directed to the dissolver 117 where it will be dissolved with an aqueous medium (preferably weak liquor 122) for reuse of its sodium carbonate values to make soda ash.

In the process carried out in the system illustrated in FIG. 3, the leached residue 50 which contains sodium carbonate values may be added (generally in dissolved form) at one or more locations in the process in order to valorize this solid instead of disposing it as a waste. The recovered leached residue may still comprise water-soluble impurities being selected from the group consisting of sodium chloride, sodium sulfate, silicates, water-soluble organics, and combinations thereof, and may comprise one sodium salt selected from the group consisting of sodium carbonate decahydrate, sodium carbonate monohydrate, sodium carbonate heptahydrate, sodium bicarbonate, sodium sesquicarbonate, and any combinations of two or more thereof. The recovered leached residue may still further comprise an impurity containing an element being selected from the group consisting of magnesium, calcium, iron, aluminum, and combinations thereof.

The leached residue is preferably added in dissolved form such as dissolved in water or in an aqueous solution comprising alkali values (such as a weak liquor). When the leached residue is recycled to the soda ash plant, it may be added at any point in the soda ash plant, preferably a location which is located upstream of the filtration unit 114. It may be added to a solution unsaturated, saturated, or near-saturated in sodium carbonate, such as added to the weak liquor stream 115, to the weak liquor tank 116, or to the secondary thickener 113a, or may be added to the primary thickener 113, classifier 112 or its overflow 118, or to the leach tank 110.

The leached residue 50 is preferably first sent to the dissolver 117 (also termed a 'melter'). A portion 122 of the weak liquor exiting the weak liquor tank 116 may provide the aqueous medium necessary for the dissolution of leached residue in the dissolver 117. The leached residue generally dissolves faster in solution when it is heated. Since for example the dissolution of 'decahydrate' in water is endothermic, the need for heat is provided by the weak liquor portion 122 entering the dissolver 117 since the weak liquor in tank 116 is at a higher temperature than the dissolver temperature. The temperature in the dissolver 117 is generally between 90° F. and 120° F. (32.2-48.9° C.), or greater than 100° F. (37.8° C.). The operating pressure in the dissolver 117 is generally atmospheric. The residence time of the leached residue in the dissolver 117 is generally at least 10 minutes, and can be up to 60 minutes. The weak liquor tank 116 or a secondary thickener (such as illustrated second thickener 113a) serves as a holding tank for a weak liquor stream 115. The weak liquor stream 115 exiting the weak liquor tank 116 is fed to the leach tank 110.

A portion or all of dissolved leached residue (stream 123) exiting the dissolver 117 may be sent as a solution to the weak liquor stream 115 exiting the weak liquor tank 116 (as shown) or may be directed to the weak liquor tank 116 (not shown). Because sodium carbonate from the dissolver 117 is fed to the weak liquor stream 115 (exiting the weak liquor tank 116) or fed to weak liquor tank 116, the TA content of such stream 115 generally increases from the typical ~6% (without 'pond solid' recycle) to generally between 8 and 15%, preferably about 11-13% TA. The stream 123 comprising dissolved leached residue may be added to the weak liquor stream 115 at any addition point between the dissolved 117 and the leach tank 110.

Alternatively or additionally, a portion or all of the dissolved leached residue (stream 123') exiting the dissolver 117 may be sent to a thickener, such as second thickener 113a in the series of thickeners as illustrated by a dashed line in FIG. 3.

The weak liquor stream 115 sent to the leach tank 110 serves to dissolve the crushed calcined trona to form the saturated or near-saturated solution or liquor 111. The saturated or near-saturated solution or liquor 111 obtained after the dissolution of calcined trona and exiting the leach tank 110 is typically purified. Hereinafter, liquor 111 may be referred to as a saturated or near-saturated solution 111. The purification generally involves settling and filtration steps to remove water-insoluble impurities. Water-insoluble matter in saturated or near-saturated solution 111 may be coming from the calcined trona ore and may result from optional chemical treatment(s) which creates water-insoluble precipitates and/or complexes with some water-soluble impurities, such as silicates and/or organics. The purification may also involve the use of reagents to facilitate settling and/or to remove organic matters still contained in the purified solution. Activated carbon and/or flocculants are examples of such reagents.

As illustrated in FIG. 3, the liquor 111 which contains dissolved leached residue is typically fed to the following separations units: classifier 112, thickeners (including primary thickener 113 and secondary thickener 113a being operated in series), and filtration unit 114. The dissolved solid in the liquor 111 may originate from the pond deposit 105 solid and/or from a crystallizer, preferably other than the monohydrate crystallizer 102.

The fraction of dissolved leached residue in the liquor 111 may be from 1 to about 15%, may be from 1 to 10%, or may be 10% or more, with the remainder coming from dissolved calcined trona. Because the pond deposit 105 may contain several folds higher amount of water-soluble silicates and sodium bicarbonate than the calcined trona (e.g., maybe up to 10 times higher in ppm Si), even a small fraction of dissolved pond deposit in the liquor 111 may yield a significant increase in the water-soluble silicates content of the liquor 111 especially if the waste solid (comprising a pond solid) is not subjected to the leaching method and the magnesium treatment. Thus the greater the fraction of dissolved waste solid in the liquor 111, the greater the need to remove the impurities from the waste solid via leaching and magnesium treatment before its entry into the crystallizer 102.

In instances when the leached residue contains a higher amount of soluble sodium bicarbonate than the calcined trona, adding the dissolved leached residue in the liquor 111 would increase the content of sodium bicarbonate in the liquor 111. As the fraction of leached residue in the liquor 111 is increased, it thus will be necessary to convert the sodium bicarbonate to sodium carbonate. The conversion may be carried out by thermally calcining the leached residue for example before the leached residue is dissolved in the dissolver 117 or by chemical conversion by reaction with an alkali (e.g., lime, sodium hydroxide). The conversion of sodium bicarbonate to sodium carbonate may take place at any place between the plant between the dissolver 117 and the crystallizer 102, for example in the weak liquor tank 116, in the leach tank 110, in the centrate tank 119, in one vessel of the tank 110, and/or in the first thickener 113.

Additionally, the waste or pond solid may contain organic impurities, some of which may have foam-causing propensity. The greater the fraction of leached residue to be added in the liquor 111, the greater the need to selectively dissolve some of the organic impurities via leaching and/or selectively precipitate some by magnesium treatment before the liquor enters the crystallizer 102.

According to an embodiment of the present invention carried out in FIG. 3, a optional magnesium treatment may be carried out in order to remove at least partially some of the impurities remaining in the leached residue, such as silicates and/or foam-causing organics.

For example, a magnesium compound may be added to a liquor comprising at least a portion of the leached residue to effect the removal (at least partial) of water-soluble silicate(s) and/or organic impurities.

The addition of magnesium compound may be carried out in unsaturated liquor such as in weak liquor 115 (e.g., addition point 125) or at any location in between the bottom exit of the first thickener 113 and the leach tank 110 including in second thickener 113a (e.g., at addition point 113'), in supernate 124, in the weak liquor tank 116, and/or in dissolver 117 (e.g., at addition point 117'). For example, the magnesium treatment may be carried out by adding the magnesium compound in the second thickener 113a which is fed by the portion 123' comprising dissolved leached residue exiting the dissolver 117. For example, the magnesium compound (e.g., in dissolved or slurried or dispersed or suspended form) may be mixed with portion 123' comprising dissolved leached residue before the portion 123' enters the secondary thickener 113a or may be added separately to the secondary thickener 113a (as shown with addition point 113').

An alternate or additional treatment with a magnesium compound may be carried out on a saturated or near-saturated sodium carbonate-containing liquor. As an example, a magnesium compound may be added to a liquor comprising at least a portion of the leached residue and dissolved calcined trona to form a silicate precipitate effecting the removal of some water-soluble silicates impurity. The addition may be carried out in the leach tank 110, in the classifier 112, in the classifier overflow 118 (e.g., addition point 126), in the primary thickener 113, or at any location in between the leach tank 110 and the primary thickener 113.

The location of the magnesium compound addition is chosen so as to provide sufficient amount of time to allow the desired silicate removal in the treated liquor by formation of insoluble silicates. The time necessary for formation of precipitate should be at a minimum of 5 minutes, but preferably at least 20 minutes, more preferably between 20 and 60 minutes, but can be as long as 24 hours.

Since the weak liquor stream 115 is fed to the leach tank 110 where the calcined trona is dissolved, magnesium may be added in a stoichiometric amount with respect to the formation of magnesium silicate not only based on the silicate content present in the weak liquor entering the tank 110 but also based on the silicate content in the calcined trona entering the tank 110. Alternatively, the magnesium compound can be added in a sub-stoichiometric or super-stoichiometric amount, so as to achieve the desired partial or complete removal of the soluble silicates present in the solution contained in the leach tank 110. If there is still magnesium remaining in forms other than silicate in the weak liquor stream 115 which is carried over in the leach tank 110, there may be additional removal of soluble silicates from the calcined trona being dissolved in the leach tank 110, for example by a subsequent conversion of magnesium compounds more water-soluble than magnesium silicate.

Even though FIG. 3 is described for the production of soda ash with the recycling of the solid deposit 105 recovered from the pond 104, it is envisioned that the recycling of such recovered pond solid may be performed in a process which produces sodium bicarbonate, in which the tailings pond 104 may be operated under conditions favorable for the crystallization of sodium bicarbonate and/or sodium sesquicarbonate. In this instance, the solid deposit formed in the pond may comprise crystallized sodium bicarbonate and/or sodium sesquicarbonate, and this solid deposit would also contain water-soluble impurities. When at least a part of such deposit is excavated and recycled to the sodium bicarbonate process and/or to the soda ash process, the method either with a one-step impurity removal method (a leaching method) or with a two-step impurity removal method (a leaching step followed by a magnesium treatment) according to the present invention may be carried out on the sodium-bicarbonate containing solid as described previously in order to reduce the impurities content.

An example of a process for producing sodium bicarbonate can be found in US PreGrant Published Patent Application US 2009/0291038 by Davoine et al. which is incorporated herein by reference.

Another example of a process in which crystalline sodium carbonate and bicarbonate are co-produced is shown in FIG. 4 which illustrates yet another embodiment of the present invention. In FIG. 4, the operation of trona calcination in calciner 108, dissolution of calcined trona in leach tank 110, separation of insolubles from saturated or near-saturated liquor in the separation system (such as in units 112, 113, 113a, 114), operation in the monohydrate crystallization system (crystallization in crystallizer 102, recirculation of liquor through heat exchanger 107, withdrawal and separation of the centrate 129 using centrifuge 128 of FIG. 3) proceeds as previously described for FIG. 3.

The process carried out in the plant of FIG. 4 differs however from that of FIG. 3 as follows. At least a portion (103c) of the monohydrate purge liquor 103 is sent to a bicarbonate process. Optionally a part of the mother liquor 129 or centrate liquor 121 further may be directed to the same bicarbonate process instead of being recycled to the monohydrate crystallizer 102. Another portion (103a) of the monohydrate purge liquor 103 may be sent to the pond 104a while another portion (103b) of the monohydrate purge liquor 103 is directed to the leaching unit 10 to provide at least a portion of the leach solution 30.

FIG. 4 further comprises the creation of a second purge liquor exiting the bicarbonate process which is sent to the tailings pond 104a where there is formation of a new pond deposit 105a. At least a portion of this pond deposit 105a is recovered, purified by the two-step impurities removal method, and directed for further processing in the co-production plant. The recovered pond solid may contain water-soluble impurities being selected from the group consisting of sodium chloride, sodium sulfate, silicates, organics, and combinations thereof. The recovered pond solid may further have an impurity containing an element being selected from the group consisting of magnesium, calcium, iron, aluminum, and combinations thereof. This recovered pond solid also contain one sodium compound selected from the group consisting of sodium carbonate decahydrate, sodium carbonate monohydrate, sodium carbonate heptahydrate, sodium bicarbonate, sodium sesquicarbonate, and any combinations of two or more thereof.

This recovered pond solid is subjected to a first impurities removal step (i.e., the leaching method) according to one embodiment of the present invention in the leaching unit 10 as previously described in FIG. 1 or by any leaching method described with respect to FIG. 2a-2i.

A liquor which contains at least part of the dissolved leached residue may be then subjected to a second impurities removal step (i.e., a magnesium treatment).

The operation of the process according to FIG. 4, trona ore 106 is crushed and calcined in the calciner 108. Crushed calcined trona and a weak liquor stream 115a are introduced in the leaching tank 110. The resulting liquor 111a contains water insolubles and it is purified in at least one separation unit 150 to form the purified aqueous solution 127. Separation unit 150 may include a classifier, one or more thickeners, and/or a filtration system, such as classifier 112, thickeners 113 and 113a, and filter 114 which were previously described in the context of FIG. 3. The crystallizer feed 101 comprising the filtrate 127 and at least a centrate portion 121 of a recycled mother liquor 129 is introduced into the monohydrate crystallizer 102, wherein a suspension 130 containing sodium carbonate monohydrate crystals is produced. A crystalline final product 109 containing these monohydrate crystals is separated from the suspension 130 in a separator (such as centrifuge 128 previously described in the context of FIG. 3), while at least a centrate portion 121 of the resulting mother liquor 129 is sent back to the crystallizer 102.

In some embodiments of FIG. 4, the portion 121a of the mother liquor 129 from the monohydrate process which is not recycled to the crystallizer 102 can be sent to a reactor 131 where sodium bicarbonate is formed by reaction of sodium carbonate with $CO_2$.

A second crystallizer feed 103c comprising a portion of the monohydrate purge stream 103 exiting from the crystallizer 102 and/or the portion 121a of the mother liquor 129 is fed to the reactor 131. The sodium carbonate present in the second crystallizer feed 103c is reacted with $CO_2$ to form sodium bicarbonate which is crystallized. In some embodiments, the second crystallizer feed 103c comprising sodium carbonate comprises at least 175 g/kg of sodium carbonate, and the carbon dioxide feedstock 132 comprises at least 90% $CO_2$. The $CO_2$ feed to the reactor 131 may be from a carbon dioxide feedstock 132 and/or from $CO_2$-containing effluents 139 and 140 (described later) generated in the co-production plant.

The second crystallizer feed 103c may consist essentially of the purge stream 103 exiting from the monohydrate crystallizer 102, or may consist essentially of the portion 121a of the mother liquor 129. The second crystallizer feed 103c may contain at least 175 g/kg, preferably at least 190 g/kg, more preferably at least 205 g/kg, most preferably at least 220 g/kg of sodium carbonate. The second crystallizer feed 103c may contain not more than 250 g/kg, preferably not more than 240 g/kg of sodium carbonate. The second crystallizer feed 103c may contain not more than 30 g/kg, preferably not more than 20 g/kg, more preferably not more than 15 g/kg, most preferably not more than 10 g/kg of sodium bicarbonate. The second crystallizer feed 103c comprises water-soluble impurities such as sodium chloride (NaCl), sodium sulfate ($Na_2SO_4$), silicates, and/or organics. The second crystallizer feed 103c may contain at least 0.1 g/kg, preferably at least 0.5 g/kg of Si (counted as silica). The second crystallizer feed 103c may contain not more than 1.5 g/kg of silica, preferably not more than 1 g/kg of silica. It is also recommended that the second crystallizer feed 103c does not contain more than 60 g/kg, preferably not more than 50 g/kg of sodium chloride, and/or does not contain more than 20 g/kg sodium sulfate, more preferably not more than 15 g/kg of sodium sulfate.

If the content in water-soluble impurities (silicates and/or organics) in the second crystallizer feed 103c exceeds what may be acceptable, then the second crystallizer feed 103c may be subjected to an optional impurity removal treatment such as the magnesium treatment (which forms water-insoluble matter with at least a portion of the water-soluble impurities), and then may be separated before being directed to the reactor 131.

The reactor 131 serves as a reaction zone for the conversion of sodium carbonate with carbon dioxide ($CO_2$) as well as a crystallizer for making crystalline sodium bicarbonate. The reactor 131 comprises generally a gas-liquid contactor, such as a well stirred gas-liquid reactor, comprising a gas injector able to distribute the gas homogeneously into the reactor. The liquid constitutes advantageously the continuous phase inside the reactor 131, the gas being injected at the bottom and moving upwards. The reactor 131 preferably comprises cooling means, to counteract the exothermicity of the reaction. The temperature inside the reactor 131 may be between 60° C. and 80° C., more preferably between 65° C. and 75° C. The temperature of the second crystallizer feed 103c (part of monohydrate purge stream 103 and/or part 121a of the mother liquor 129) when it is fed to the reactor 131 is typically at a higher temperature, preferably between 80° C. and 95° C. In order to obtain a suitable aqueous suspension comprising sodium bicarbonate crystals, the residence time in the reactor 131 may be greater than 10 minutes, preferably greater than 20 minutes.

The carbon dioxide fed to the reactor 131 must react efficiently with the sodium carbonate from the second crystallizer feed in the reactor 131. To that end, it is recommended that the combined source of carbon dioxide such as feedstock 132 and/or $CO_2$-containing effluents 139 and 140 comprises at least 20% in weight, or at least 40%, or at least 60%, or preferably at least 80% $CO_2$. It is particularly efficient to use pure (100%) $CO_2$, but not required.

The $CO_2$ feed to the reactor 131 can have different origins. In some embodiments, the $CO_2$ feedstock 132 may come from a natural gas plant, after having been concentrated for example through an amine process. The $CO_2$ feed preferably comes from the monohydrate soda ash plant, for instance may include the $CO_2$-containing effluent 140 from the calciner 108 used to calcine the trona and/or the $CO_2$-containing effluent 139 from an optional $CO_2$ extraction unit 138. In the process for the joint production of sodium carbonate and sodium bicarbonate crystals as illustrated in FIG. 4, the carbon dioxide feed to reactor 131 may be produced by indirect calcination of a composition releasing $CO_2$ upon calcination, preferably a composition comprising an alkali bicarbonate, more preferably a composition comprising sodium sesquicarbonate or trona. Calcination of trona is advantageously operated between 140° C. and 180° C. By indirect calcination is meant calcination wherein the composition to be calcined is not in direct contact with the heat source utilized to warm the calciner. This is indeed the situation in conventional calciners, wherein the composition is in direct contact with the combustion gases produced by the burning fuel. In such embodiment, steam heated calciners can be used, wherein the steam is circulated into pipes, and the composition, preferably trona, is heated by contact with the exterior surface of the pipes. The steam is advantageously produced by electricity and steam cogeneration. When the calciner 108 in FIG. 4 is a steam heated calciner, it produces the calciner effluent 140 which comprises $CO_2$, after suitable drying for instance by a condensing step, so that the calciner effluent 140 has an elevated concentration in $CO_2$, typically more than 80% in volume, preferably more than 90%, most preferably more than 95%. Thus the calciner effluent 140 comprising $CO_2$ produced that way is especially suitable as part of the carbon dioxide feed to the reactor 131 for the production of sodium bicarbonate from sodium carbonate.

The suspension 133 produced into the reactor 131 is subjected to a separation. The separation of the crystals from the suspension can be carried out by any appropriate mechanical separating means, for example by settling, by centrifugation, by filtration, or by a combination of these three separating means. The sodium bicarbonate crystals are preferably separated in a separation system 135 (preferably including a filter), dried and packed to form a sodium bicarbonate product 134.

A second liquor stream 136 exits the separation system 135. This second liquor stream 136 may be sent directly at least in part to the tailings pond 104a. Alternatively or additionally, the second liquor may be directed (at least in part) to an optional $CO_2$ extraction unit 138. This second liquor stream 136 or part thereof is reacted with vapor 137 (or 'debicarbonated') in the unit 138 to release $CO_2$ from bicarbonate, and upon exiting the unit 138, the debicarbonated liquor stream 136a is sent to the tailings pond 104a.

The effluent stream 139 comprising carbon dioxide exits the optional $CO_2$ extraction unit 138 and may be recycled to the reactor 131, as this $CO_2$-containing effluent 139 can serve as a portion of the $CO_2$ feed for the reaction with sodium carbonate.

The tailings pond 104a thus may receive the second liquor stream 136 (or a part thereof) exiting the separation system 135, the debicarbonated liquor stream 136a exiting the unit 138, and/or at least a portion 103a of the purge liquor 103 exiting the monohydrate crystallizer 102. In the tailings pond 104a, evaporative and/or cooling crystallization takes place resulting in forming crystals of at least one sodium compound selected from the group consisting of sodium bicarbonate, sodium sesquicarbonate, sodium decahydrate, sodium heptahydrate, sodium monohydrate, and combinations thereof, these crystals accumulating in the pond deposit 105a. The pond deposit 105a preferably contains crystals of at least one sodium salt selected from the group consisting of sodium bicarbonate, sodium sesquicarbonate, sodium decahydrate, and combinations thereof, or more preferably contains crystals of at least one sodium compound selected from the group consisting of sodium bicarbonate, sodium sesquicarbonate, and combinations thereof. The pond deposit 105a is generally contaminated with water-soluble impurities, including sodium chloride, sodium sulfate, silicates and/or organics, some of which may be foam-causing agents. At least a portion of this pond deposit 105a is recovered for recycling in the plant.

The recycling of the recovered pond solid to the plant proceeds as follows.

The mass 20 of recovered pond solid 105a and the leach solution 30 (aqueous medium) are fed to the leaching unit 10. During leaching, there is a selective dissolution of the some of the water-soluble impurities from the solid to the solution to form a (liquid) leachate stream 60 and a (solid) leached residue 50 which has a reduced content in water-soluble impurities. The leachate stream 60 may be directed back to the pond 104a and/or may be directed back to the leaching unit 10 for additional contact with the pond solid mass 20.

The leached residue 50 is then sent to a dissolver 117a. A portion 122 of weak liquor from the weak liquor tank 116 may provide the aqueous medium for the dissolution of the reclaimed solid in the dissolver 117a. Since the dissolution of leached residue 50 in water may be endothermic, the heat necessary for dissolution may be provided by the portion 122 of weak liquor entering dissolver 117a since the temperature of portion 122 is higher than the dissolver temperature. The temperature in the dissolver 117a is generally greater than about 90° F. (32° C.), or greater than about 100° F. (38° C.), and at most about 140° F. (60° C.) or at most about 120° F. (49° C.). The operating pressure in the dissolver 117*a* is generally atmospheric. The residence time in the dissolver 117*a* is generally at least 10 minutes, and can be up to 60 minutes. The weak liquor tank 116 as illustrated in FIG. 4 or a secondary thickener (not illustrated) used in the separation unit 150 (such as thickener 113*a* described in FIG. 3) serves as a holding tank for the weak liquor stream 115*a* to be sent back to the leach tank 110 as previously described for the weak liquor stream 115 of FIG. 3.

A portion or all of the stream 123 (comprising dissolved leached residue) exiting the dissolver 117*a* may be mixed with the weak liquor stream 115*a* exiting the weak liquor tank 116 (as shown) or may be directed to the weak liquor tank 116 (not shown). The weak liquor stream 115*a* fed to the leach tank 110 serves to dissolve the crushed calcined trona. The saturated or near-saturated solution or liquor 111*a* exits the leach tank 110 and is directed to the separation unit 150.

According to the present invention, the mass 20 of waste solid which feeds the leaching system 10 comprises or consists essentially of at least a portion of the pond deposit 105*a* which is recovered from the pond 104*a*. The solid mass 20 subjected to the leaching preferably consists of a portion of the pond deposit 105*a* recovered from the tailings pond 104*a*. However, when the solid mass 20 contains a portion of the pond deposit 105*a* recovered from the tailings pond 104*a*, it may further contain crushed mined trona, calcined trona, an unsalable portion of soda ash product 109, an unsalable portion of sodium bicarbonate product 134, and/or a solid originating from a crystallizer other than the monohydrate crystallizer 102 (not illustrated). In preferred embodiments, the mass 20 of waste solid does not contain crushed trona or calcined trona. In alternate or additional embodiments, the mass 20 of waste solid does not contain soda ash product 109 or sodium bicarbonate product 134.

The leaching system 10 can comprise any of the leaching units such as those illustrated in FIG. 2*a*-2*i*, either individually or in any combination. The leaching method used in leaching system 10 thus can encompass any of the steps or techniques as described earlier in relation to FIG. 2*a*-2*i*, either performed individually or performed in any combination.

The leach solution 30 to be used in the leaching system 10 as generally illustrated in FIG. 1 and described earlier may comprise the portion (103*b*) of the monohydrate purge liquor stream 103 exiting the monohydrate crystallizer 102. Additionally or alternatively, the leach solution 30 may comprise at least a portion of another purge liquor exiting the sodium bicarbonate crystallization system, such as at least a portion of the second liquor stream 136 exiting the separation system 135 and/or at least a portion of the debicarbonated liquor stream 136*a* exiting the optional $CO_2$ extraction unit 138. The leach solution 30 may additionally comprise mine water or another plant effluent (such as an overflow from a classifier, a thickener supernatant, an effluent from a secondary thickener, . . . ).

The leached residue 50 exiting the leaching system 10 can be directed to the dissolver 117*a* where it will be dissolved into an aqueous medium (preferably weak liquor 122) for reuse to make soda ash.

The leachate stream 60 exiting the leaching system 10 can be directed to the pond 104*a* and/or directed to the leaching unit 10 for additional contact with the solid.

In an alternative or additional embodiment not illustrated in FIG. 4, in lieu of directing the dissolved leached residue (in stream 123) to the leach tank 110 via stream 115*a*, a portion or all of the dissolved leached residue (stream 123) exiting the dissolver 117*a* may be sent to a secondary thickener (not illustrated) used in the separation unit 150 (such as second thickener 113*a* in the series of thickeners as illustrated in FIG. 3).

According to one embodiment of the present invention carried out in FIG. 4, a second impurity removal step (a magnesium treatment) is carried out in order to remove at least partially some of the impurities remaining in the leached residue, such as silicates and/or foam-causing organics. For example, a magnesium compound may be added to a liquor comprising at least a portion of the leached residue to effect the removal (at least partial) of water-soluble silicate and/or organics impurities.

The addition of magnesium compound may be carried out in unsaturated liquor such as in weak liquor 115*a* (e.g., addition point 125) or in the weak liquor tank 116, and/or in dissolver 117*a* or in a secondary thickener used in the separation unit 150 such as thickener 113*a* illustrated in FIG. 3 (e.g., addition point 113'). For example, the magnesium compound (e.g., in dissolved or slurried or dispersed or suspended form) may be mixed with weak liquor 115*a* comprising dissolved leached residue before the weak liquor 115*a* enters the tank 110.

An alternate or additional treatment with a magnesium compound may be carried out on a saturated or near-saturated sodium carbonate-containing liquor. As an example, a magnesium compound may be added to a liquor comprising at least a portion of the leached residue and dissolved calcined trona to form insolubles effecting the removal of some silicate and/or organics impurities. The addition may be carried out in the leach tank 110, in a classifier used in the separation unit 150, such as classifier 112 illustrated in FIG. 3, or its classifier overflow (e.g., addition point 126).

Additionally although not illustrated, if the content in impurities (silicates and/or organics) in the bicarbonate feed 103*c* (comprising a portion of the monohydrate purge liquor 103) which is fed to the reactor 131 exceeds what may be acceptable for formation of crystalline sodium bicarbonate, then the feed 103*c* may be subjected to a magnesium treatment and then separated before being directed to the reactor 131.

Figure 5:
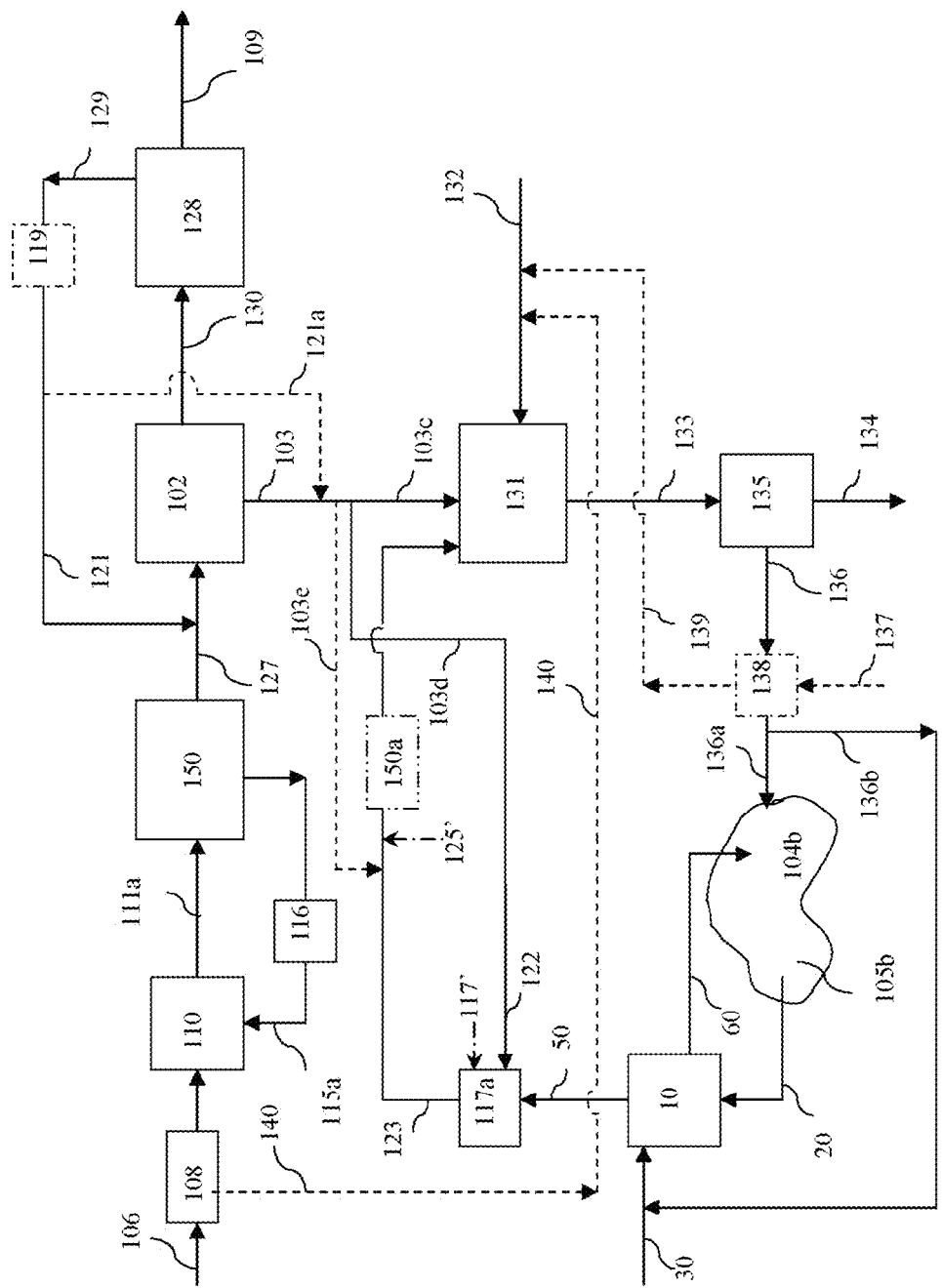
FIG. 5 illustrates another process which co-produces sodium carbonate and sodium bicarbonate according to a twelfth embodiment of the present invention, such process recycling a leached residue of a solid mass which is recovered from a deposit in a tailings pond to the sodium bicarbonate process.

Another example of a process in which crystalline sodium carbonate and bicarbonate are co-produced is shown in FIG. 5 which illustrates yet another embodiment of the present invention. The operation of trona calcination in calciner 108, dissolution of calcined trona in leach tank 110, separation of insolubles from saturated or near-saturated solution in the separation system (such as units 112, 113, 113*a*, 114), operation in the monohydrate crystallization system (crystallization in crystallizer 102, recirculation of liquor through heat exchanger 107, withdrawal and separation of the centrate 129 using centrifuge 128 of FIG. 3) proceeds as previously described for FIG. 3. Similarly to FIG. 4, at least a portion of the monohydrate purge liquor 103 is sent via feed 103*c* to the bicarbonate process which includes reactor 131, unit 135, and optional unit 138. Optionally a part of the mother liquor 129 or centrate liquor 121 may be also sent to the same bicarbonate process instead of being recycled to the crystallizer 102.

The process carried out in the plant of FIG. 5 differs however from that of FIG. 4 as follows. None of the monohydrate purge liquor 103 is sent to a tailings pond 104*b*. While a portion of the monohydrate purge liquor 103 in feed 103*c* is sent to the reactor 131 for the conversion of sodium carbonate to bicarbonate, another portion (103*d*) of the monohydrate purge liquor 103 is sent to the dissolver 117*a* where the leached residue 50 exiting the leaching unit 10 is dissolved. A portion or all of the stream 123 (comprising dissolved leached residue) exiting the dissolver 117*a* is then directed to the reactor 131. As for the second (bicarbonate) purge liquor 136 exiting the bicarbonate process, a portion thereof in line 136a is sent to the tailings pond 104b where there is formation of a new pond deposit 105b, while another portion in line 136b serves as at least a portion of the leach solution 30 in leaching unit 10.

According to an embodiment of the present invention carried out in FIG. 5, a magnesium treatment is carried out in order to remove (at least partially) some of the impurities remaining in the leached residue, such as silicates and/or foam-causing organics. The addition of magnesium compound may be carried out in stream 123 (comprising dissolved leached residue) exiting the dissolver 117a (e.g., addition point 125') or in a tank receiving such stream 123 (not illustrated). For example, a magnesium compound may be mixed in stream 123, and then the treated liquor enters a secondary separation unit 150a in which the formed insolubles are removed to form the purified stream which is then fed to the bicarbonate reactor 131.

In some embodiment, if the content in water-soluble impurities (silicates and/or organics) in the feed 103c to the bicarbonate reactor 131 exceeds what may be acceptable for formation of crystalline sodium bicarbonate, then it may be subjected to a magnesium treatment and then separated before being directed to the reactor 131. As illustrated, a portion 103e of feed 103c is mixed with stream 123 exiting the dissolver 117a before the Mg addition point 125' of the magnesium compound and then the treated combined streams enter the secondary separation unit 150a to form a purified solution which is then directed to the reactor 131.

According to yet another not-illustrated embodiment of the present invention which is applicable to the processes illustrated in FIGS. 3-5, the method may further comprise converting sodium bicarbonate to sodium carbonate, for example by the addition of an alkali (e.g., hydroxide, lime). This step may be carried out regardless whether the impurity reduction in the leached residue takes place. Applicants have found that the presence of sodium bicarbonate in the crystallizer feed 101 (saturated or near-saturated solution) negatively impacted the crystallization of sodium carbonate monohydrate in the crystallizer 102, especially if the sodium bicarbonate is allowed to exceed its saturation point varying from 1.5% to 3.5% in the crystallizer 102 (the range being depending on the crystallizer temperature). The bicarbonate content in the saturated or near-saturated liquor resulting from dissolved calcined trona is typically dictated by appropriate selection of the calcination conditions. Thus, in general, the bicarbonate content is deliberately maintained at sub-saturation level. However, when the leached residue 50 (comprising sodium carbonate decahydrate, bicarbonate, and/or sesquicarbonate) is recycled to the soda ash production or to the soda ash/bicarbonate co-production plant, it may bring along significant amounts of sodium bicarbonate, and the usual control on the bicarbonate content of the crystallizer feed 101 to the monohydrate crystallizer 102 is not effective in this scenario.

The alkali addition or pH adjustment for bicarbonate conversion to carbonate is preferably carried out after the leaching method in unit 10, but can also be carried out at different points in the soda ash or co-production plant. The pH adjustment is generally performed by adding at least one alkaline compound, preferably in soluble form, such as a solution of sodium hydroxide or lime, to achieve a final solution pH of about 11.5. Adjusting the pH can be performed in the weak liquor tank 16, leach tank 110, thickener 113, or centrate tank 119, as illustrated in FIG. 3. Adjusting the pH is preferably performed in the leach tank 110. As explained earlier, for practicality, the leach tank 110 may comprise two or more vessels operated in series in which several stages of dissolution take place. In such case, the pH adjustment can be performed on the most downstream vessel so that there is sufficient time in the formation of water-insoluble matter via optional chemical treatment(s) to remove some water-solubles impurities (such as silicates), before pH is adjusted to convert the sodium bicarbonate to sodium carbonate.

Although not illustrated in FIG. 3-5, the weak liquor tank 116, or the dissolver 117 or 117a, or the centrate tank 119 may be provided with a means for agitation, such as an impeller, a stirrer, a mixer, a high-flow recirculation loop, a gas sparger, and the like. The agitation would rapidly mix the dissolved solids inside the weak liquor tank 116. If the leached residue 50 is added in a conduit (for example the conduit through which the weak liquor stream 115 or 115a flows) in dissolved form or not, the addition of the leached residue 50 should be done in such a manner to provide good mixing for the leached residue 50 to disperse well in the liquor flowing through the conduit.

Although not illustrated, sodium sulfite may be produced by the reaction of sulfur dioxide gas with a sodium alkali solution in a reactor. The sodium alkali solution may be a sodium hydroxide solution or a sodium carbonate-containing solution. Sodium carbonate-containing solutions can be prepared by calcining and dissolving sodium sesquicarbonate (trona ore) as explained in the context of FIG. 3. For example, the saturated or near-saturated sodium carbonate-containing solution shown as purified solution or filtrate 127 in FIG. 3-5 would be a suitable sodium carbonate-containing feedstock to be used in the sodium sulfite process. The reduction in impurities via the present two-step method most likely will result in higher sodium sulfite product quality especially when a waste solid (comprising or consisting of a pond solid) is leached and treated with magnesium before it is used in the making of the sodium carbonate-containing feedstock.

In addition to higher sodium sulfite product quality, the overall reduced impurities content via the present two-step method as early in the process as possible further results in increased on-stream time and lower cost of production by reducing the frequency of need to clean the crystallizer heat exchanger.

The carrying out of the present one-step or two-step impurity removal method according to the present invention should provide one or more of the following advantages: improving product quality by decreasing the friability of crystalline sodium carbonate product or improving the photochemical property of crystalline sodium sulfite product; reducing the propensity of scale formation on equipment (particularly the crystallizer heat exchanger) exposed to impurities-containing solution by the reduction of water-soluble impurities in such solution, thus decreasing the frequency of expensive high pressure washes of the crystallizer heat exchanger; and allowing the recycling of a pond deposit containing sodium carbonate decahydrate and/or sodium bicarbonate (which are precipitated from a crystallizer purge liquor and deposited in a tailings pond) to the production of sodium carbonate, thus reducing the volume taken up by this deposit and increasing the longevity of the tailings pond and mine reserves and lowering the cost of production.

The carrying out of the present one-step or two-step impurity removal method according to the present invention provides an additional or alternate advantage when there is recycling of a pond solid comprising sodium carbonate decahydrate and/or sodium bicarbonate recovered from a tailings pond, by reducing or eliminating the incidence of foaming in the sodium carbonate monohydrate crystallizer due to the presence of foam-causing agents which are carried over into the process by the recovered pond solid and/or introduced from the calcined ore. The present two-step method may result in a reduction in content of these foam-causing agents which reduces the propensity of foaming in the monohydrate crystallizer and/or in peripheral units associated with the monohydrate crystallizer.

The present invention having been generally described, the following Examples are given as particular embodiments of the invention and to demonstrate the practice and advantages thereof. It is understood that the examples are given by way of illustration and are not intended to limit the specification or the claims to follow in any manner.

EXAMPLES

Examples 1-6

Leaching Step

Example 1

A leaching test was performed on a solid sample which was recovered from a pond deposit in a mother liquor pond which received an overflow from a crystallization pond. The recovered sample had a high content in sodium chloride and sulfate. The composition of the pond deposit is listed in TABLE 2 below.

Total organic carbon (T.O.C) was measured in a Tekmar-Dohrmann Phoenix 8000 TOC Analyzer by infrared detection after oxidation to carbon dioxide by sodium persulfate enhanced by ultraviolet light. The sodium sulfate content was measured by the following method. Sulfate ion was precipitated in an acetic acid ($HC_2H_3O_2$) buffer medium (pH=4) with barium chloride ($BaCl_2$) to form barium sulfate ($BaSO_4$) crystals of uniform size. Turbidity of the $BaSO_4$ suspension was measured and the sulfate ion concentration was determined by comparison of the reading with a standard curve. Chloride was determined potentiometrically using a specific chloride electrode and a standard additions technique. The sodium carbonate and sodium bicarbonate content were determined by an acid/base double endpoint titration with an acid. Contents in other inorganic compounds (Ca, Ma, Fe, Si, Al) were determined by Inductively Coupled Plasma (ICP).

There were two distinct layers with differing colors in the recovered pond deposit sample. A slush-like layer was yellow-colored and thus was identified as "yellow layer" in TABLE 2. A brownish top layer was much harder and was identified as "top layer" in TABLE 2. The average composition of these two layers was identified as 'average' in TABLE 2. Both 'deca' layers were mixed together in a leaching vessel (bucket). The average sodium chloride content in the pond solid sample was very high at 9.8 wt. %, and the average sodium bicarbonate content in the pond solid sample was high as well at 5.15 wt. %.

The leaching test was set up as follows. A small 2.5-gallon (9.46-liter) plastic bucket was used as a leaching vessel. Holes were drilled in the lid and the bottom of the bucket. Chunks of pond solid sample were placed inside the small bucket to form a bed on top of a 100-mesh (0.15-mm) screen in order for the pond solid not to plug the holes at the bottom of the bucket. The small bucket was mounted above a larger 5-gallon (18.9-liter) plastic bucket which contained a leach solution.

TABLE 2

Compositions on average and in two layers of the pond sample

| Components | Content | Yellow layer | Top Layer | Average | Leached Residue |
|---|---|---|---|---|---|
| $Na_2CO_3$ | wt. % | 28.0 | 22.7 | 25.4 | 29.7 |
| $NaHCO_3$ | wt. % | 1.8 | 8.5 | 5.15 | 15.9 |
| $Na_2CO_3$ + $NaHCO_3$ | wt. % | 29.8 | 31.2 | 30.55 | 45.6 |
| $Na_2SO_4$ | wt. % | 2.7 | 3.6 | 3.2 | 1.2 |
| NaCl | wt. % | 4.2 | 15.4 | 9.8 | 1.9 |
| Ca | ppm | 20 | 115 | 68 | 26 |
| Mg | ppm | 30 | 85 | 58 | 157 |
| Fe | ppm | 1 | 2 | 1.5 | 2.4 |
| Si | ppm | 285 | 455 | 370 | 847 |
| Al | ppm | 5 | 5 | 5 | 7 |
| TOC | ppm | 857 | 1855 | 1356 | 1070 |

The leach solution was pumped from the large bucket onto the lid of the small bucket, for the solution to pass through the holes of the lid into the smaller bucket. The holes in the lid allowed for the solution to be "sprinkled" over the solid chunks so as to "wash" the pond solid sample. The solution percolated through the solid chunks to exit the small bucket through the holes at the small bucket bottom for the pregnant solution to drain into the larger bucket. In that way, the leach solution was recirculated over the pond solid sample for the duration of the test except during night-time.

A purge liquor exiting a sodium carbonate monohydrate crystallizer was used as the leach solution. About 1,859 g of the pond solid in the small bucket was leached at room temperature with about 8,453 g of the purge liquor. A peristaltic pump which flowed the purge liquor from the large bucket onto the small bucket lid was set to maintain a constant liquid level in the lid of the small bucket. The measured flow rate was 0.15 ml/min. The test was run for two days, but the pump was shut off during night-time. The purge liquor and pond solid sample were weighed at the end of the test. The final solid weight was about 963 g. The final liquor weight was about 7,856 g. The starting density of the liquor was 1.18 g/ml, and the final specific gravity was 1.13 g/ml.

Liquor samples were taken throughout the leaching test (totaling 1,416 g). The remaining solid sample (leached residue) was dissolved in hot deionized water (the final solution weight was about 3,181 g) allowed to sit over night and then filtered (over a paper filter on a Buchner funnel). The starting purge liquor, the starting solid sample, various liquor samples, the final liquor, and the dissolved leached residue were analyzed for sodium carbonate, sodium bicarbonate, sodium chloride, sodium sulfate, TOC and for various inorganic compounds by Inductively Coupled Plasma (ICP). The composition of the liquor over time is listed in TABLE 3, and the initial and final compositions of the solid are in TABLE 4 below.

Figure 6:
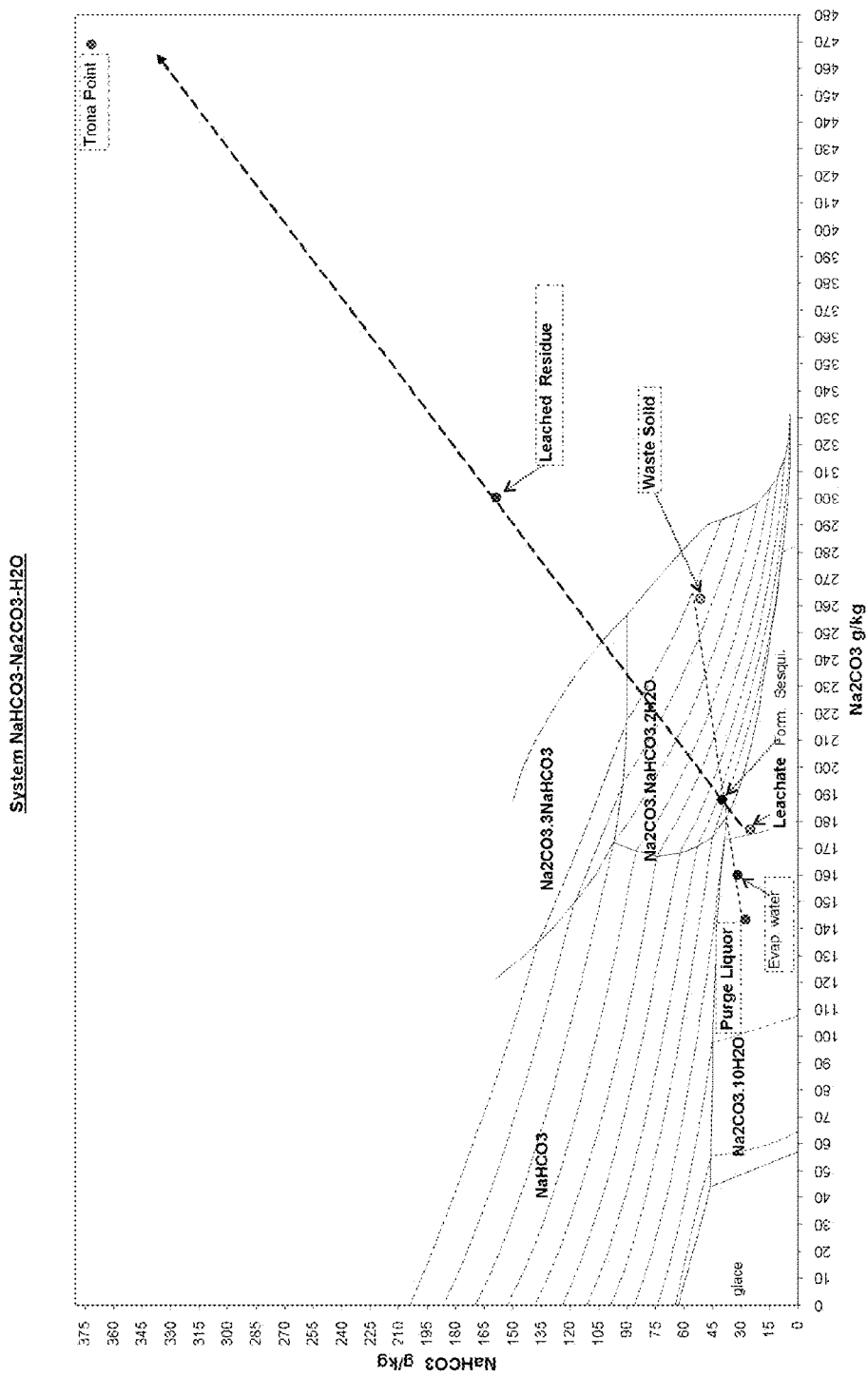
FIG. 6 shows the $Na_2CO_3$—$NaHCO_3$—$H_2O$ phase diagram representing the content in sodium bicarbonate and carbonate of the pond (waste) solid, the leached (solid) residue, the leach solution, and the (liquid) leachate according to one embodiment of the present invention.

The recycled purge liquor became saturated at about 17% sodium carbonate as the solution leached the deca solid. There were a 81% reduction in chloride, 62% reduction in sulfate, and a 21% reduction in TOC from the leached solid. Chloride, sulfate and TOC were significantly reduced in the pond solids sample by recirculating the purge liquor over the solids. The results further indicate that as the purge liquor leached the deca solid, a small amount of water evaporated. As the liquor circulated, there was indeed some evaporation which shifted the liquor into the sesquicarbonate region of the $Na_2CO_3$—$NaHCO_3$—$H_2O$ phase diagram as shown in FIG. 6. As the liquor reached supersaturation, sodium sesquicarbonate precipitated in the solids. Therefore, the final solids analysis contained 16 wt. % sodium bicarbonate.

TABLE 3

Composition of the recycled purge liquor over time during leaching

| | Elapsed Time (min) | | | | | | | | |
|---|---|---|---|---|---|---|---|---|---|
| | 0 | 45 | 100 | 160 | 280 | 400 | 550 | 660 | 820 |
| wt. % $Na_2CO_3$ | 13.98 | 16.29 | 16.59 | 16.72 | 16.9 | 16.85 | 17.00 | 17.09 | 17.26 |
| wt.% $NaHCO_3$ | 2.77 | 2.69 | 2.61 | 2.64 | 2.46 | 2.57 | 2.54 | 2.50 | 2.51 |
| wt.% $Na_2CO_3 + NaHCO_3$ | 16.75 | 18.98 | 19.2 | 19.36 | 19.36 | 19.42 | 19.54 | 19.59 | 19.77 |
| wt. % $Na_2SO_4$ | 0.72 | 1.32 | 1.62 | 1.52 | 1.36 | 1.48 | 1.58 | 1.77 | 1.83 |
| wt. % NaCl | 2.20 | 3.04 | 2.63 | 2.96 | 2.84 | 2.85 | 2.86 | 2.63 | 2.98 |
| ppm Ca | 6 | 6 | 5 | 7 | 5 | 10 | 4 | 3 | 13 |
| ppm Mg | 7 | 9 | 8 | 10 | 8 | 8 | 9 | 9 | 8 |
| ppm Fe | 0.8 | 0.8 | 0.4 | 0.4 | 0.6 | 0.3 | 0.3 | 0.3 | 0.6 |
| ppm Si | 560 | 508 | 475 | 488 | 440 | 438 | 440 | 434 | 410 |
| ppm Al | 2 | 2 | 1 | 1 | 2 | 1 | 1 | 1 | 1 |
| ppm TOC | 441 | 521 | 444 | 469 | 517 | 527 | 518 | 507 | 623 |

TABLE 4

Solid composition before and after leaching with recycled purge liquor

| Sample: | Starting Pond (Crude) Solid | Final Leached Solid |
|---|---|---|
| wt. % $Na_2CO_3$ | 25.4 | 29.7 |
| wt. % $NaHCO_3$ | 5.2 | 15.9 |
| wt. % $Na_2CO_3 + NaHCO_3$ | 30.6 | 45.6 |
| wt. % $Na_2SO_4$ | 3.2 | 1.86 |
| wt. % NaCl | 9.8 | 1.16 |
| ppm Ca | 68 | 26 |
| ppm Mg | 58 | 157 |
| ppm Fe | 1.5 | 2.4 |
| ppm Si | 370 | 847 |
| ppm Al | 5 | 7 |
| ppm TOC | 1356 | 1070 |

TABLE 5

Composition of the longwall water over time during leaching

| | Elapsed Time (min) | | | | |
|---|---|---|---|---|---|
| | 0 | 270 | 460 | 760 | 940 |
| % $Na_2CO_3$ | 8.56 | 14.73 | 15.63 | 16.29 | 16.61 |
| % $NaHCO_3$ | 2.98 | 2.77 | 2.53 | 2.3 | 1.85 |
| % $Na_2CO_3 + NaHCO_3$ | 11.54 | 17.5 | 18.16 | 18.59 | 18.46 |
| % $Na_2SO_4$ | 0.04 | 2.24 | 0.98 | 2.00 | 0.81 |
| % NaCl | 2.99 | 4.56 | 4.69 | 4.32 | 2.18 |
| ppm Ca | 7 | 5 | 5 | 3 | 6 |
| ppm Mg | 16 | 17 | 20 | 20 | 15 |
| ppm Fe | 0.7 | 0.5 | 0.9 | 0.8 | 0.3 |
| ppm Si | 23 | 170 | 200 | 210 | 180 |
| ppm Al | 2 | 3 | 3 | 4 | 3 |
| ppm TOC | 274 | 504 | 514 | 593 | 517 |

Example 2

A similar leaching test was run following the same procedure as in Example 1, except that a different pond solid from a mother liquor pond was used and longwall water was used as the leach solution. The pond solid was recovered from the pond using a trackhoe and was stored on the bank of the pond for 3 months before a sample was taken for testing. The analysis of the weathered solid compared to the initially recovered solid is shown in TABLE 6.

About 5,697 g of the weathered pond solid sample was placed in the small bucket and leached at room temperature with about 4,315 g of longwall water. The peristaltic pump which pumped the longwall water from the large bucket onto the small bucket lid was set to maintain a constant liquid level in the lid of the small bucket. The test was run for two days, but the pump was shut off during night-time. The longwall water and the pond solid sample were weighed at the end of the test. The final solid weight was about 3,590 g. The final solution weight was about 6,045 g.

Liquor samples were taken throughout the test (totaling 370 g). The remaining solid sample (leached residue) was dissolved in hot deionized water allowed to sit overnight and then filtered (over a paper filter on a Buchner funnel). The starting longwall water, the starting solid sample, various solution samples, the final liquor, and the dissolved leached residue were analyzed for sodium carbonate, sodium bicarbonate, sodium chloride, sodium sulfate, TOC, and for various inorganic compounds by ICP. The compositions of the solution are listed in TABLE 5, and the compositions of the crude, weathered and leached solids are in TABLE 6 below.

TABLE 6

Composition of starting (crude), weathered, and leached solids when leaching with recycled longwall water

| Sample: | Starting Pond (Crude) Solid | Weathered Pond Solid | Final Leached Solid |
|---|---|---|---|
| % $Na_2CO_3$ | 25.37 | 23.32 | 24.61 |
| % $NaHCO_3$ | 5.15 | 7.00 | 10.67 |
| % $Na_2CO_3 + NaHCO_3$ | 30.52 | 30.32 | 35.28 |
| % $Na_2SO_4$ | 3.15 | 1.84 | 0.76 |
| % NaCl | 9.8 | 1.84 | 1.28 |
| ppm Ca | 68 | 10 | 21 |
| ppm Mg | 58 | 61 | 88 |
| ppm Fe | 1.5 | 6.3 | 2.8 |
| ppm Si | 370 | 226 | 202 |
| ppm Al | 5 | 2 | 2.2 |
| ppm TOC | 1356 | 576 | 698 |

The recycled longwall water became saturated at about 17% sodium carbonate as the solution leached the pond solid.

It was observed by the natural weathering that the content in $Na_2SO_4$ and NaCl in the solids dropped from 9.8 wt. % and 3.15 wt. % respectively to 1.84 wt. % for both (a 41% reduction for $Na_2SO_4$ and a 81% reduction for NaCl). By weathering, the content in $Na_2CO_3$ in the solids dropped from 25.4 wt. % to 23.3 wt. %, while the content in $NaHCO_3$ in the solids increased from 5.15 wt. % to 7.1 wt. %.

The leaching further reduced the content in $Na_2SO_4$ and NaCl in the solids (a 58% reduction for $Na_2SO_4$ and a 30% reduction for NaCl) for an overall reduction in $Na_2SO_4$ and NaCl content by weathering and leaching of 76% and 87%, respectively.

By weathering and leaching, the content in sodium bicarbonate doubled in the solids.

The content in silicates in the solids dropped by 39% by weathering, and further dropped an additional 10% after leaching for an overall reduction in silicates content of 45% in the solids.

Example 3

Another leaching test was performed on a sample of a 'deca' solid which was recovered from a crystallization tailings pond. A purge liquor was used as a leach solution and was passed through a large graduated cylinder filled with the crude deca pond solid. The bottom of the column had a 40-mesh (0.425-mm) screen, and no vacuum was needed to get the liquor to flow through. The solid was analyzed before and after running the liquor through it. Some of the starting solid was air dried overnight along with the final crystals from the column to analyze its composition.

Three liquor samples were taken throughout the test. The starting purge liquor, various liquor samples, the starting solid sample, and the leached residue were analyzed for sodium carbonate, sodium bicarbonate, sodium chloride, sodium sulfate, and for various inorganic compounds by ICP. The compositions of the liquor are listed in TABLE 7, and the initial and final compositions of the solid are shown in TABLE 8 below.

The starting (crude) deca solid of Example 3 had an already low content in NaCl and $Na_2SO_4$. Because these levels were lower than 1 wt. %, such deca solid would have been acceptable to use 'as is' (that it to say without being subjected to leaching) as a feedstock to make soda ash and/or sodium bicarbonate. The content in NaCl and $Na_2SO_4$ were increased from 0.01 to 0.33 wt. % and 0.1 to 0.22 wt. %, respectively by this leaching, but the resulting content in NaCl and $Na_2SO_4$ in the leached solid were still well below 1 wt. %. It was observed however that the leaching was effective in reducing the silicates level in the leached solid from 840 ppm to 285-566 ppm (a 32-66% reduction).

TABLE 7

Compositions of the purge liquor during leaching

| | Starting Liquor | First Out | Middle | Last Out |
|---|---|---|---|---|
| % TA as $Na_2CO_3$ | 22.35 | 24.17 | 22.42 | 23.65 |
| % $Na_2SO_4$ | 1.00 | 1.11 | 1.18 | 0.95 |
| % NaCl | 2.22 | 1.63 | 1.79 | 1.82 |
| ppm Ca | 0.6 | 9 | 2 | 2 |
| ppm Mg | 3.0 | 8 | 2.0 | 2 |
| ppm Fe | 0 | 2.4 | 0.4 | 0.3 |
| ppm Si | 865 | 1021 | 850 | 791 |
| ppm Al | 4 | 6 | 2 | 1 |

TABLE 8

Composition of the pond solid before and after leaching with purge liquor

| | Starting (Crude) Solid | Top of Pile | Bottom of Pile |
|---|---|---|---|
| % TA as $Na_2CO_3$ | 34.19 | 34.63 | 34.60 |
| % $Na_2SO_4$ | 0.10 | 0.22 | 0.21 |
| % NaCl | 0.01 | 0.32 | 0.34 |
| ppm Ca | 37 | 46 | 66 |
| ppm Mg | 23 | 12 | 32 |
| ppm Fe | 5.7 | 3.6 | 5.1 |
| ppm Si | 840 | 285 | 566 |
| ppm Al | 9 | 6 | 15 |

Example 4

A similar leaching test was run following the same procedure as in Example 3, but with a different pond solid from a crystallization tailings pond. Two air-dried samples for the solids were run by dissolving 20 g samples in 200 ml of DI water and taking aliquots while the starting sample was weighed out directly for each test. The compositions of the liquor are listed in TABLE 9, and the initial and final compositions of the solid before and after leaching with recycled purge liquor are in TABLE 10 below.

TABLE 9

Compositions of the recycled purge liquor before and after leaching

| | Starting Liquor | Final Liquor |
|---|---|---|
| % TA as $Na_2CO_3$ | 12.48 | 16.75 |
| % $Na_2SO_4$ | 0.89 | 0.90 |
| % NaCl | 2.42 | 2.08 |
| ppm Ca | 6 | 17 |
| ppm Mg | 14 | 17 |
| ppm Fe | 1.5 | 1.8 |
| ppm Si | 505 | 561 |
| ppm Al | 9.8 | 6.8 |

The starting (crude) deca solid of Example 4 had an already low content in NaCl and $Na_2SO_4$. Because these levels were ca. 1 wt. % or less, such deca solid would have been acceptable to use 'as is' (that it to say without being subjected to leaching) as a feedstock to make soda ash and/or sodium bicarbonate. When comparing the analysis of air-dried samples, the content in NaCl and $Na_2SO_4$ were slightly decreased from 0.50 to 0.48 wt. % and from 0.69 to 0.60 wt. %, respectively by this leaching, but not significantly. It was observed however that the leaching was effective in reducing the silicates content in the leached solid from 2,666 ppm to 1,957 ppm (26% reduction). The leaching was also effective in reducing the solid content in Ca (33% reduction), Mg (58% reduction), Fe (16% reduction), and Al (40% reduction).

TABLE 10

Solid composition before and after leaching with recycled purge liquor

| | Starting (crude) | Starting (air dried) | Final (air dried) |
|---|---|---|---|
| % TA as $Na_2CO_3$ | 34.5 | 39.06 | 40.29 |
| % $Na_2SO_4$ | 1.07 | 0.69 | 0.60 |
| % NaCl | 0.65 | 0.50 | 0.48 |
| ppm Ca | 169 | 149 | 100 |
| ppm Mg | 85 | 88 | 37 |
| ppm Fe | 7.3 | 7.2 | 6.0 |
| ppm Si | 1102 | 2666 | 1957 |
| ppm Al | 12 | 25 | 15 |

Example 5

Another leaching test was run following the same procedure as in Example 1, except that a different pond solid from a mother liquor pond was used and a co-production plant effluent was used as the leach solution. The mother liquor pond received a monohydrate purge liquor. A portion of the pond deposit was recovered from this pond using a trackhoe and was stored on the bank of the pond for several months before a sample was taken for testing. The co-production plant produced sodium carbonate monohydrate from calcined trona and also produced sodium bicarbonate from at least a portion of the monohydrate purge liquor. As such, the co-production plant effluent used for leach solution contained a sodium bicarbonate purge liquor.

About 4,021 g of the pond solid sample was placed in the small bucket and leached at room temperature with about 3,191 g of the co-production plant effluent. The peristaltic pump which pumped the co-production plant effluent from the large bucket onto the small bucket lid was set to maintain a constant liquid level in the lid of the small bucket. The test was run for two days, but the pump was shut off at night. The remaining solid sample (leached residue) was dissolved in hot deionized water allowed to sit overnight and then filtered (over a paper filter on a Buchner funnel).

The starting co-production plant effluent, the leachate, the starting pond solid sample, and the leached residue were analyzed for sodium carbonate, sodium bicarbonate, sodium chloride, sodium sulfate, Total Organic Carbon, and for various inorganic compounds by ICP. The compositions of the liquid are listed in TABLE 11, and the compositions of the solids are shown in TABLE 12 below.

The leachate became saturated at about 16% sodium carbonate as the co-production plant effluent was recirculated to wash the pond solid, as some of the sodium carbonate from the washed solids dissolved into the leachate.

It was observed that the content in $Na_2SO_4$ and NaCl in the solids dropped after leaching with recirculated co-production plant effluent from 1.78 wt. % and 1.44 wt. % to 0.6 wt. % and 0.75% respectively (a 66% reduction for $Na_2SO_4$ and a 48% reduction for NaCl). The Total Organic Carbon (TOC, ppm) in the solids was also decreased after leaching with recirculated co-production plant effluent from 271 ppm to 178 ppm (representing a 34% reduction in TOC). The content in $Na_2CO_3$ in the solids only dropped slightly from 19.32 wt. % to 18.28 wt. % by leaching, while the content in $NaHCO_3$ in the solids increased from 6.25 wt. % to 7.94 wt. %.

TABLE 11

Compositions of the leach solution/leachate using co-production plant effluent during leaching

| | Starting leach solution (plant effluent) | Intermediate leachate at 1 day | Final leachate at 2 days |
|---|---|---|---|
| % $Na_2CO_3$ | 6.77 | 15.37 | 16.02 |
| % $NaHCO_3$ | 4.69 | 3.02 | 3.14 |
| % $Na_2SO_4$ | 0.58 | 2.17 | 2.13 |
| % NaCl | 2.26 | 2.50 | 2.52 |
| ppm Ca | 14 | 7 | 40 |
| ppm Mg | 8 | 14 | 15 |
| ppm Fe | 1.1 | 0.4 | 0.5 |
| ppm Si | 179 | 197 | 219 |
| ppm Al | 0.5 | 0.4 | 0.5 |
| ppm TOC | 334 | 359 | 417 |

TABLE 12

Composition of starting (crude) and leached solids after leaching with co-production plant effluent

| Sample: | Starting (crude) pond solid | Final leached solid residue |
|---|---|---|
| % $Na_2CO_3$ | 19.32 | 18.28 |
| % $NaHCO_3$ | 6.25 | 7.94 |
| % $Na_2CO_3$ + $NaHCO_3$ | 25.57 | 26.22 |
| % $Na_2SO_4$ | 1.78 | 0.60 |
| % NaCl | 1.44 | 0.75 |
| ppm Ca | 33 | 4 |
| ppm Mg | 34 | 46 |
| ppm Fe | 0.9 | 1.2 |
| ppm Si | 265 | 304 |
| ppm Al | 0.5 | 0.5 |
| ppm TOC | 271 | 178 |

Example 6

A large-scale leaching test was performed using a leaching system similar to the system illustrated in FIG. 2i. A pad 45 of approximately 50 feet by 50 feet was constructed with a gradual slope (approximate angle of 15 to 25 degrees) towards the leachate collection area 55 (sump) and was lined with Visqueen™ (a liquid-impermeable liner) in order to capture and direct leachate reaching the pad to flow into the collection area 55. The collection area 55 was approximately 5 feet wide by 10 feet long by 7 feet deep, and was partially filled with a sodium carbonate-containing plant effluent originating from a soda ash process in which a sodium carbonate monohydrate crystallizer was operated. The plant effluent thus contained a sodium carbonate monohydrate purge and was used as the leach solution.

A mass of about 50 tons of pond 'deca' solids was recovered from a mother liquor pond (which received run-off overflow from a crystallization pond), and was piled on top of the pad and Visqueen™ liner to form the heap 22b.

To prevent the 50-ton heap 22b from running off into the collection zone 55, the 50-ton mass was allowed to drain off after excavation before placing it on top of the pad and liner. The pond solid pile was left middle for approximately two days. A pump (Godwin HL80) was used to pump the solution from the collection area 55 to a Rain Bird impact sprinkler 35e. The sprinkler system sprayed the solution on top of the heap 22b to carry out the leaching step. A leachate flowed through the heap 22b onto the pad 45 and in a downward manner toward the zone 55, where the leachate was recycled via line 70 for additional 'washing' of the heap 22b. The test ran for about 7.7 hours and was carried out outside at an ambient temperature of 40° F. (4.4° C.). The wind speed during the test was approximately 5 miles per hour. There was very little water loss by evaporation during this process, so no make-up of leach solution (identified as 30 in FIG. 2i) was needed in the zone 55.

After the leaching test was stopped, three leached residue samples were taken at different locations from the heap 22b, one of which was positioned about 10 cm (4 in.) into the center of the heap 22b (hereinafter called 'center' sample), while the others are called 'core' samples.

The solution composition at initial, intermediate and final test times, a starting solid sample (taken after idle time before the test was started), and the leached residue samples (taken at three different locations from the treated heap) were analyzed for sodium carbonate, sodium bicarbonate, sodium chloride, sodium sulfate, Total Organic Carbon, and various inorganic compounds. The compositions of the solution/leachate are listed in TABLE 13, and the initial and final compositions of the solid are shown in TABLE 14 below.

TABLE 13

Compositions of the recirculated plant effluent as leach medium in the sump before, during and after leaching

|  | Starting Leach Solution (plant effluent) | Leachate in sump at 270 min | Final Leachate in sump at 460 min |
|---|---|---|---|
| % $Na_2CO_3$ | 10.16 | 9.53 | 9.64 |
| % $NaHCO_3$ | 2.84 | 2.95 | 2.64 |
| % $Na_2SO_4$ | 1.06 | 2.39 | 2.52 |
| % NaCl | 3.14 | 4 | 4.47 |
| ppm Ca | 8 | 7 | 8 |
| ppm Mg | 22 | 16 | 19 |
| ppm Fe | .8 | 1.1 | 1.8 |
| ppm Si | 261 | 196 | 153 |
| ppm Al | 1 | 1 | 2 |
| ppm TOC | 423 | 593 | 631 |

TABLE 14

Compositions of the pond solids before and after leaching

|  | Starting pond solids at t = 0 | Leached pond residue at t = 460 min | | |
|---|---|---|---|---|
|  |  | Center sample | Core sample 1 | Core sample 2 |
| % $Na_2CO_3$ | 27.90 | 29.47 | 27.04 | 29.11 |
| % $NaHCO_3$ | 5.59 | 2.41 | 2.93 | 3.65 |
| % $Na_2SO_4$ | 3.29 | 2.05 | 1.71 | 1.82 |
| % NaCl | 2.47 | 1.47 | 0.77 | 0.66 |
| ppm Ca | 140 | 122 | 100 | 160 |
| ppm Mg | 45 | 48 | 40 | 40 |
| ppm Fe | 15 | 19.8 | 16 | 13 |
| ppm Si | 535 | 648 | 690 | 765 |
| ppm Al | 20 | 25 | 20 | 20 |
| ppm TOC | 391 | 286 | 234 | 232 |

Sodium chloride, sodium sulfate and TOC contents in the pond solids were reduced in the leached residue by circulating a plant effluent as leach solution through the solids heap. On a weight basis, there was from 40 to 73% reduction in sodium chloride (average of about 61% reduction), from 38 to 48% reduction in sodium sulfate (average of about 43% reduction), and from 27 to 41% reduction in TOC (average of about 34% reduction) from the starting pond solids to the leached residue. However, there was an observed increase from 21 to 43% on weight basis in silicates content in the leached residue (average of about 31% increase).

On the other end, the leachate got enriched in sodium chloride, sodium sulfate and TOC, with an increase of 137%, 42% and 49% respectively from their initial contents in the plant effluent. There was also a decrease of 49% in the silicates content in the leachate.

In the Examples 1-6, it was noted that the silicates content may be either increased or decreased by such leaching method. It was observed however that a silicate content decrease in the leached residue was generally obtained when either of these conditions occurred: a/ when the leach solution had a very low Si content (see Example 2 with longwall water when the Si content in leach solution was 23 ppm in the longwall water during leaching and probably even lower in rainwater during weathering); or b/ when the pond solids were from a crystallization pond (see Examples 3 and 4 washed with monohydrate purge liquor) and already had a low impurity contents in sodium chloride and sulfate (about 1 wt % or less) which would make them acceptable as feedstock for a sodium (bi)carbonate plant, but contained high Si content of 700 ppm or more. On the other end, an increase in silicate content in the leached residue was generally obtained when these conditions occurred: c/ when the pond solids were from a mother liquor pond with high sodium chloride and sulfate contents (1.78-3.2% for sulfate and 1.44-9.8 wt % for chloride), and d/ when the leach solution had a Si content from about 179 to 560 ppm.

Examples 7-14

Magnesium Treatment Step

Example 7

A sample of sodium carbonate decahydrate ('deca') was added to the soda ash process weak liquor to increase the total alkalinity as sodium carbonate (TA) of the sample to ~13%. The sample was analyzed for silicon by Inductively Coupled Argon Plasma (ICP) shortly after adding the deca (result ~300 ppm; this was a semiquantitave test that turned out to be half of the actual concentration). Different magnesium compounds were added to aliquots of this solution to remove soluble silicate. Aliquots of magnesium salts were added with the goal of removing half of the silicate and all of the silicate. The mixtures were stirred for 5 minutes and then filtered through a 5-micron filter. Magnesium oxide was added as a 13.5% slurry, magnesium chloride as a 15% solution and magnesium carbonate as a 15% slurry. A portion of the starting solution was filtered with no Mg added. The final filtrates were analyzed for TA, water insoluble matter (insol) and metals by ICP. The results are presented in TABLE 15.

TABLE 15

Silicate removal from a deca/weak liquor mixture with various magnesium compounds

| Sample: | Weak Liquor (WL) | deca/WL Starting Solution Unfiltered | deca/WL Starting Solution Filtered | MgO added to remove ~150 ppm Si | MgO added to remove ~300 ppm Si | $MgCl_2$ added to remove ~150 ppm Si | $MgCl_2$ added to remove ~300 ppm Si | $MgCO_3$ added to remove ~150 ppm Si | $MgCO_3$ added to remove ~300 ppm Si |
|---|---|---|---|---|---|---|---|---|---|
| % TA as $Na_2CO_3$ | 6.01 | 13.31 | 13.52 | 13.19 | 12.87 | 13.08 | 12.93 | 13.30 | 13.25 |
| ppm Insol | NA | NA | 1213 | 1231 | 2441 | 1400 | 3742 | 1300 | 1899 |
| ppm Mg |  |  | 2.9 | 57 | 65 | 80 | 51 | 23 | 31 |
| ppm Si |  |  | 563 | 485 | 447 | 431 | 229 | 542 | 539 |
| % Mg Increase |  |  |  | 1866 | 2141 | 2659 | 1659 | 693 | 969 |

TABLE 15-continued

Silicate removal from a deca/weak liquor mixture with various magnesium compounds

| | Weak Liquor (WL) | deca/WL Starting Solution Unfiltered | deca/WL Starting Solution Filtered | MgO added to remove ~150 ppm Si | MgO added to remove ~300 ppm Si | MgCl$_2$ added to remove ~150 ppm Si | MgCl$_2$ added to remove ~300 ppm Si | MgCO$_3$ added to remove ~150 ppm Si | MgCO$_3$ added to remove ~300 ppm Si |
|---|---|---|---|---|---|---|---|---|---|
| ppm Si Reduction | | | | 78 | 116 | 132 | 334 | 21 | 24 |
| % Si Reduction | | | | 13.9 | 20.6 | 23.5 | 59.3 | 3.7 | 4.3 |

When the magnesium compounds were added to the deca/WL solution, small white particles formed instantly. When the solutions were placed on a stir plate to agitate, a white "snowflake" like precipitate formed. The "snowflake" precipitate increased for about one minute after which the particle size began to decrease. The solution became cloudy in appearance. The magnesium chloride addition at a 100% silicate removal target was the most cloudy and most difficult to filter. For this particular experiment, magnesium chloride removed silicate most effectively in the unsaturated deca/weak liquor solution while magnesium carbonate removed the least amount of silicate. It is expected that increased contact time and/or better agitation may improve the magnesium carbonate results.

Example 8

A sample of deca was added to weak liquor (WL) to increase the TA of the sample to ~13%. The sample was filtered and analyzed for silicon (~500 ppm Si). Aliquots of a 30% magnesium chloride solution were added to a 200-g sample of the WL/deca solution to remove silicate. The solutions were mixed for 5 minutes, allowed to rest for a couple of minutes, then filtered and the final filtrates were analyzed for TA, insolubles content and metals by ICP. The MgCl$_2$ was added in an amount to remove the molecular equivalent of 50%, 75%, 100%, and 125% of the moles of Si present, assuming that one mole of Mg reacts with one mole of Si.

TABLE 16

Silicate removal from a deca/weak liquor mixture with various amounts of magnesium chloride at ambient conditions

| Sample | Filtered Starting Solution | MgCl$_2$ added 50% mole equiv | MgCl$_2$ added 75% mole equiv | MgCl$_2$ added 100% mole equiv | MgCl$_2$ added 125% mole equiv |
|---|---|---|---|---|---|
| g of 30% MgCl$_2$ added to 200 g of WL/deca solution | NA | 0.64 | 0.95 | 1.23 | 1.57 |
| ppm Mg added | NA | 245 | 363 | 470 | 600 |
| % Na$_2$CO$_3$ | 13.02 | 13.06 | 12.95 | 12.84 | 12.64 |
| % NaHCO$_3$ | 0.33 | 0.56 | 0.63 | 0.65 | 0.67 |
| ppm Insol | 2130 | 3688 | 4903 | 2283 | 2651 |
| ppm Mg | 3.9 | 145 | 219 | 262 | 344 |
| ppm Si | 479 | 267 | 263 | 253 | 167 |
| ppm Si Reduction | NA | 212 | 216 | 226 | 312 |
| % Si Reduction | NA | 44 | 45 | 47 | 65 |

The results presented in TABLE 16 further demonstrate that the magnesium chloride removed silicate from the unsaturated sodium carbonate-containing solution. The treated liquors increased in cloudiness as the % in magnesium chloride addition increased.

Example 9

A sample of decahydrate was added to a weak liquor to form a deca/WL solution with a TA of ~13%. Varying amounts of a 30% magnesium chloride solution were added to a 200-g sample of the deca/WL solution to remove soluble silicate. The resulting treated liquors were mixed for 5 minutes allowed to rest for a couple of minutes, then filtered (b & c). A control sample with no magnesium chloride added was also filtered (a). The pH of a portion of the deca/WL solution was raised to 11.7 using 10% NaOH solution. A portion of the resulting higher pH solution was filtered without any MgCl$_2$ addition (d). Two 200-g portions of this higher pH solution were treated with the 30% MgCl$_2$ solution, then filtered (e & f). Two portions of the unfiltered starting solution without pH adjustment were also treated with MgCl$_2$ and after stirring for 5 minutes, the pH was raised to 11.7 with the 10% NaOH solution, and the samples were then filtered (g & h). All of filtrates were analyzed for TA, pH, NaCl, insolubles (insol.) and metals by ICP. The solution (d) which had its pH raised and then filtered was used as the starting Si value for the four samples which had caustic solution added to them. The results are presented in TABLE 17.

TABLE 17

Silicate removal and sodium bicarbonate removal from a deca/weak liquor mixture with magnesium chloride at ambient conditions

| | Sample | | | | | | | |
|---|---|---|---|---|---|---|---|---|
| | (a) Starting deca/WL Solution Filtered | (b) MgCl$_2$ added | (c) MgCl$_2$ added | (d) Starting Soln pH'd to 11.7 then Filtered | (e) Soln pH'd to 11.7, then MgCl$_2$ added, then filtered | (f) Soln pH'd to 11.7, then MgCl$_2$ added, then filtered | (g) MgCl$_2$ added, then Soln pH'd to 11.7, then filtered | (h) MgCl$_2$ added, then Soln pH'd to 11.7, then filtered |
| g of 30% MgCl$_2$ added to 200 g of deca/WL solution | NA | 0.64 | 1.25 | NA | 0.63 | 1.26 | 0.64 | 1.23 |
| % Mole Equiv of Mg Added | — | 118 | 231 | — | 67 | 134 | 68 | 130 |
| ppm Mg added | | 245 | 478 | | 241 | 482 | 245 | 470 |
| % Na$_2$CO$_3$ | 11.96 | 11.58 | 11.67 | 11.54 | 11.54 | 11.41 | 11.86 | 11.76 |
| % NaHCO$_3$ | 0.12 | 0.19 | 0.20 | 0.00 | 0.09 | 0.16 | 0.00 | 0.00 |
| % NaOH | 0.00 | 0.00 | 0.00 | 0.01 | 0.00 | 0.00 | 0.02 | 0.01 |
| % NaCl | 0.14 | 0.25 | 0.36 | 0.15 | 0.25 | 0.36 | 0.23 | 0.35 |
| Filt Soln pH | 11.31 | 11.12 | 11.10 | 11.71 | 11.35 | 11.25 | 11.71 | 11.68 |
| ppm Insol | 2689 | 2371 | 2500 | NA | 2597 | 3514 | 3059 | 4733 |
| ppm Mg | 1.5 | 201 | 430 | 2 | 138 | 261 | 59 | 87 |
| ppm Si | 207 | 156 | 110 | 361 | 189 | 164 | 210 | 108 |
| ppm Si Reduction | | 51 | 97 | | 172 | 197 | 151 | 253 |
| % Si Reduction | | 25 | 33 | | 48 | 55 | 42 | 70 |

By adjusting the pH alone and reducing or eliminating the sodium bicarbonate content, the silicate levels increased (207 ppm Si to 361 ppm Si). This indicated that the most silicate removal occurred when magnesium chloride was first added at a silicate removal target of 100% and then the pH was adjusted to convert the sodium bicarbonate.

Example 10

A sample of sodium carbonate decahydrate ('deca') was dissolved in water to make a Na$_2$CO$_3$ solution of ~13% TA. This solution was heated to about 150° F. and filtered (through both a large paper filter and a small 5-micron filter). The filtrate was analyzed for Si. Two samples were treated with >100% mole equivalents of MgCl$_2$ and MgCO$_3$ to precipitate silicate present in the decahydrate. The mixtures were then filtered and analyzed for TA, Insolubles and metals by ICP. A sample of a liquor purged from a soda ash crystallizer was diluted by 25% to prevent crystallization of the carbonate as it cooled, heated to about 150° F. and the same procedure as above was followed.

TABLE 18

Silicate removal from a decahydrate solution or a purge solution with magnesium chloride and magnesium carbonate at 150° F.

| | Sample: | | | | | |
|---|---|---|---|---|---|---|
| | Deca Starting Solution | Deca Soln Treated 30% MgCl$_2$ | Deca Soln Treated with 10% MgCO$_3$ | Purge Starting Solution | Purge Soln Treated with 30% MgCl$_2$ | Purge Soln Treated with 10% MgCO$_3$ |
| g of 30% MgCl$_2$ or 10% MgCO$_3$ added to 200 g of Deca/Purge solution | NA | 1.60 | 4.20 | NA | 2.65 | 7.00 |
| ppm Mg added | — | 612 | 605 | — | 1014 | 1009 |
| % Mole Equiv of Mg Added | — | 114 | 112 | — | 120 | 119 |
| % Na$_2$CO$_3$ | 14.00 | 13.76 | 14.08 | 20.53 | 20.85 | 21.10 |
| % NaHCO$_3$ | 0.13 | 0.56 | 0.41 | 1.48 | 2.13 | 1.87 |
| ppm Insol | | 3675 | 3270 | 29 | 5267 | 6147 |
| ppm Mg | 2.0 | 26 | 41 | 1.1 | 267 | 148 |
| ppm Si | 620 | 56 | 212 | 976 | 61 | 169 |
| ppm Si Reduction | — | 564 | 408 | — | 915 | 807 |
| % Si Reduction | — | 91 | 66 | — | 94 | 83 |

It was noted that the treated purge solutions filtered much slower than the decahydrate solutions, and the insolubles seemed to be "slimier" than the insolubles from the treated decahydrate solutions. Solutions were maintained around 150° F. throughout the test and were agitated as the Mg compounds were added and during precipitation. All samples treated with magnesium were stirred at 150° F. for 30 minutes before filtering.

The results are presented in TABLE 18. The test demonstrated that silicate removal at 150° F. was successful with both magnesium carbonate and magnesium chloride. The 30-minute agitation time appeared to improve the silicate removal. The magnesium chloride removed silicate more readily than the magnesium carbonate. However there was more silicate removal using the magnesium carbonate in the saturated or near-saturated purge liquor compared to the unsaturated deca liquor.

Example 11

A sample of a sodium sulfite purge solution was filtered and analyzed for silicon by ICP. The solution was treated with a 30% magnesium chloride solution to remove silicate. This test was repeated with different weights of the $MgCl_2$ solution, and then additional portions of the sodium sulfite solution were treated with two different weights of a 30% magnesium sulfate solution.

TABLE 19

Silicate removal from a sodium sulfite purge liquor with addition of magnesium chloride or magnesium sulfate at ambient conditions

| Sample: | Filtered Starting Sulfite Purge Solution | Sulfite Soln Treated with $MgCl_2$ | Sulfite Soln Treated with $MgCl_2$ | Sulfite Soln Treated with $MgSO_4$ | Sulfite Soln Treated with $MgSO_4$ |
|---|---|---|---|---|---|
| g of 30% $MgCl_2$ or $MgSO_4$ added to 200 g of sulfite purge solution | NA | 0.68 | 1.35 | 0.86 | 1.70 |
| ppm Mg added | | 260 | 516 | 261 | 515 |
| % Mole Equiv of Mg Added | | 37 | 73 | 37 | 73 |
| ppm Insol | | 722 | 2307 | 93 | 188 |
| ppm Mg | 2 | 451 | 742 | 378 | 758 |
| ppm Si | 813 | 666 | 489 | 579 | 545 |
| ppm Si Reduction | | 147 | 324 | 234 | 268 |
| % Si Reduction | | 18 | 40 | 29 | 33 |

Each solution was mixed for 5 minutes then allowed to rest for a couple of minutes before filtering. The resulting filtrates were analyzed for insolubles and metals by ICP. It was noted that the samples which were treated with $MgCl_2$ filtered much slower than the samples that were treated with $MgSO_4$. The results are presented in TABLE 19. The test demonstrated that a precipitate formed with both magnesium sulfate and magnesium chloride addition, and that the silicate content in the solutions was reduced when magnesium chloride and magnesium sulfate were added. The precipitate formed when adding the magnesium chloride was gelatinous. The liquor with the magnesium chloride added was more difficult to filter versus the liquor with the magnesium sulfate.

Example 12

A sample of sodium sulfite purge was filtered and analyzed for silicon by ICP (Inductively coupled argon plasma). The solution was treated with a 30% magnesium chloride solution to remove silicate. The solutions were mixed for 5, 30, and 60 minutes, allowed to rest for a couple of minutes, and then filtered. The resulting filtrates were analyzed for insolubles and metals by ICP. The initial temperature of the sulfite purge sample was 167° F., and it cooled to 149° F. before it was treated with $MgCl_2$. The temperature of the solutions which were stirred for more than 5 minutes were heated back to the initial liquor temperature of 167° F., and the final temperature was measured before filtering the samples. The results are presented in TABLE 20. When magnesium chloride was added to the sulfite liquor, a large "snowflake" like crystal formed. As the solution was agitated, the particles became finer and more gelatinous. When magnesium chloride was added, the silicate content in the liquor was reduced. The silicate reduction increased to about 89% removal after 30 minutes. As the mixture was agitated to 60 minutes, the silicate removal remained about the same.

TABLE 20

Silicate removal from a sodium sulfite purge liquor with addition of magnesium chloride under process conditions

| Sample: | Filtered sodium sulfite purge Starting Solution | Sulfite Soln Treated with $MgCl_2$ - 5 min agitation | Sulfite Soln Treated with $MgCl_2$ - 30 min agitation | Sulfite Soln Treated with $MgCl_2$ - 60 min agitation |
|---|---|---|---|---|
| g of 30% $MgCl_2$ added to 200 g of sulfite purge solution | NA | 1.87 | 1.85 | 1.86 |
| ppm Mg added | — | 715 | 708 | 711 |
| % Mole Equiv. of Mg Added | — | 114 | 113 | 113 |
| Final Soln Temp (° F.) | NA | 145 | 163 | 167 |
| ppm Insol | 350 | 1500 | 2611 | 2698 |
| ppm Mg | 1 | 508 | 242 | 237 |
| ppm Si | 724 | 252 | 79 | 98 |
| ppm Si Reduction | — | 472 | 645 | 626 |
| % Si Reduction | — | 65 | 89 | 86 |

Example 13

A magnesium treatment test was carried out in a soda ash plant similar to the plant illustrated in FIG. 3 except without recycle of pond solid 105, where a solution of 27% wt. magnesium chloride ($MgCl_2$) was added to the rake classifier overflow 118 exiting the classifier 112. The classifier overflow 118 was at a temperature of about 180° F. (82.2° C.) and contained dissolved calcined trona and impurities including silicates originating from calcined trona. The magnesium chloride was injected directly into the classifier overflow 118 which flowed into a small surge tank (not illustrated) into the suction of a pump and out to the thickener (first thickener 113) operated at a temperature of about 170° F. (76.7° C.). The retention time from the magnesium chloride addition point to the center well of the thickener 13 was approximately 10 minutes. Based on the thickener volume and production flow rates, the thickener residence time was approximately 24 hours.

The flow rate of the 27% wt. magnesium chloride solution was adjusted during the test based on rates of the plant production and flow rates of the classifier overflow as well as a historical average in silicate concentration in the classifier overflow of about 80 ppm as Si, so as for the added Mg to be in stoichiometric excess with respect to Si for theoretically precipitating 115% of the silicate present in the classifier overflow. For example, for a specific flow rate of 3589 gpm in the classifier overflow containing 80 ppm Si resulting in a specific silicon flow of 0.287 gpm Si, an equivalent Mg flow rate of 0.287/1.15=0.249 gpm Mg resulted in a flow rate of 4.2 gpm of the 27% $MgCl_2$ solution.

Example 14

A sodium carbonate decahydrate solid was recovered from a tailings pond and recycled during a couple of summer months (season No. 1) into the soda ash plant similar to the plant illustrated in FIG. 3, except that the leaching in unit 10 was omitted. The amount of 'deca' being recycled to the plant represented about 4% of the total amount of sodium carbonate. The recovered sodium carbonate decahydrate solid was melted and/or dissolved in the dissolver 117, mixed with the thickener supernatant 124 to form the weak liquor stream 115 which was recycled to the leach tank 110 in which calcined trona was dissolved. The classifier overflow 118 thus was an aqueous saturated or near-saturated sodium carbonate-containing solution containing dissolved calcined trona and dissolved reclaimed sodium carbonate decahydrate as well as impurities including soluble silicates and organics carried over from the reclaimed sodium carbonate decahydrate as well as soluble silicates originating from calcined trona. Insolubles were removed in the first thickener 113. The thickener overflow was passed through the filtration unit 114 to generate a saturated or near-saturated sodium carbonate liquor comprising sodium carbonate, at least a part of which was from a dissolved reclaimed decahydrate. The saturated or near-saturated sodium carbonate liquor was fed to the crystallizer 102 to form sodium carbonate monohydrate crystals, which were dried to form the final soda ash product 109.

During this decahydrate recycling season (No. 1), the final soda ash product appeared more friable, and increased fines formation impacted the soda ash quality. In addition during this season, the soda ash plant experienced increased foaming in the crystallizer bodies. Antifoaming agents were added more frequently, and the plant operators noted that the process was harder to control and had more operational upsets.

The pronounced drop in soda ash quality caused by the increase in fines content as well as the increased incidence of foaming in the sodium carbonate monohydrate crystallizer were linked to the recycling of sodium carbonate decahydrate recovered from the tailings pond. Because the recycled 'deca' had a much higher silicates content than the calcined trona, it was hypothesized that soluble silicates carried over from the recycled deca may have increased the soluble silicates content to a level in the crystallizer that impacted, at least in part, the crystallization process. Although not wishing to be bound by theory, it is believed that when the soluble silicates content is above a certain threshold level in the crystallizer feed, such excess in soluble silicates content may interfere with crystal growth and impact the shape of the sodium carbonate crystals, for example by forming elongated crystals which are more prone to breakage and which result in a more brittle soda ash product.

Several tests were performed in the laboratory with addition of various magnesium compounds to remove some of the soluble silicates as shown in Examples 7-10. These tests indicated that $MgCl_2$ was the most effective in reducing the soluble silicates content. The recycling of sodium carbonate decahydrate recovered from the tailings pond was resumed in the soda ash plant, and a magnesium chloride treatment was initiated at the same time in a second recycle season (no. 2). It was observed that the formation of fines in the soda ash declined when the sodium carbonate containing the recycled 'deca' was treated with $MgCl_2$.

The fines content of the soda ash final product were compared when the soda ash plant was operated with or without recycling sodium carbonate decahydrate recovered from a tailings pond, and with or without $MgCl_2$ treatment. The fines content was assessed by the percentage of the soda ash final product which passed through a 100-U.S. mesh size screen (wherein a 100-mesh size generally corresponds to 0.149 millimeter or 149 microns). As shown in TABLE 21, there was little impact of $MgCl_2$ on the fines content of the soda ash final product when there was no 'deca' recycling. On the other end, the recycling of the 'deca' increased the amount of fines being generated, and a treatment with $MgCl_2$ reduced the negative impact that recycling 'deca' had on the fines production of the soda ash final product.

Over the course of several magnesium treatment campaigns during season No. 2 when 'deca' was recycled, a magnesium chloride aqueous solution (27% by weight) was added at various addition points in the soda ash plant according to FIG. 3 selected from the following: at point 125 to the weak liquor stream 115 which was an unsaturated solution having a temperature of about 126° F. (52.2° C.); at point 126 to the rake classifier overflow which was a saturated or near-saturated solution having a temperature of about 180° F. (82.2° C.) before it was fed to the first thickener 113 operated at a temperature of about 170° F. (76.7° C.); or at point 117' to the dissolver 117 where the decahydrate was being melted and dissolved in water to form an unsaturated sodium carbonate decahydrate solution at a temperature of about 108° F. (42.2° C.). The resulting fines content in the finished soda ash product was measured during the various magnesium treatments. The results are shown in TABLE 22. A 't-test' statistical method was used to compare the fines content, and it was determined that there was a statistically significant difference between the final product percent passing the 100-mesh screen between seasons No. 1 and 2.

TABLE 21

Fines content in soda ash finished product with and without recycling reclaimed sodium carbonate decahydrate and with or without treatment with $MgCl_2$ in the soda ash plant

| | With decahydrate recycle | | Without decahydrate recycle | |
| --- | --- | --- | --- | --- |
| | With $MgCl_2$ | Without $MgCl_2$ | With $MgCl_2$ | Without $MgCl_2$ |
| Fines content (average % passing through 100-mesh) | 6.51 | 7.58 | 5.85 | 5.86 |
| Standard deviation | 1.70 | 2.48 | 1.3 | 1.92 |
| N* | 53 | 48 | 23 | 111 |

TABLE 22

Fines content in soda ash finished product with addition of $MgCl_2$ when recycling of reclaimed sodium carbonate decahydrate

| | With recycling of pond sodium carbonate decahydrate ('deca') | | | Without recycling of pond 'deca' |
| --- | --- | --- | --- | --- |
| Addition Point of $MgCl_2$ | To decahydrate dissolver (17) | To weak liquor stream (25) | To classifier overflow (18) | none |
| Fines content (average % passing through 100-mesh) | 6.76 | 5.39 | 6.03 | 7.58 |

TABLE 22-continued

Fines content in soda ash finished product with addition of $MgCl_2$ when recycling of reclaimed sodium carbonate decahydrate

|  | With recycling of pond sodium carbonate decahydrate ('deca') | | | Without recycling of pond 'deca' |
|---|---|---|---|---|
| Standard deviation | 1.83 | 1.28 | 1.90 | 2.48 |
| N* | 25 | 20 | 76 | 48 |
| lb $MgCl_2$/lb 'deca' | 0.03 | 0.06 | 0.04 | — |

*Number of samples analyzed

Figure 7:
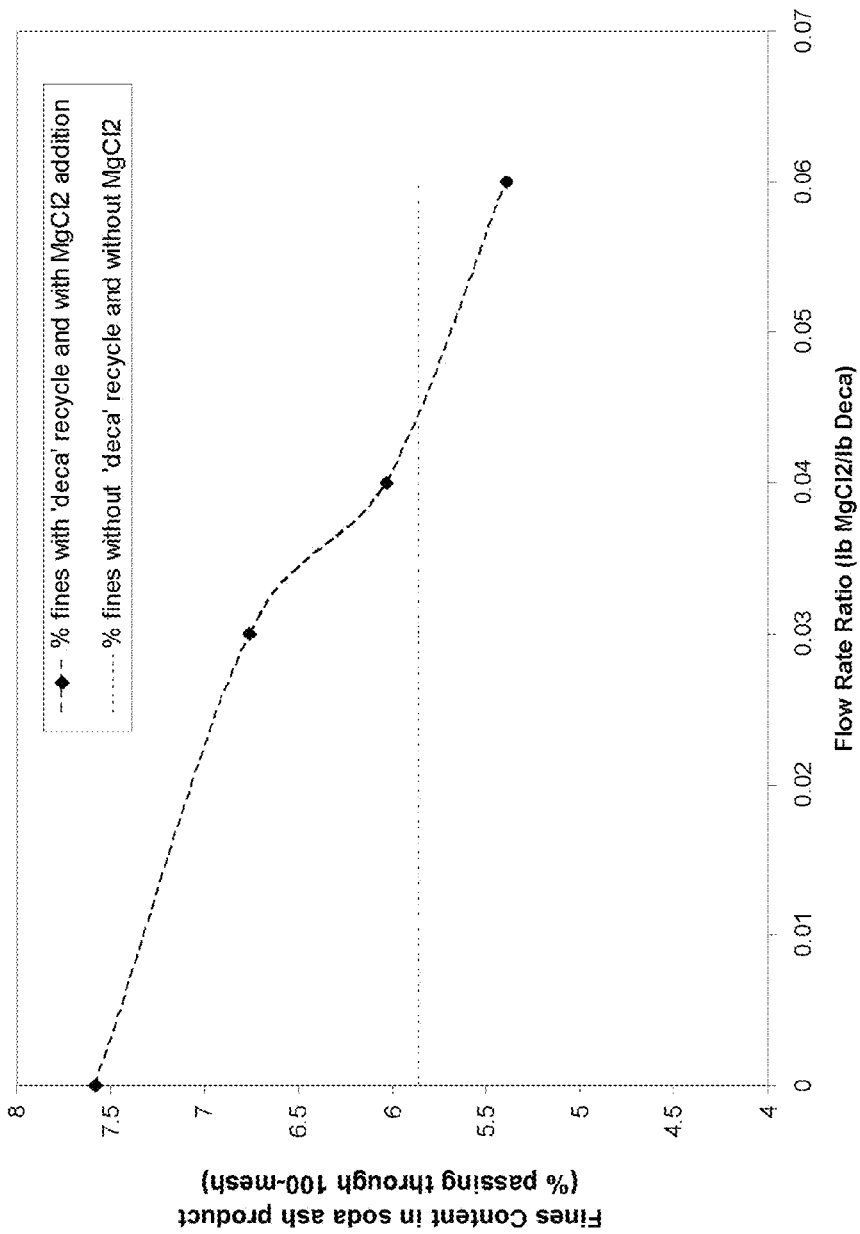
FIG. 7 illustrates the improved quality in a soda ash final product as a sodium carbonate-containing solution is treated with $MgCl_2$ when sodium carbonate decahydrate deposited in and collected from a tailings pond is reclaimed in the soda ash process.

It was observed that the fines content in the soda ash final products decreased when $MgCl_2$ was added regardless of where the $MgCl_2$ was added. For comparison, it should be noted that, when the soda ash was produced from calcined trona without recycling of sodium carbonate decahydrate, the average percentage of the final product which passed through a 100-mesh size screen was 5.86% without $MgCl_2$ addition and 5.85% with $MgCl_2$ addition. Although the addition of $MgCl_2$ to the weak liquor stream (unsaturated in sodium carbonate) based on TABLE 22 appeared to have a greater impact in reducing the fines content of the final product, the decreased fines content seemed more linked to the amount of magnesium added relative to the amount of decahydrate being recycled rather than being linked to a particular location where $MgCl_2$ was added. That is to say, the greater the amount of $MgCl_2$ being added relative to the amount of recycled 'deca', the lesser fines content in the soda ash final product. For illustration purpose, the fines content in soda ash was plotted versus the ratio of mass flow rates of Mg to 'deca' (lb $MgCl_2$/lb 'deca') in FIG. 7 at the three addition points in the soda ash plant. As shown in FIG. 7, there was a trend of decreasing fines content in the finished soda ash product as the ratio of mass flow rates of Mg to 'deca' increased.

Figure 8:
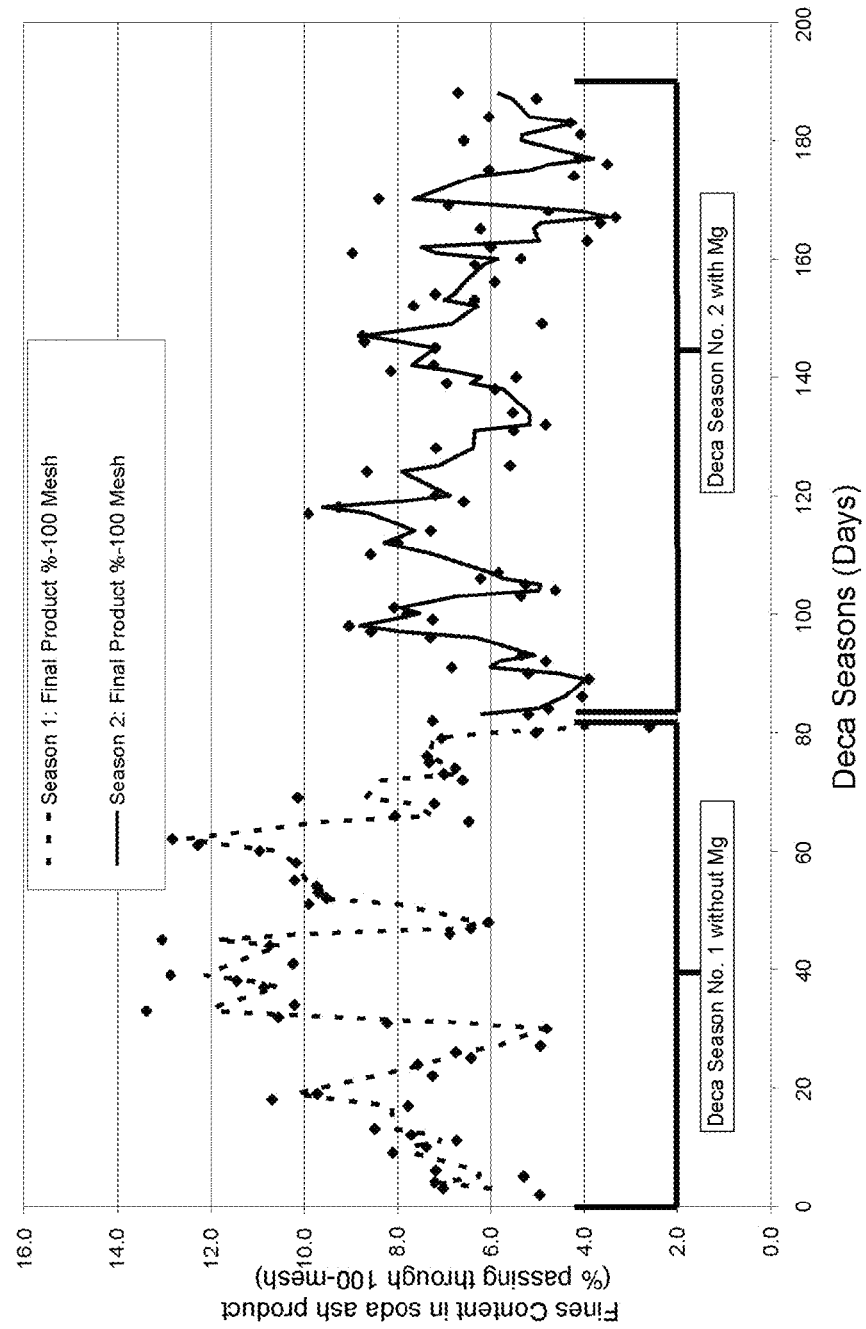
FIG. 8 represents the observed fines content in a soda ash final product during two 'deca' recycle seasons when a sodium carbonate decahydrate deposit is collected from a tailings pond and recycled to the soda ash process, a first recycle season being without treatment with $MgCl_2$ and a second recycle season being with treatment with $MgCl_2$.

FIG. 8 represents the fines content of the finished product during the two 'deca' recycling seasons No. 1 (dashed line without Mg treatment) and 2 (solid line with Mg treatment). The average fines content in the soda ash product (based on % passing a 100-mesh screen with 2-point moving average) was 8.37% (standard deviation: 2.41) for season No. 1 without Mg treatment and 6.29% (standard deviation: 1.63) for season No. 2 with Mg treatment. Although the fines content varied quite extensively during each recycle season, the treatment with $MgCl_2$ resulted on average in an overall drop of about 1.9% in fines content during the season No. 2 compared to the season No. 1 without magnesium treatment, which corresponds to a 23% reduction in fines formation.

The amount of silicates was also measured with and without the magnesium treatment in the filtrate (illustrated as 127 in FIG. 3). The results are shown in TABLE 23.

TABLE 23

Content in ppm Si of the filtrate solution (purified solution)

|  | With 'deca' recycle | | Without 'deca' recycle |
|---|---|---|---|
|  | With $MgCl_2$ | Without $MgCl_2$ | Without $MgCl_2$ |
| Observed ppm Si in filtrate | 88 | 123 | 80 |

The amount of Mg which was added when 'deca' was recycled should have been sufficient to achieve 78 ppm Si in the filtrate 127. With an average amount of about 88 ppm Si, the efficiency of silicates removal was about 78%. A 't-test' statistical method was used to compare the silicon content, and it was determined that there was a statistically significant difference in the ppm Si content in the filtrate 127 between seasons No. 1 and 2.

During the 'deca' recycle season No. 1, the volume of 'deca' introduced into the soda ash process had to be reduced not only due to a shift towards a smaller particle size of the final product, but also due to higher incidence of foaming in the crystallizer. During the 'deca' season No. 1 as previously mentioned, foaming issues were encountered in the crystallizer bodies. During season No. 2 with concurrent deca recycle and addition of magnesium chloride upstream of the crystallizer, production operators noted that crystallizer foaming was not as prevalent while it was an operational issue in season No. 1. Although not wishing to be bound by a particular theory, it is believed that the magnesium treatment during season No. 2 may have been also effective in reducing the content in soluble foam-causing agent(s) such as surface-active agent(s) in the treated liquor which for the most part ended up in the crystallizer feed. Such foam-causing compound(s) were most likely carried over from the recycled 'deca'. By their interaction with the added magnesium compound, there was a reduction in the content or in the foam-causing propensity of these agent(s).

Thus, based on these tests, it is believed that the content of or the foam-causing tendency of these agents may be reduced by a magnesium addition to a saturated/near-saturated or unsaturated solution containing sodium carbonate, at least a portion of which is from sodium carbonate decahydrate recovered from a tailings pond, by adding at least one magnesium compound.

Figure 9:
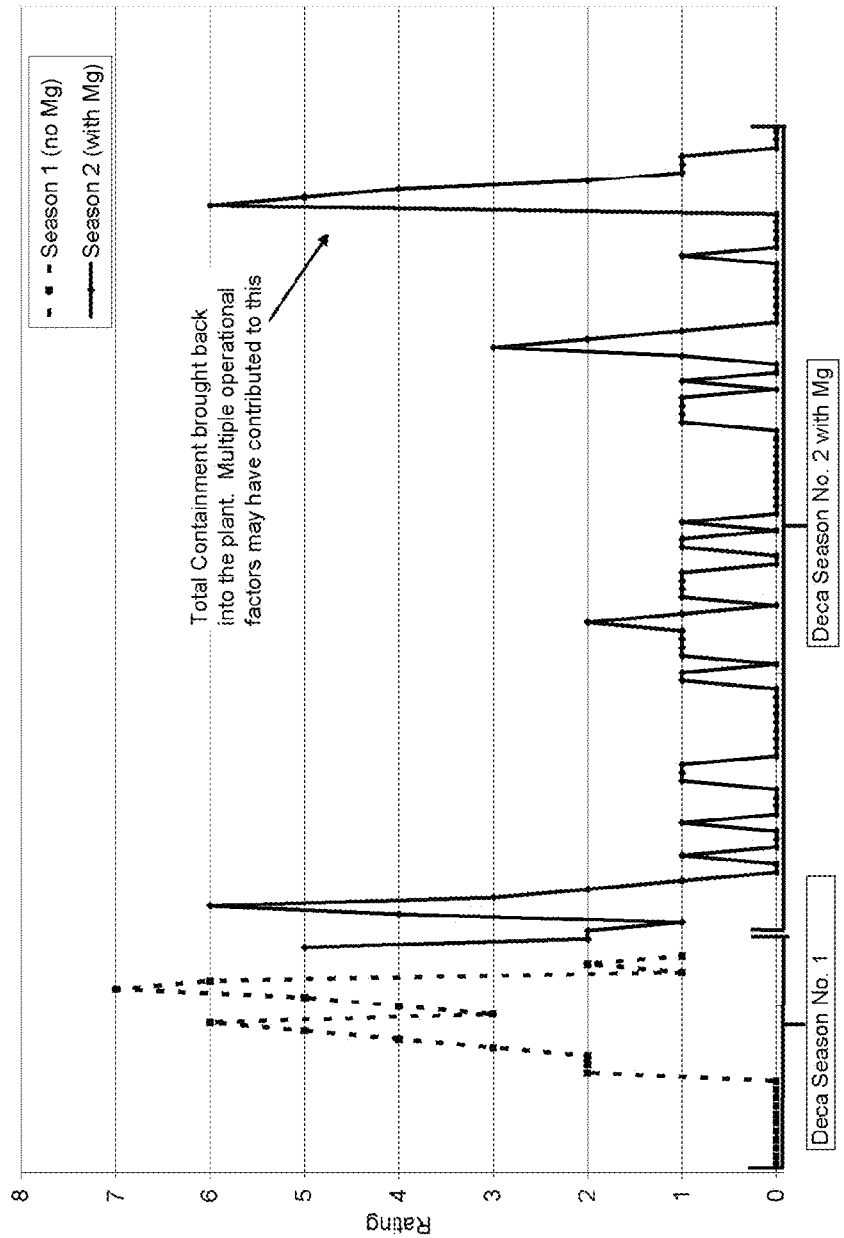
FIG. 9 represents the observed foam incidence in a sodium carbonate monohydrate crystallizer during the two 'deca' recycle seasons, one being without treatment with $MgCl_2$ and the other being with treatment with $MgCl_2$.
Figure 10:
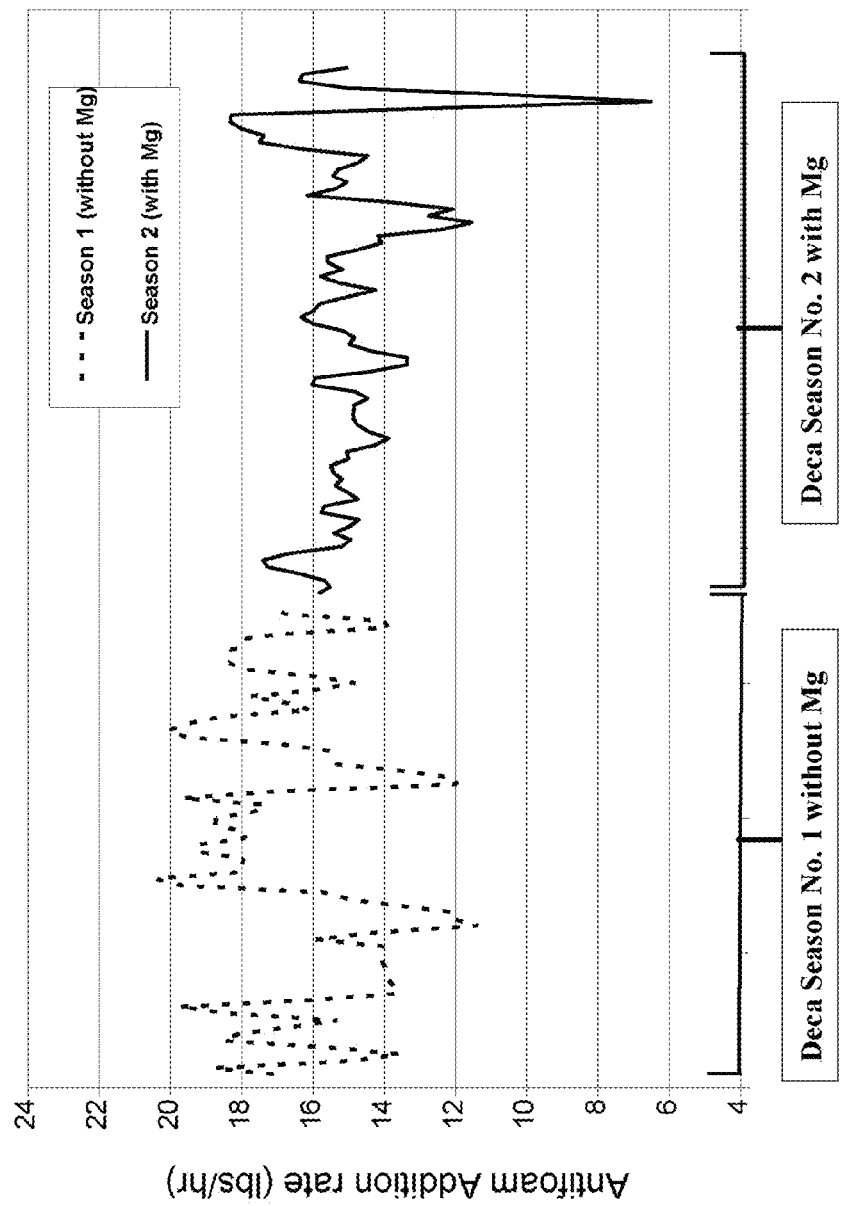
FIG. 10 represents the anti-foam usage in a sodium carbonate monohydrate crystallizer during the two 'deca' recycle seasons, one being without treatment with $MgCl_2$ and the other being with treatment with $MgCl_2$.

During season No. 1, the operators started to do a qualitative assessment of the crystallizer foaming almost every day using an arbitrary foam rating system of from 0 to 10, 0 being no foam and 10 being extreme foam. FIG. 9 illustrates these observations for the time when they were performed during the two deca recycling seasons. The average of these observations are listed in TABLE 24. Addition of antifoam was also recorded and represented in FIG. 10. A 't-test' statistical method was used to compare the crystallizer foaming rating and antifoam usage rate, and it was determined that there was a statistically significant difference in the foaming rating and antifoam usage between seasons No. 1 and 2. During season No. 2, there was less crystallizer foaming and less antifoam usage even though higher decahydrate recycle rates were used in comparison to season No. 1. It should be noted that the large spikes observed at the end of season No, 2 on both FIG. 9 and FIG. 10 were the result of operational upsets, and were not a response or effect based on the magnesium addition.

TABLE 24

Foam ratings, defoamer usage, recycled decahydrate tonnage, and trona ore (%) during recycled 'deca' Season No. 1 (without $MgCl_2$ treatment) and recycled 'deca' Season No. 2 (with $MgCl_2$)

| | Foaming Rating (arbitrary units) | | Recycled deca (tons/day) | | Antifoam Usage (lb/hr) | | Trona ore (%) | |
|---|---|---|---|---|---|---|---|---|
| | Season 1 | Season 2 | Season 1 | Season 2 | Season 1 | Season 2 | Season 1 | Season 2 |
| Avg | 2.04 | 0.81 | 556.85 | 873.29 | 16.31 | 14.90 | 93.57 | 94.00 |
| Std Dev. | 2.29 | 1.29 | 260.75 | 408.63 | 2.84 | 1.97 | 2.00 | 1.83 |
| N | 26 | 99 | | | 70 | 80 | 67 | 79 |

The trona was also analyzed to account for possible variation in the ore material which was used to make soda ash. The data is shown in TABLE 24. A 't-test' statistical method was used to compare the trona ore content, and it was determined that there was no statistical difference in the trona ore content between seasons No. 1 and 2.

Should the disclosure of any of the patents, patent applications, and publications that are incorporated herein by reference conflict with the present specification to the extent that it might render a term unclear, the present specification shall take precedence.

Accordingly, the scope of protection is not limited by the description and the Examples set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention. Accordingly, the scope of protection is not limited to the embodiments described herein, but is only limited by the claims that follow, the scope of which shall include all equivalents of the subject matter of the claims.

The invention claimed is:

1. A method for reducing the content of impurities in a waste solid thereby allowing it to be used as a feed to a process which produces crystalline sodium carbonate, sodium bicarbonate, sodium sulfite, or other derivatives, the method comprising the following steps:
   providing a mass of a waste solid comprising a pond solid recovered from at least one waste pond, said pond solid comprising impurities selected from the group consisting of silicates, sodium chloride, sodium sulfate, organic matter, and combinations of two or more thereof, said pond solid further comprising one sodium compound selected from the group consisting of sodium carbonate decahydrate, sodium carbonate monohydrate, sodium carbonate heptahydrate, sodium bicarbonate, sodium sesquicarbonate, and any combinations of two or more thereof;
   contacting said waste solid mass with a leach solution to selectively dissolve at least a portion of a first impurity from the contacted mass into the leach solution to form a leachate and a leached residue;
   collecting the leached residue;
   dissolving at least a portion of the leached residue in an aqueous medium to form a liquor;
   wherein at least a portion of said liquor provides a feedstock to a process which produces a crystalline product comprising sodium carbonate, sodium bicarbonate, sodium sulfite, or other derivatives.

2. The method according to claim 1, wherein the waste solid mass consists essentially of a pond solid recovered from one waste pond, or of two or more pond solids recovered from the same waste pond or from different waste ponds.

3. The method according to claim 1, wherein the pond solid comprises between 5 wt. % and 38 wt. % sodium carbonate decahydrate or comprises sodium bicarbonate in an amount up to about 40 wt. %.

4. The method according to claim 1, further comprising feeding at least a portion of the liquor to a sodium carbonate monohydrate crystallizer or a sodium bicarbonate crystallizer to form crystals and a purge liquor stream, at least a portion of said purge liquor stream being passed under crystallization conditions to the at least one waste pond to form a deposit contaminated with said first impurity and optionally with a second impurity, wherein a portion of said deposit is recovered to provide the pond solid in said waste solid mass.

5. The method according to claim 1, further comprising forming a pond deposit in the waste pond and recovering at least a portion of said deposit to provide the pond solid in said waste solid mass, and wherein forming the pond deposit comprises passing to such waste pond a plant effluent comprising one sodium compound selected from the group consisting of sodium carbonate, any hydrate thereof, sodium bicarbonate, sodium sesquicarbonate, and any combinations of two or more thereof, under suitable conditions to form a crystallized sodium salt selected from the group consisting of sodium carbonate decahydrate, sodium bicarbonate, sodium sesquicarbonate, and any combinations of two or more thereof.

6. The method according to claim 5, wherein the plant effluent fed to the waste pond comprises a purge liquor exiting a sodium carbonate crystallizer, a purge liquor exiting a sodium bicarbonate crystallizer, or both.

7. The method according to claim 1, wherein the contacting step comprises percolation leaching.

8. The method according to claim 7, wherein percolation leaching comprises heaping the waste solid mass onto a liquid-impermeable substrate which is inclined from the horizontal; dispersing the leach solution through a distribution system whereby said leach solution is sprayed onto said heaped mass; and collecting the leachate after percolation through said heaped mass.

9. The method according to claim 8, wherein said distribution system comprises at least one solution dispersing component selected from the group consisting of spray nozzle, impact sprinkler, perforated pipe, porous pipe, slotted pipe, split pipe, and irrigation system with a plurality of solution dispersing components.

10. The method according to claim 7, wherein percolation leaching comprises placing the mass of said waste solid into a vessel; dispersing the leach solution through a distribution system near or at the top of the vessel whereby said leach solution is sprayed onto said mass and passes downward therethrough; and collecting the leachate after percolation through said mass at the bottom of said vessel.

11. The method according to claim 1, wherein the contacting step comprises at least one step selected from the group consisting of:
   suspending the waste solid mass in particulate form into the leach solution to form a slurry;
   flowing the leach solution downward through a packed bed of the waste solid mass;
   flooding a packed bed of the waste solid mass by flowing the leach solution upward through the packed bed; and
   counter-current leaching in which the waste solid mass is moved in one direction while the leach solution contacting the moving mass is moved in another direction.

12. The method according to claim 1, wherein the first impurity to be removed from the mass comprises sodium chloride, sodium sulfate, or both.

13. The method according to claim 1, wherein the leach solution comprises a purge liquor exiting a sodium bicarbonate crystallizer, a purge liquor exiting a sodium carbonate monohydrate crystallizer, a mine water, a weak liquor, fresh water, rainwater, or any combinations thereof.

14. The method according to claim 1, wherein the dissolution of the leached residue forms a liquor unsaturated in sodium carbonate which comprises less than 20 percent sodium carbonate.

15. The method according to claim 1, further comprising dissolving calcined trona in the liquor after dissolving the leached residue or dissolving calcined trona during dissolution of the leached residue.

16. The method according to claim 1, further comprising repeating the contacting step with at least a portion of the leachate for a predetermined amount of time or until the content of said first impurity in the leachate or in the leached residue reaches a predetermined value.

17. A method for reducing the content of impurities in a waste solid thereby allowing it to be used as a feed to a process which produces crystalline sodium carbonate, sodium bicarbonate, sodium sulfite, or other derivatives, the method comprising the following steps:

providing a mass of a waste solid comprising a pond solid recovered from at least one waste pond, said pond solid comprising impurities selected from the group consisting of silicates, sodium chloride, sodium sulfate, organic matter, and combinations of two or more thereof, said pond solid further comprising one sodium compound selected from the group consisting of sodium carbonate decahydrate, sodium carbonate monohydrate, sodium carbonate heptahydrate, sodium bicarbonate, sodium sesquicarbonate, and any combinations of two or more thereof;

contacting said waste solid mass with a leach solution to selectively dissolve at least a portion of a first impurity from the contacted mass into the leach solution to form a leachate and a leached residue;

collecting the leached residue;

dissolving at least a portion of the leached residue in an aqueous medium to form a liquor;

carrying out a second impurity removal step comprising performing a magnesium treatment to form a treated liquor, said treatment comprising adding a magnesium compound during dissolution of the leached residue or adding a magnesium compound to said liquor or a portion thereof after dissolution of the leached residue in order to form water-insoluble matter with at least a portion of a second impurity, and passing said treated liquor though at least one separation unit to remove water-insoluble matter and to obtain a purified solution;

wherein at least a portion of said purified solution provides a feedstock to a process which produces a crystalline product comprising sodium carbonate, sodium bicarbonate, sodium sulfite, or other derivatives.

18. The method according to claim 17 wherein the first impurity is different than the second impurity.

19. The method according to claim 18, wherein the first impurity comprises sodium chloride, sodium sulfate, or both, and wherein the second impurity comprises silicates.

20. The method according to claim 17, wherein the magnesium compound comprises one or more water-soluble magnesium salts.

21. The method according to claim 17, wherein the magnesium compound comprises magnesium chloride.

* * * * *